(12) United States Patent
Hagood et al.

(10) Patent No.: US 7,304,786 B2
(45) Date of Patent: Dec. 4, 2007

(54) METHODS AND APPARATUS FOR BI-STABLE ACTUATION OF DISPLAYS

(75) Inventors: Nesbitt W. Hagood, Wellesley, MA (US); Jasper Lodewyk Steyn, Winchester, MA (US); Roger Barton, Andover, MA (US); Richard S. Payne, Andover, MA (US)

(73) Assignee: Pixtronix, Inc., Andover, MA (US)

( * ) Notice: Subject to any disclaimer, the term of this patent is extended or adjusted under 35 U.S.C. 154(b) by 0 days.

(21) Appl. No.: 11/251,452

(22) Filed: Oct. 14, 2005

(65) Prior Publication Data

US 2006/0187531 A1 Aug. 24, 2006

Related U.S. Application Data

(63) Continuation-in-part of application No. 11/218,690, filed on Sep. 2, 2005.

(60) Provisional application No. 60/676,053, filed on Apr. 29, 2005, provisional application No. 60/655,827, filed on Feb. 23, 2005.

(51) Int. Cl.
*G02B 26/00* (2006.01)
(52) U.S. Cl. ...................... 359/290; 359/295
(58) Field of Classification Search ........... 359/198, 359/214, 224, 290, 295
See application file for complete search history.

(56) References Cited

U.S. PATENT DOCUMENTS

| 4,067,043 | A | 1/1978 | Perry |
|---|---|---|---|
| 4,074,253 | A | 2/1978 | Nadir |
| 4,564,836 | A | 1/1986 | Vuilleumier et al. |
| 4,582,396 | A | 4/1986 | Bos et al. |
| 4,673,253 | A | 6/1987 | Tanabe et al. |
| 4,744,640 | A | 5/1988 | Phillips |
| 4,958,911 | A | 9/1990 | Beiswenger et al. |
| 4,991,941 | A | 2/1991 | Kalmanash |
| 5,005,108 | A | 4/1991 | Pristash et al. |
| 5,042,900 | A | 8/1991 | Parker |
| 5,050,946 | A | 9/1991 | Hathaway et al. |
| 5,062,689 | A | 11/1991 | Koehler |
| 5,093,652 | A | 3/1992 | Bull et al. |
| 5,128,787 | A | 7/1992 | Blonder |
| 5,136,480 | A | 8/1992 | Pristash et al. |
| 5,142,405 | A | 8/1992 | Hornbeck |
| 5,198,730 | A | 3/1993 | Vancil |

(Continued)

FOREIGN PATENT DOCUMENTS

EP 0 359 450 A2 9/1989

(Continued)

OTHER PUBLICATIONS

Sony ACX705AKM, 6.92cm Diagonal Reflective Color LCD Module.

(Continued)

*Primary Examiner*—Ricky Mack
*Assistant Examiner*—William C Choi
(74) *Attorney, Agent, or Firm*—Fish & Neave IP Group Ropes & Gray LLP

(57) ABSTRACT

The invention relates to mechanically bi-stable shutter assemblies for use in display apparatus to form images.

39 Claims, 26 Drawing Sheets

U.S. PATENT DOCUMENTS

| | | |
|---|---|---|
| 5,202,950 A | 4/1993 | Arego et al. |
| 5,233,459 A | 8/1993 | Bozler et al. |
| 5,319,491 A | 6/1994 | Selbrede |
| 5,339,179 A | 8/1994 | Rudisill et al. |
| 5,396,350 A | 3/1995 | Beeson et al. |
| 5,416,631 A | 5/1995 | Yagi |
| 5,440,197 A | 8/1995 | Gleckman |
| 5,465,175 A | 11/1995 | Woodgate et al. |
| 5,467,104 A | 11/1995 | Furness, III et al. |
| 5,479,279 A | 12/1995 | Barbier et al. |
| 5,493,439 A | 2/1996 | Engle |
| 5,519,565 A | 5/1996 | Kalt et al. |
| 5,528,262 A | 6/1996 | McDowall et al. |
| 5,559,389 A | 9/1996 | Spindt et al. |
| 5,568,964 A | 10/1996 | Parker et al. |
| 5,578,185 A | 11/1996 | Bergeropn et al. |
| 5,579,035 A | 11/1996 | Beiswenger |
| 5,579,240 A | 11/1996 | Buus |
| 5,596,339 A | 1/1997 | Furness, III et al. |
| 5,613,751 A | 3/1997 | Parker et al. |
| 5,618,096 A | 4/1997 | Parker et al. |
| 5,619,266 A | 4/1997 | Tomita et al. |
| 5,655,832 A | 8/1997 | Pelka et al. |
| 5,659,327 A | 8/1997 | Furness, III et al. |
| 5,666,226 A | 9/1997 | Ezra et al. |
| 5,684,354 A | 11/1997 | Gleckman |
| 5,731,802 A | 3/1998 | Aras et al. |
| 5,745,203 A | 4/1998 | Valliath et al. |
| 5,771,321 A | 6/1998 | Stern |
| 5,781,331 A | 7/1998 | Carr et al. |
| 5,784,189 A | 7/1998 | Bozler et al. |
| 5,794,761 A | 8/1998 | Renaud et al. |
| 5,801,792 A | 9/1998 | Smith et al. |
| 5,835,255 A | 11/1998 | Miles |
| 5,854,872 A | 12/1998 | Tai |
| 5,867,302 A | 2/1999 | Fleming |
| 5,876,107 A | 3/1999 | Parker et al. |
| 5,884,872 A | 3/1999 | Greenhalgh |
| 5,889,625 A | 3/1999 | Chen et al. |
| 5,894,686 A | 4/1999 | Parker et al. |
| 5,895,115 A | 4/1999 | Parker et al. |
| 5,921,652 A | 7/1999 | Parker et al. |
| 5,936,596 A | 8/1999 | Yoshida et al. |
| 5,953,469 A | 9/1999 | Zhou |
| 5,975,711 A | 11/1999 | Parker et al. |
| 5,986,628 A | 11/1999 | Tuenge et al. |
| 5,986,796 A | 11/1999 | Miles |
| 5,990,990 A | 11/1999 | Crabtree |
| 6,008,781 A | 12/1999 | Furness, III et al. |
| 6,028,656 A | 2/2000 | Buhrer et al. |
| 6,030,089 A | 2/2000 | Parker et al. |
| 6,034,807 A | 3/2000 | Little et al. |
| 6,040,796 A | 3/2000 | Matsugatani et al. |
| 6,040,937 A | 3/2000 | Miles |
| 6,046,840 A | 4/2000 | Huibers |
| 6,055,090 A | 4/2000 | Miles |
| 6,079,838 A | 6/2000 | Parker et al. |
| 6,158,867 A | 12/2000 | Parker et al. |
| 6,162,657 A | 12/2000 | Schiele et al. |
| 6,168,395 B1 | 1/2001 | Quenzer et al. |
| 6,174,064 B1 | 1/2001 | Kalantar et al. |
| 6,201,633 B1 | 3/2001 | Peeters et al. |
| 6,201,664 B1 | 3/2001 | Le et al. |
| 6,206,550 B1 | 3/2001 | Fukushima et al. |
| 6,219,119 B1 | 4/2001 | Nakai |
| 6,249,370 B1 | 6/2001 | Takeuchi et al. |
| 6,266,240 B1 | 7/2001 | Urban et al. |
| 6,282,951 B1 | 9/2001 | Loga et al. |
| 6,285,270 B1 | 9/2001 | Lane et al. |
| 6,288,824 B1 | 9/2001 | Kastalsky |
| 6,296,383 B1 | 10/2001 | Henningsen |
| 6,300,154 B2 | 10/2001 | Clark et al. |
| 6,317,103 B1 | 11/2001 | Furness, III et al. |
| 6,323,834 B1 | 11/2001 | Colgan et al. |
| 6,329,967 B1 | 12/2001 | Little et al. |
| 6,367,940 B1 | 4/2002 | Parker et al. |
| 6,402,335 B1 | 6/2002 | Kalantar et al. |
| 6,424,329 B1 | 7/2002 | Okita |
| 6,429,625 B1 | 8/2002 | LeFevre et al. |
| 6,471,879 B2 | 10/2002 | Hanson et al. |
| 6,473,220 B1 | 10/2002 | Clikeman et al. |
| 6,476,886 B2 | 11/2002 | Krusius et al. |
| 6,483,613 B1 | 11/2002 | Woodgate et al. |
| 6,498,685 B1 | 12/2002 | Johnson |
| 6,504,985 B2 | 1/2003 | Parker et al. |
| 6,507,138 B1 | 1/2003 | Rodgers et al. |
| 6,508,563 B2 | 1/2003 | Parker et al. |
| 6,523,961 B2 | 2/2003 | Ilkov et al. |
| 6,529,265 B1 | 3/2003 | Henningsen |
| 6,531,947 B1 | 3/2003 | Weaver et al. |
| 6,535,256 B1 | 3/2003 | Ishihara et al. |
| 6,535,311 B1 | 3/2003 | Lindquist |
| 6,556,258 B1 | 4/2003 | Yoshida et al. |
| 6,556,261 B1 | 4/2003 | Krusius et al. |
| 6,559,827 B1 | 5/2003 | Mangerson |
| 6,567,063 B1 | 5/2003 | Okita |
| 6,567,138 B1 | 5/2003 | Krusius et al. |
| 6,574,033 B1 | 6/2003 | Chui et al. |
| 6,582,095 B1 | 6/2003 | Toyoda |
| 6,589,625 B1 | 7/2003 | Kothari et al. |
| 6,591,049 B2 | 7/2003 | Williams et al. |
| 6,593,677 B2 | 7/2003 | Behin et al. |
| 6,600,474 B1 | 7/2003 | Heines et al. |
| 6,639,570 B2 | 10/2003 | Furness, III et al. |
| 6,639,572 B1 | 10/2003 | Little et al. |
| 6,650,455 B2 | 11/2003 | Miles |
| 6,650,822 B1 | 11/2003 | Zhou |
| 6,671,078 B2 | 12/2003 | Flanders et al. |
| 6,674,562 B1 | 1/2004 | Miles |
| 6,677,709 B1 | 1/2004 | Ma et al. |
| 6,680,792 B2 | 1/2004 | Miles |
| 6,690,422 B1 | 2/2004 | Daly et al. |
| 6,701,039 B2 | 3/2004 | Bourgeois et al. |
| 6,707,176 B1 | 3/2004 | Rodgers |
| 6,710,538 B1 | 3/2004 | Ahn et al. |
| 6,710,908 B2 | 3/2004 | Miles et al. |
| 6,710,920 B1 | 3/2004 | Mashitani et al. |
| 6,712,481 B2 | 3/2004 | Parker et al. |
| 6,864,618 B2 | 4/2004 | Miller et al. |
| 6,731,355 B2 | 5/2004 | Miyashita |
| 6,731,492 B2 | 5/2004 | Goodwin-Johansson |
| 6,733,354 B1 | 5/2004 | Cathey et al. |
| 6,738,177 B1 | 5/2004 | Gutierrez et al. |
| 6,741,377 B2 | 5/2004 | Miles |
| 6,749,312 B2 | 6/2004 | Parker et al. |
| 6,750,930 B2 | 6/2004 | Yoshii et al. |
| 6,752,505 B2 | 6/2004 | Parker et al. |
| 6,755,547 B2 | 6/2004 | Parker |
| 6,762,743 B2 | 7/2004 | Yoshihara et al. |
| 6,762,868 B2 | 7/2004 | Liu et al. |
| 6,764,796 B2 | 7/2004 | Fries |
| 6,774,964 B2 | 8/2004 | Funamoto et al. |
| 6,775,048 B1 | 8/2004 | Starkweather et al. |
| 6,785,454 B2 | 8/2004 | Abe |
| 6,788,371 B2 | 9/2004 | Tanada et al. |
| 6,794,119 B2 | 9/2004 | Miles |
| 6,796,668 B2 | 9/2004 | Parker et al. |
| 6,798,935 B2 | 9/2004 | Bourgeois et al. |
| 6,819,465 B2 | 11/2004 | Clikeman et al. |
| 6,825,470 B1 | 11/2004 | Bawolek et al. |
| 6,827,456 B2 | 12/2004 | Parker et al. |
| 6,831,678 B1 | 12/2004 | Travis |
| 6,835,111 B2 | 12/2004 | Ahn et al. |
| 6,846,082 B2 | 1/2005 | Glent-Madsen et al. |

| | | |
|---|---|---|
| 6,847,425 B2 | 1/2005 | Tanada et al. |
| 6,857,751 B2 | 2/2005 | Penn et al. |
| 6,863,219 B1 | 3/2005 | Jacobsen et al. |
| 6,867,896 B2 | 3/2005 | Miles |
| 6,886,956 B2 | 5/2005 | Parker et al. |
| 6,887,202 B2 | 5/2005 | Currie et al. |
| 6,888,678 B2 | 5/2005 | Nishiyama et al. |
| 6,897,164 B2 | 5/2005 | Baude et al. |
| 6,900,072 B2 | 5/2005 | Patel et al. |
| 6,906,847 B2 | 6/2005 | Huibers et al. |
| 6,911,891 B2 | 6/2005 | Qiu et al. |
| 6,911,964 B2 | 6/2005 | Lee et al. |
| 6,919,981 B2 | 7/2005 | Clikeman et al. |
| 6,934,080 B2 | 8/2005 | Saccomanno et al. |
| 6,936,968 B2 | 8/2005 | Cross et al. |
| 6,939,013 B2 | 9/2005 | Asao |
| 6,940,631 B2 | 9/2005 | Ishikawa |
| 6,943,495 B2 | 9/2005 | Ma et al. |
| 6,947,107 B2 | 9/2005 | Yoshii et al. |
| 6,953,375 B2 | 10/2005 | Ahn et al. |
| 6,962,419 B2 | 11/2005 | Huibers |
| 6,965,375 B1 | 11/2005 | Gettemy et al. |
| 6,969,635 B2 | 11/2005 | Patel et al. |
| 7,004,610 B2 | 2/2006 | Yamashita et al. |
| 7,004,611 B2 | 2/2006 | Parker et al. |
| 7,012,726 B1 | 3/2006 | Miles |
| 7,012,732 B2 | 3/2006 | Miles |
| 7,014,349 B2 | 3/2006 | Shinohara et al. |
| 7,042,643 B2 | 5/2006 | Miles |
| 7,046,905 B1 | 5/2006 | Gardiner et al. |
| 2001/0001260 A1 | 5/2001 | Parker et al. |
| 2001/0028993 A1 | 10/2001 | Sanford |
| 2001/0043208 A1 | 11/2001 | Furness, III et al. |
| 2001/0053075 A1 | 12/2001 | Parker et al. |
| 2002/0001051 A1 | 1/2002 | Krusius et al. |
| 2002/0009275 A1 | 1/2002 | Williams et al. |
| 2002/0015215 A1 | 2/2002 | Miles |
| 2002/0024641 A1 | 2/2002 | Iikov et al. |
| 2002/0024711 A1 | 2/2002 | Miles |
| 2002/0047172 A1 | 4/2002 | Reid |
| 2002/0054424 A1 | 5/2002 | Miles |
| 2002/0054487 A1 | 5/2002 | Parker et al. |
| 2002/0056900 A1 | 5/2002 | Liu et al. |
| 2002/0063661 A1 | 5/2002 | Comiskey et al. |
| 2002/0070931 A1 | 6/2002 | Ishikawa |
| 2002/0075555 A1 | 6/2002 | Miles |
| 2002/0080598 A1 | 6/2002 | Parker et al. |
| 2002/0126364 A1 | 9/2002 | Miles |
| 2002/0126387 A1 | 9/2002 | Ishikawa et al. |
| 2002/0141174 A1 | 10/2002 | Parker et al. |
| 2002/0163482 A1 | 11/2002 | Sullivan |
| 2002/0163484 A1 | 11/2002 | Furness, III et al. |
| 2002/0171327 A1 | 11/2002 | Miller et al. |
| 2002/0185699 A1 | 12/2002 | Reid |
| 2002/0196522 A1 | 12/2002 | Little et al. |
| 2003/0007344 A1 | 1/2003 | Parker |
| 2003/0009898 A1 | 1/2003 | Slocum et al. |
| 2003/0029705 A1 | 2/2003 | Qiu et al. |
| 2003/0036215 A1 | 2/2003 | Reid |
| 2003/0043157 A1 | 3/2003 | Miles |
| 2003/0048036 A1 | 3/2003 | Lemkin |
| 2003/0058543 A1 | 3/2003 | Sheedy et al. |
| 2003/0076649 A1 | 4/2003 | Speakman |
| 2003/0085650 A1 | 5/2003 | Cathey et al. |
| 2003/0085867 A1 | 5/2003 | Grabert |
| 2003/0095081 A1 | 5/2003 | Furness, III et al. |
| 2003/0095398 A1 | 5/2003 | Parker et al. |
| 2003/0102810 A1 | 6/2003 | Cross et al. |
| 2003/0123245 A1 | 7/2003 | Parker et al. |
| 2003/0123246 A1 | 7/2003 | Parker |
| 2003/0123247 A1 | 7/2003 | Parker et al. |
| 2003/0133284 A1 | 7/2003 | Chipchase et al. |
| 2003/0137499 A1 | 7/2003 | Iisaka |
| 2003/0174422 A1 | 9/2003 | Miller et al. |
| 2003/0174931 A1 | 9/2003 | Rodgers et al. |
| 2003/0183008 A1 | 10/2003 | Bang et al. |
| 2003/0184189 A1 | 10/2003 | Sinclair |
| 2003/0190535 A1 | 10/2003 | Fries |
| 2003/0190536 A1 | 10/2003 | Fries |
| 2003/0202338 A1 | 10/2003 | Parker |
| 2003/0231160 A1 | 12/2003 | Yoshihara et al. |
| 2004/0012946 A1 | 1/2004 | Parker et al. |
| 2004/0058532 A1 | 3/2004 | Miles et al. |
| 2004/0080240 A1 | 4/2004 | Miller et al. |
| 2004/0080484 A1 | 4/2004 | Heines et al. |
| 2004/0080927 A1 | 4/2004 | Parker et al. |
| 2004/0085749 A1 | 5/2004 | Parker et al. |
| 2004/0090144 A1 | 5/2004 | Miller et al. |
| 2004/0095739 A1 | 5/2004 | Parker et al. |
| 2004/0100677 A1 | 5/2004 | Huibers et al. |
| 2004/0114346 A1 | 6/2004 | Parker et al. |
| 2004/0122328 A1 | 6/2004 | Wang et al. |
| 2004/0125346 A1 | 7/2004 | Huibers |
| 2004/0135273 A1 | 7/2004 | Parker et al. |
| 2004/0135951 A1 | 7/2004 | Stumbo et al. |
| 2004/0136204 A1 | 7/2004 | Asao |
| 2004/0145580 A1 | 7/2004 | Perlman |
| 2004/0157664 A1 | 8/2004 | Link |
| 2004/0165372 A1 | 8/2004 | Parker |
| 2004/0171206 A1 | 9/2004 | Rodgers |
| 2004/0179146 A1 | 9/2004 | Nilsson |
| 2004/0196215 A1 | 10/2004 | Duthaler et al. |
| 2004/0207768 A1 | 10/2004 | Liu |
| 2004/0218149 A1 | 11/2004 | Huibers |
| 2004/0218154 A1 | 11/2004 | Huibers |
| 2004/0218292 A1 | 11/2004 | Huibers |
| 2004/0218293 A1 | 11/2004 | Huibers |
| 2004/0223088 A1 | 11/2004 | Huibers |
| 2004/0223240 A1 | 11/2004 | Huibers |
| 2004/0227428 A1 | 11/2004 | Sinclair |
| 2004/0233392 A1 | 11/2004 | Huibers |
| 2004/0240032 A1 | 12/2004 | Miles |
| 2004/0246275 A1 | 12/2004 | Yoshihara et al. |
| 2004/0263944 A1 | 12/2004 | Miles et al. |
| 2005/0002082 A1 | 1/2005 | Miles |
| 2005/0002086 A1 | 1/2005 | Starkweather et al. |
| 2005/0007759 A1 | 1/2005 | Parker |
| 2005/0024849 A1 | 2/2005 | Parker et al. |
| 2005/0059184 A1 | 3/2005 | Sniegowski et al. |
| 2005/0062708 A1 | 3/2005 | Yoshihara et al. |
| 2005/0063037 A1 | 3/2005 | Selebrede et al. |
| 2005/0072032 A1 | 4/2005 | McCollum et al. |
| 2005/0088404 A1 | 4/2005 | Heines et al. |
| 2005/0093465 A1 | 5/2005 | Yonekubo et al. |
| 2005/0094240 A1 | 5/2005 | Huibers et al. |
| 2005/0094418 A1 | 5/2005 | Parker |
| 2005/0111238 A1 | 5/2005 | Parker |
| 2005/0111241 A1 | 5/2005 | Parker |
| 2005/0116798 A1 | 6/2005 | Bintoro et al. |
| 2005/0122560 A1 | 6/2005 | Sampsell et al. |
| 2005/0122591 A1 | 6/2005 | Parker et al. |
| 2005/0123243 A1 | 6/2005 | Steckl et al. |
| 2005/0134805 A1 | 6/2005 | Conner et al. |
| 2005/0141076 A1 | 6/2005 | Bausenwein et al. |
| 2005/0151940 A1 | 7/2005 | Asao |
| 2005/0157365 A1 | 7/2005 | Ravnkilde et al. |
| 2005/0157376 A1 | 7/2005 | Huibers et al. |
| 2005/0168789 A1 | 8/2005 | Glent-Madsen |
| 2005/0171408 A1 | 8/2005 | Parker |
| 2005/0195468 A1 | 9/2005 | Sampsell |
| 2005/0207154 A1 | 9/2005 | Parker |
| 2005/0207178 A1 | 9/2005 | Parker |
| 2005/0213183 A9 | 9/2005 | Miles |
| 2005/0213322 A1 | 9/2005 | Parker |
| 2005/0213323 A1 | 9/2005 | Parker |
| 2005/0213349 A1 | 9/2005 | Parker |

| | | | |
|---|---|---|---|
| 2005/0219679 | A1 | 10/2005 | Ishikawa |
| 2005/0219680 | A1 | 10/2005 | Ishikawa |
| 2005/0225501 | A1 | 10/2005 | Srinivasan et al. |
| 2005/0225519 | A1 | 10/2005 | Naugler, Jr. |
| 2005/0225732 | A1 | 10/2005 | Conner et al. |
| 2005/0225827 | A1 | 10/2005 | Kastalsky |
| 2005/0237596 | A1 | 10/2005 | Selbrede |
| 2005/0242710 | A1 | 11/2005 | Yamazaki et al. |
| 2005/0243023 | A1 | 11/2005 | Reddy et al. |
| 2005/0244099 | A1 | 11/2005 | Pasch et al. |
| 2005/0244949 | A1 | 11/2005 | Miles |
| 2005/0245313 | A1 | 11/2005 | Yoshino et al. |
| 2005/0258571 | A1 | 11/2005 | Dumond et al. |
| 2005/0259198 | A1 | 11/2005 | Lubart et al. |
| 2005/0286114 | A1 | 12/2005 | Miles |
| 2006/0028811 | A1 | 2/2006 | Parker |
| 2006/0028817 | A1 | 2/2006 | Parker |
| 2006/0028840 | A1 | 2/2006 | Parker |
| 2006/0028841 | A1 | 2/2006 | Parker |
| 2006/0028843 | A1 | 2/2006 | Parker |
| 2006/0028844 | A1 | 2/2006 | Parker |
| 2006/0033975 | A1 | 2/2006 | Miles |
| 2006/0044246 | A1 | 3/2006 | Mignard |
| 2006/0044928 | A1 | 3/2006 | Chui et al. |
| 2006/0092490 | A1 | 5/2006 | McCollum et al. |

FOREIGN PATENT DOCUMENTS

| | | |
|---|---|---|
| EP | 0 415 625 A2 | 3/1991 |
| EP | 0 359 450 B1 | 11/1994 |
| EP | 0 495 273 B1 | 9/1996 |
| EP | 0 415 625 B1 | 1/1997 |
| EP | 0 751 340 A2 | 1/1997 |
| EP | 0 884 525 A2 | 12/1998 |
| EP | 0 751 340 B1 | 5/2000 |
| EP | 1 202 096 A2 | 5/2002 |
| EP | 1 426 190 A1 | 6/2004 |
| FR | 2 726 135 | 10/1994 |
| JP | 03-142409 | 6/1991 |
| JP | 04-249203 | 9/1992 |
| JP | 09-198906 | 7/1997 |
| JP | 11-015393 | 1/1999 |
| JP | 2002-318564 A | 10/2002 |
| JP | 2003-162904 | 6/2003 |
| WO | WO94/01716 | 1/1994 |
| WO | WO98/04950 | 2/1998 |
| WO | WO99/01696 | 1/1999 |
| WO | WO 00/50807 | 8/2000 |
| WO | WO 03/008860 A1 | 1/2003 |
| WO | WO 03/050448 A1 | 7/2003 |
| WO | WO 03/061329 A2 | 7/2003 |
| WO | WO 2004/019120 A1 | 3/2004 |
| WO | WO 2004/086098 A2 | 10/2004 |
| WO | WO 2005/001892 A2 | 1/2005 |
| WO | WO 2005/062908 A2 | 7/2005 |
| WO | WO 2006/023077 A2 | 3/2006 |
| WO | WO 2006/039315 A2 | 4/2006 |
| WO | 2006/052755 A2 | 5/2006 |

OTHER PUBLICATIONS

Low Temperature Polysilicon TFT Reflective Color LCD by Techno World.
AZ Displays, Inc., Complete LCD Solutions, ATM3224C-NC-FTH.
Sharp Specification No. LCP-03015 for Mobile Liquid Crystal Display Group, Sharp Corporation, Jun. 13, 2003.
Kuang et al., "Dynamic characteristics of shaped micro-actuators solved using the differential quadrature method," Journal of Micromechanics and Microengineering, 14:647-655, (2004).
Li et al., "Drie-Fabricated Curved-Electrode Zipping Actuators with Low Pull-In Voltage," IEEE, 480-483 (2003).
Legtenberg et al., "Electrostatic Curved Electrode Actuators," Journal of Microelectromechanical Systems, 6(3):257-265, (1997).
Perregaux et al., "Arrays of Addressable High-Speed Optical Microshutters," IEEE, 232-235, (2001).
Steyn, Lodewyk, "Electroquasistatic Zipper Actuators: A Technology Review," Dec. 2004.
Tien et al., "MEMS actuators for silicon micro-optical elements," Proc. of SPIE, 4178:256-269, (2000).
Ravnkilde et al, "Fabrication of Nickel Microshutter Arrays for Spatial Light Modulation".
Liu et al, "Scaling Laws of Microactuators and Potential Applications of Electroactive Polymers in MEMS," SPIE, 3669:345-354(Mar. 1999).
Vangbo et al, "A lateral symmetrically bistable buckled beam," J. Micromech. Microeng., 8:29-32(1998).
Shikida et al, "Fabrication fo an S-shaped Microactuator," Journal of Microelectromechanical Systems, 6(1):18-24(Mar. 1997).
Wang et al, "Highly Space-Efficient Electrostatic Zigzag Transmissive Micro-Optic Switches for an Integrated MEMS Optical Display System".
Qui et al, "A High-Current Electrothermal Bistable MEMS Relay".
Qiu et al, "A Curved-Beam Bistable Mechanism," Journal of Microelectromechanical Systems, 13(2):137-145(Apr. 2004).
Yasumura et al, "Fluid Damping of an Electrostatic Actuator for Optical Switching Applications," Transducers Research Foundation (2002).
Feenstra et al, "Electrowetting Displays," Liquavista BV, http://www.liquavista.com/documents/electrowetting_displays_whitepaper.pdf, Retrieved on Aug. 17, 2006.
Lee et al, "P-25: A LCOS Microdisplay Driver with Frame Buffering Pixels," SID 02 Digest, 292-295(2002).
McLaughlin, "Progress in Projection and Large-Area Displays," Proceedings of the IEEE, 90(4):521-532(Apr. 2002).
Sato, "Research on Flexible Display Systems," Broadcast Technology, 21:10-15(2005).
Doane, et al, "Display Technologies in Russia, Ukraine, and Belarus," World Technology Evaluation Center Panel Report (Dec. 1994).
Okumura et al, "Highly-efficient backlight for liquid crystal display having no optical films," Applied Physics Letters, 83(13):2515-2517(Sep. 2003).
Feng et al, "Novel Integrated light-guide plates for liquid crystal display backlight," J. Opt. A: Pure Appl. Opt., 7:111-117(2005).
Funamoto et al, "Diffusive-sheetless Backlight System for Mobile Phone," IDW/AD, 1277-1280(2005).
Kalantar et al, "Optical Micro Deflector Based Functional Light-Guide Plate for Backlight Unit," SID 00 Digest, 1029-1031(2000).
"Optical Design Tools for Backlight Displays," Optical Research Associates, 1-8.
"Two Proprietary Technologies Supporting OMRON Backlight," OMRON Electronics Corporation, OMRON Electronics Components Web, www.omron.co.jp/ecb/products/bklight/english/genri/index.html.
"MicroLens™—Re-Inventing LCD Backlighting," Global Lighting Technologies Inc., http://www.glthome.com/tech.htm, 1-2.
"Prism Brightness Enhancement Films," 3M Corporation, http://products3.3m.com/catalog/us/en001/electronics_mfg/vikuiti/node_V6G78RBQ5Tbe/root_GST1T4S9TCgv/vroot_S6Q2FD9X0Jge/gvel_GD378D0HGJgl/theme_us_vikuiti_3_0/command_AbcPageHandler/output_html Retrieved on Aug. 3, 2006.
"BLU," Heesung Precision Ltd., http://www.hspr.co.kr/eng/product/blu.asp Retrieved on Aug. 3, 2006.
Teijido, J.M., "Conception and Design of Illumination Light Pipes," Thesis No. 1498 for University of Neuchatel, http://www.unige.ch/cyberdocuments/unine/theses2000/TeijidoJM/these_front.htm l:1-99 Retrieved on Aug. 3, 2006.
"Prism Sheet," Mitsubishi Rayon America Inc., http://www.mrany.com/data/HTML/29.htm Retrieved on Aug. 4, 2006.
Yasumura et al, "Fluid Damping of an Electrostatic Actuator for Optical Switching Applications," Transducers Research Foundation (2002).
Underwood, "LCoS through the looking glass," SID(2001).

Clark et al, "FLC Microdisplays," Ferroelectrics, 246:97-110(2000).

Boeuf, "Plasma display panels: physics, recent developments and key issues," J. Phys. D: Appl, Phys., 36:R53-R79(2003).

Hornbeck, "Digital Light Processing™: A New MEMS-Based Display Technology," Texas Instruments.

Yamada et al, "52.2: Invited Paper:Color Sequential LCD Based on OCB with an LED Backlight," SID 00 Digest, 1180-1183(2000).

Jepsen et al, "4.11: 0.9" SXGA Liquid Crystal on Silicon Panel with 450 Hz. Field Rate," MicroDisplay Corporation, 106-109.

Birch et al, "31.1: SXGA Resolution FLC Microdisplays," SID 02 Digest, 954-957(2002).

Koden et al, "Ferroelectric Liquid Crystal Display," (Sep. 17, 1997).

Jones et al, "29-1: Addressing τVmin Ferroelectric Liquid Crystal Displays," (1998).

Akimoto et al, "15.1: A 0.9-in UXGA/HDTV FLC Microdisplay," SID 00 Digest, 194-197(2000).

Bryan-Brown, "Ultra Low Poer Bistable LCDs," SID 00, 76-79(2000).

Hewlett et al, "DLP Cinema™ projection: A hybrid frame-rate technique for flicker-free performance," Journ of the SID 9/3, 221-226(2001).

Underwood, "A review of microdisplay technologies," SID@EID, (Nov. 21 to 23, 2000).

Blackstone, "Making MEMS Reliable," SPIE's OEMagazine, 32-34(Sep. 2002).

Mastrangelo et al, "Mechanical Stability and Adhesion of Microstructures Under Capillary Forces—Part I: Basic Theory," Journal of Microelectromechanical Systems, 2(1):33-43(Mar. 1993).

Mastrangelo et al, "Mechanical Stability and Adhesion of Microstructures Under Capillary Forces—Part II: Experiments," Journal of Microelectromechanical Systems, 2(1):44-55(Mar. 1993).

Johnstone et al, "Theoretical limits on the freestanding length of cantilevers produced by surface micromachining technology," J. Micromech. Microeng. 12:855-861(2002).

Maboudian et al, "Stiction reduction processes for surface micromachines," Tribology Letters, 3:215-221(1997).

"Electronic Display Lighting Tutorials," 3M Corporation, file?//D:/Optical\Vikuiti Tutorial.htm. retrieved on Aug. 10, 2006.

Roosendaal et al, "25.2: A Wide Gamut, High Aperture Mobile Spectrum Sequential Liquid Crystal Display," SID 05 Digest, 1116-1119(2005).

Feng, "High Quality Light Guide Plates that Can Control the Illumination Angle Based on Microprism Structures," Applied Physics Letters, 85(24):6016-6018(Dec. 2004).

Tagaya et al, "Thin Liquid-Crystal Display Backlight System with Highly Scattering Optical Transmission Polymers," Applied Optics, 40(34):6274-6280(Dec. 2001).

Davis, "Light Emitting Diode Source Modeling for Optical Design," Reflexite Display Optics(Oct. 2004).

Foley, "NE04-21: Microstructured Plastic Optics for Display, Lighting, and Telecommunications Applications," Fresnel Optics(2001).

"Microprism Technology for Liminaires," Reflexite Display Optics.

Davis, "Microstructured Optics for LED Applications," Reflexite Display Optics.

Alt et al, "A Gray-Scale Addressing Technique for Thin-Film-Transistor/Liquid Crystal Displays," IBM J. Res. Develop., 36(1):11-22(Jan. 1992).

Takatori et al, "6.3: Field-Sequential Smectic LCD with TFT Pixel Amplifier," SID 01 Digest, 48-51(2001).

Hartman, "4.1: Invited paper: Two-Terminal Devices Technologies for AMLCDs," SID 95 Digest, 7-10(1995).

Bozler et al, "Arrays of gated field-emitter cones having 0.32 μm tip-to-tip spacing," J. Vec. Sci. Technol. B, 12(2):629-632(Mar./Apr. 1994).

Goddhue et al, "Bright-field analysis of field-emission cones using high-resolution tranmission electron microscopy and the effect of structural properties on current stability," J. Vac. Sci. Technol. B, 12(2):693-696(Mar.Apr. 1994).

Liang et al, "Observation of electric field gradients near field-emission cathode arrays," Appl Phys. Lett., 66(9):1147-1149(Feb. 1995).

Kalantar, "Modulation of viewing angle on an LCD surface through backlight optics," Journal of the SID, 11(4):647-652(2003).

den Boer, "Active Matrix Liquid Crystal Displays," Elsevier Science & Technology Books, ISBN #0750678135, Aug. 2005.

US 7,304,786 B2

METHODS AND APPARATUS FOR BI-STABLE ACTUATION OF DISPLAYS

CROSS-REFERENCE TO RELATED APPLICATIONS

This application is a continuation in part of U.S. patent application Ser. No. 11/218,690, filed Sep. 2, 2005. This application claims priority to, and the benefit of, U.S. Provisional Patent Application No. 60/676,053, entitled "MEMS Based Optical Display" and filed on Apr. 29, 2005; and U.S. Provisional Patent Application No. 60/655,827, entitled MEMS Based Optical Display Modules" and filed on Feb. 23, 2005. All three applications are incorporated herein by reference.

FIELD OF THE INVENTION

In general, the invention relates to the field of video displays, in particular, the invention relates to mechanically actuated display apparatus.

BACKGROUND OF THE INVENTION

Displays built from mechanical light modulators are an attractive alternative to displays based on liquid crystal technology. Mechanical light modulators are fast enough to display video content with good viewing angles and with a wide range of color and grey scale. Mechanical light modulators have been successful in projection display applications. Backlit displays using mechanical light modulators have not yet demonstrated sufficiently attractive combinations of brightness and low power. There is a need in the art for fast, bright, low-powered mechanically actuated displays. Specifically there is a need for mechanically actuated displays that include bi-stable mechanisms and that can be driven at low voltages for reduced power consumption.

SUMMARY OF THE INVENTION

In one aspect, the invention relates to displays built from mechanical actuators which incorporate two compliant electrodes. The actuators may be controlled by passive or active matrix arrays coupling controllable voltage sources to the voltage inputs of the mechanical actuators.

The compliant electrodes in each actuator are positioned proximate to one another, such that in response to the application of a voltage across the electrodes, the electrodes are drawn together. The electrodes may be drawn together directly or progressively. At least one of the electrodes couples to a modulator which contributes to the formation of an image. According to one feature of the invention, at least a majority of the lengths of the electrodes are compliant. The electrodes may be about 0.5 μm to about 5 μm wide. In one implementation, the height of the electrodes is at least about 1.4 times the width of the electrodes. The electrodes may also be coated, at least in part with an insulator, preferably having a dielectric constant of about 1.5 or greater.

The modulator may be, for example, a shutter, a deformable mirror, a color filter, or a set of three color filters. Shutters move substantially in a plane parallel to a surface over which they are supported. The surface may have one or more apertures allowing the passage of light through the surface. The apertures may be patterned through a reflective film disposed on a substantially transparent glass or plastic substrate. If the surface has more than one aperture, the shutter includes a corresponding number of shutter apertures. By moving the shutter, the display apparatus can selectively interact with light in an optical path passing through the apertures in the surface by either blocking reflecting, absorbing, polarizing, diffracting and/or filtering the light. In various embodiments, the shutter may also be coated with a reflective or light absorbing film.

In one embodiment, one end of each electrode is anchored to the surface and the other end is free to move. In this embodiment, the modulator couples to the free end of one of the electrodes. The width of the electrode may be constant along its length, or it may vary. For example, it may become thinner closer to the modulator. Alternatively, the electrode may have thinner sections and thicker sections at multiple locations along the length of the electrode. The varying thicknesses provide for varying electrode stiffnesses. The embodiment may include an optional feature of including a third compliant electrode. The compliant electrodes not coupled to the modulator act separately as open and close drive electrodes. One or both of the drive electrodes may be curved in its natural, deactivated state. In some implementations, the drive electrodes have a first or second order curve. In other implementations, the drive electrodes have a greater than second order curve.

In another embodiment of the shutter assembly, a shutter couples to a pair of actuators at about the linear center of one side of the modulator. The actuators each include two compliant electrodes. A first compliant electrode of each actuator couples to the shutter with a spring. The first compliant electrode may also couple to the anchor with a spring. The other ends of the compliant electrodes couple to anchors, thereby connecting the shutter to two locations on a substrate. The electrodes serve as mechanical supports providing supportive connections from locations on the shutter to the substrate. A separate elastic member, such as a return spring, may couple to an opposite side of the shutter, providing an additional supportive connection for the shutter. Alternatively, a second pair of actuators may couple to the opposite side of the shutter instead of the return spring. The multiple supportive connections help reduce rotation or other movement of the shutter out of its intended plane of motion.

In a second aspect of the invention, the display apparatus includes a mechanically bi-stable shutter assembly to form an image. A mechanically bi-stable shutter assembly includes a shutter, a voltage input for receiving an actuation potential and an actuator that moves a shutter over a substrate between two mechanically stable positions. In one embodiment, the work needed to move the shutter from its first mechanically stable position to its second mechanically stable position is greater than the work need to return the shutter to its first mechanically stable position. In another embodiment, the amount of work needed to move the shutter from its first mechanically stable position to its second mechanically stable position is substantially equal to the work needed to return the shutter to its first mechanically stable position.

According to one feature of the invention, the mechanically stable positions of the shutter are provided by the state, including the position or shape, of a mechanically compliant member. In one embodiment, the mechanically compliant member is part of the actuator. In other embodiments, the mechanically compliant member is outside of the actuator. The mechanically compliant member has a first mechanically stable state in a first of the shutter's mechanically stable positions and a second mechanically stable state in the second of the shutter's mechanically stable position. Moving the shutter from the first mechanically stable position to the second mechanically stable position requires the deformation of the compliant member.

For example, the compliant member may be a curved compliant beam. When the shutter is in the first stable position, the beam has a first curvature. The beam has a second curvature when the shutter is in the second position. The curvature may be generally "s" shaped or it may form a cosine shaped bow. In the first shutter position, the beam may bow in one direction. In transitioning to the second shutter position, the beam is deformed such that bows in an opposite direction.

Alternatively, the compliant beam may be straight while the shutter is in one of its mechanically stable position. The compliant beam forms a first angle with the shutter in the first mechanically stable shutter position. In the second position, the compliant beam forms a different angle with the shutter.

The shutter assembly may also include a second compliant member. The first and second compliant members, in one embodiment, serve as electrodes in a dual compliant beam electrode actuator. One or both beams may have two mechanically stable states. Upon application of a voltage across the compliant members, one of the compliant members deforms from one position to a second position. The voltage may result from an actuation potential being applied to one of the compliant members from one or more anchors coupled to one or both ends of the compliant member. For example, in the first position, the first compliant electrodes bows away from the second compliant electrode. In the second position, the first compliant electrode bows towards the second compliant electrode, having a substantially similar bow as the second compliant electrode. In other implementations, the first and second compliant beams form part of an thermoelectric actuator coupled to the shutter for moving it between the first and second stable positions. Regardless of the type of actuator moving the shutter, to move the shutter, a force must be applied to either the first or second compliant member.

In some embodiments, the first and second compliant member shapes are themselves mechanically stable.

The shutter assembly, in one implementation, includes a second actuator coupled to the shutter. The two actuators couple to the shutter in different locations on the shutter. According to one implementation, the actuators couple to opposite sides of the shutter, at about the middle of the sides. Compliant members in the actuators provide supportive connections for the shutter from two shutter locations to two substrate locations. According to another optional feature, at least one of the compliant members coupled to the shutter couples to two anchors, one on either end the compliant member.

In still other embodiments, the compliant members are incorporated into a stabilizer which provides the mechanical stability for the mechanically stable shutter positions. The compliant members in a stabilizer may be connected to one another. In such an embodiment, the stabilizer may provide for a third mechanically stable shutter position. The shutter is driven into the third mechanically stable shutter position in response to an application of a second actuation voltage to the voltage input. Alternatively, the compliant beams may form a stabilizer by coupling to anchors on either side of the shutter to sides of the shutter. The compliant members may include compliant or rigid beams. If the compliant members include rigid beams, the compliant members include additional compliant joints between the rigid beams to provide a degree of compliance.

Additional features of the various display apparatus include the incorporation of a working fluid among the compliant members. The working fluid preferably has a dielectric constant of at least about 1.5. The display apparatus may also include a backlight for illuminating the image.

In another aspect, the invention relates to a method of manufacturing a display apparatus. The method includes patterning a first surface to form a modulator for selectively interacting with light in an optical path. An actuator is then fabricated in the first surface connecting the modulator and an anchor. The anchor and the actuator serve as a first mechanical support, physically supporting the modulator over a second surface. The actuator is configured to drive the shutter in a plane substantially parallel to the second surface. The method further includes fabricating a second mechanical support into first surface connecting the modulator and a second anchor. The second mechanical support physically supports the modulator over the second surface. The first anchor and the second anchor are connected to two distinct locations on the second surface.

In another aspect, the invention relates to a method of forming an image. The method includes selectively applying an actuation potential to a voltage input of a shutter assembly. A shutter is moved in a plane substantially parallel to a surface, in response to the application of the actuation voltage. The shutter is moved from a first mechanically stable position to a second mechanically stable position, thereby permitting light to contribute to the formation of an image.

In still a further aspect, the invention relates to a method of forming an image on a display. The method includes selecting a light modulator and providing an actuator. The actuator includes two mechanically compliant electrodes positioned proximate to one another, at least one of which couples to a shutter. The actuator is activated by generating a voltage between the two mechanically compliant electrodes. As a result, the compliant electrodes deform as they are drawn closer together. In addition, the activation of the actuator results in movement of the shutter into or out of an optical path to affect the illumination of a pixel in the image.

BRIEF DESCRIPTION OF THE DRAWINGS

The system and methods may be better understood from the following illustrative description with reference to the following drawings in which.

DESCRIPTION OF CERTAIN ILLUSTRATIVE EMBODIMENTS

Figure 1:
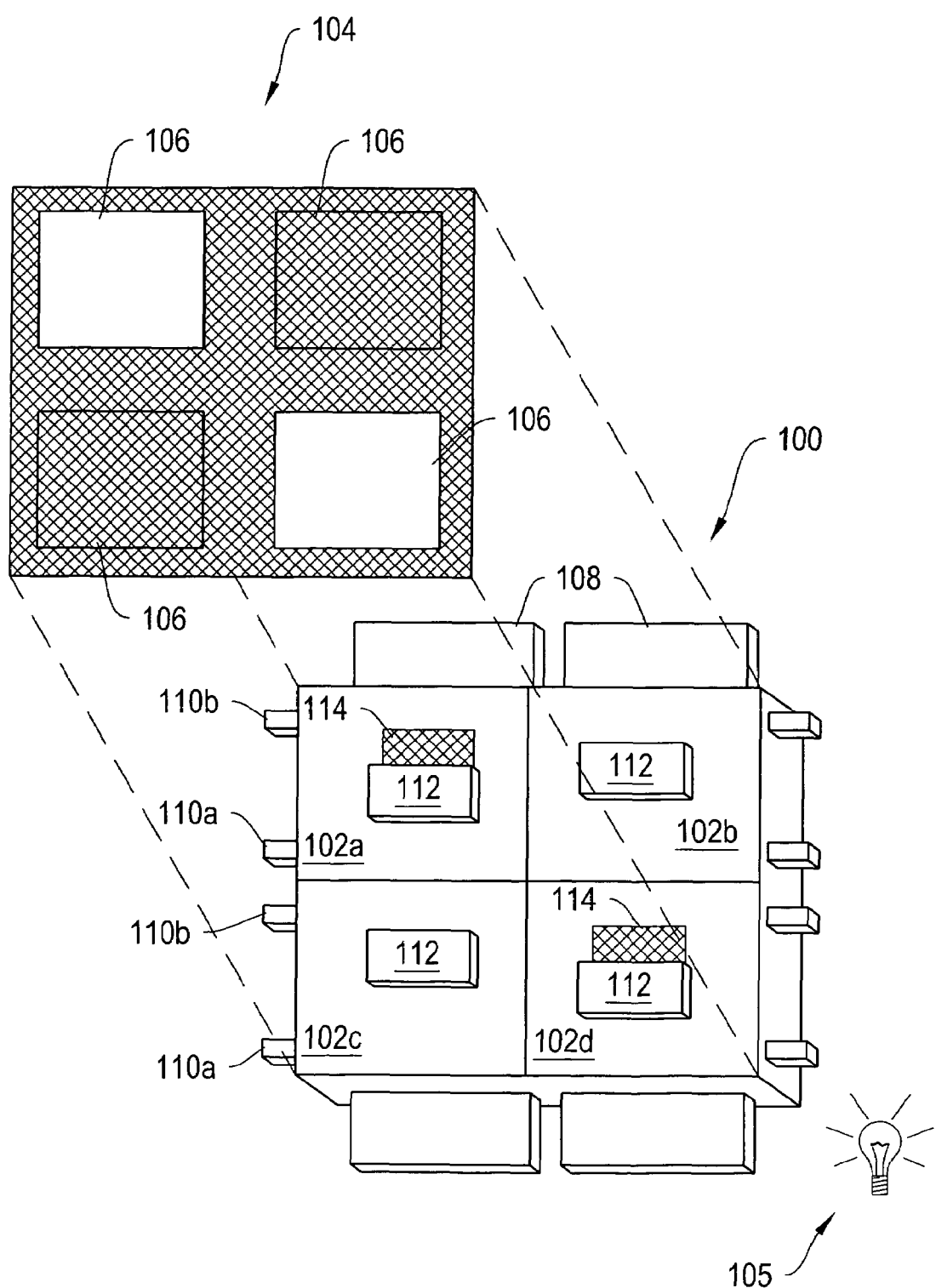
FIG. 1 is conceptual isometric view of a display apparatus, according to an illustrative embodiment of the invention.

FIG. 1A is an isometric view of a display apparatus 100, according to an illustrative embodiment of the invention. The display apparatus 100 includes a plurality of light modulators, in particular, a plurality of shutter assemblies 102a-100d (generally "shutter assemblies 102") arranged in rows and columns. In general, a shutter assembly 102 has two states, open and closed (although partial openings can be employed to impart grey scale). Shutter assemblies 102a and 100d are in the open state, allowing light to pass. Shutter assemblies 102b and 100c are in the closed state, obstructing the passage of light. By selectively setting the states of the shutter assemblies 102a-100d, the display apparatus 100 can be utilized to form an image 104 for a projection or backlit display, if illuminated by lamp 105. In another implementation the apparatus 100 may form an image by reflection of ambient light originating from the front of the apparatus. In the display apparatus 100, each shutter assembly 102 corresponds to a pixel 106 in the image 104.

Each shutter assembly 102 includes a shutter 112 and an aperture 114. To illuminate a pixel 106 in the image 104, the shutter 112 is positioned such that it allows light to pass, without any significant obstruction, through, the aperture 114 towards a viewer. To keep a pixel 106 unlit, the shutter 112 is positioned such that it obstructs the passage of light through the aperture 114. The aperture 114 is defined by an opening patterned through a reflective or light-absorbing material in each shutter assembly 102.

In alternative implementations, a display apparatus 100 includes multiple shutter assemblies 102 for each pixel 106. For example, the display apparatus 100 may include three color-specific shutter assemblies 102. By selectively opening one or more of the color-specific shutter assemblies 102 corresponding to a particular pixel 106, the display apparatus 100 can generate a color pixel 106 in the image 104. In another example, the display apparatus 100 includes two or more shutter assemblies 102 per pixel 106 to provide grayscale in an image 104. In still other implementations, the display apparatus 100 may include other forms of light modulators, such as micromirrors, filters, polarizers, interferometric devices, and other suitable devices, instead of shutter assemblies 102 to modulate light to form an image.

The shutter assemblies 102 of the display apparatus 100 are formed using standard micromachining techniques known in the art, including lithography; etching techniques, such as wet chemical, dry, and photoresist removal; thermal oxidation of silicon; electroplating and electroless plating; diffusion processes, such as boron, phosphorus, arsenic, and antimony diffusion; ion implantation; film deposition, such as evaporation (filament, electron beam, flash, and shadowing and step coverage), sputtering, chemical vapor deposition (CVD), plasma enhanced CVD, epitaxy (vapor phase, liquid phase, and molecular beam), electroplating, screen printing, and lamination. See generally Jaeger, Introduction to Microelectronic Fabrication (Addison-Wesley Publishing Co., Reading Mass. 1988); Runyan, et al., Semiconductor Integrated Circuit Processing Technology (Addison-Wesley Publishing Co., Reading Mass. 1990); Proceedings of the IEEE Micro Electro Mechanical Systems Conference 1987-1998; Rai-Choudhury, ed., Handbook of Microlithography, Micromachining & Microfabrication (SPIE Optical Engineering Press, Bellingham, Wash. 1997).

More specifically, multiple layers of material (typically alternating between metals and dielectrics) are deposited on top of a substrate forming a stack. After one or more layers of material are added to the stack, patterns are applied to a top most layer of the stack marking material either to be removed from, or to remain on, the stack. Various etching techniques, including wet or dry etches or reactive ion etching, are then applied to the patterned stack to remove unwanted material. The etch process may remove material from one or more layers of the stack based on the chemistry of the etch, the layers in the stack, and the amount of time the etch is applied. The manufacturing process may include multiple iterations of layering, patterning, and etching.

In one implementation the shutter assemblies 102 are fabricated upon a transparent glass or plastic substrate. This substrate may be made an integral part of a backlight which acts to evenly distribute the illumination from lamp 105 before the light exits through apertures 114. Alternatively and optionally the transparent substrate may be placed on top of a planar light guide, wherein the array of shutter assemblies 102 act as light modulation elements in the formation of an image. In one implementation the shutter assemblies 102 are fabricated in conjunction with or subsequent to the fabrication of a thin film transistor (TFT) array on the same glass or plastic substrate. The TFT array provides a switching matrix for distribution of electrical signals to the shutter assemblies.

The process also includes a release step. To provide freedom for parts to move in the resulting device, sacrificial material is interdisposed in the stack proximate to material that will form moving parts in the completed device. An etch removes much of the sacrificial material, thereby freeing the parts to move.

After release, one or more of the surfaces of the shutter assembly may be insulated so that charge does not transfer between moving parts upon contact. This can be accomplished by thermal oxidation and/or by conformal chemical vapor deposition of an insulator such as Al2O3, Cr2O3, TiO2, TiSiO4, HfO2, HfSiO4, V2O5, Nb2O5, Ta2O5, SiO2, or Si3N4 or by depositing similar materials using techniques such as atomic layer deposition and others. The insulated surfaces are chemically passivated to prevent problems such as stiction between surfaces in contact by chemical conversion processes such as fluoridation, silanization, or hydrogenation of the insulated surfaces.

Dual compliant electrode actuators make up one suitable class of actuators for driving the shutters 112 in the shutter assemblies 102. A dual compliant beam electrode actuator, in general, is formed from two or more at least partially compliant beams. At least two of the beams serve as electrodes (also referred to herein as "beam electrodes"). In response to applying a voltage across the beam electrodes, the beams electrodes are attracted to one another from the resultant electrostatic forces. Both beams in a dual compliant beam electrode are, at least in part, compliant. That is, at least some portion of each of the beams can flex and or bend to aid in the beams being brought together. In some implementations the compliance is achieved by the inclusion of flexures or pin joints. Some portion of the beams may be substantially rigid or fixed in place. Preferably, at least the majority of the length of the beams are compliant.

Dual compliant electrode actuators have advantages over other actuators known in the art. Electrostatic comb drives are well suited for actuating over relatively long distances, but can generate only relatively weak forces. Parallel plate or parallel beam actuators can generate relatively large forces but require small gaps between the parallel plates or beams and therefore only actuate over relatively small distances. R. Legtenberg et. al. (*Journal of Microelectromechanical Systems* v.6, p. 257, 1997) demonstrated how the use of curved electrode actuators can generate relatively large forces and result in relatively large displacements. The voltages required to initiate actuation in Legtenberg, however, are still substantial. As shown herein such voltages can be reduced by allowing for the movement or flexure of both electrodes.

In a dual compliant beam electrode actuator-based shutter assembly, a shutter is coupled to at least one beam of a dual compliant beam electrode actuator. As one of the beams in the actuator is pulled towards the other, the pulled beam moves the shutter, too. In doing so, the shutter is moved from a first position to a second position. In one of the positions, the shutter interacts with light in an optical path by, for example, and without limitation, blocking, reflecting, absorbing, filtering, polarizing, diffracting, or otherwise altering a property or path of the light. The shutter may be coated with a reflective or light absorbing film to improve its interferential properties. In the second position, the shutter allows the light to pass by, relatively unobstructed.

Figure 2A:
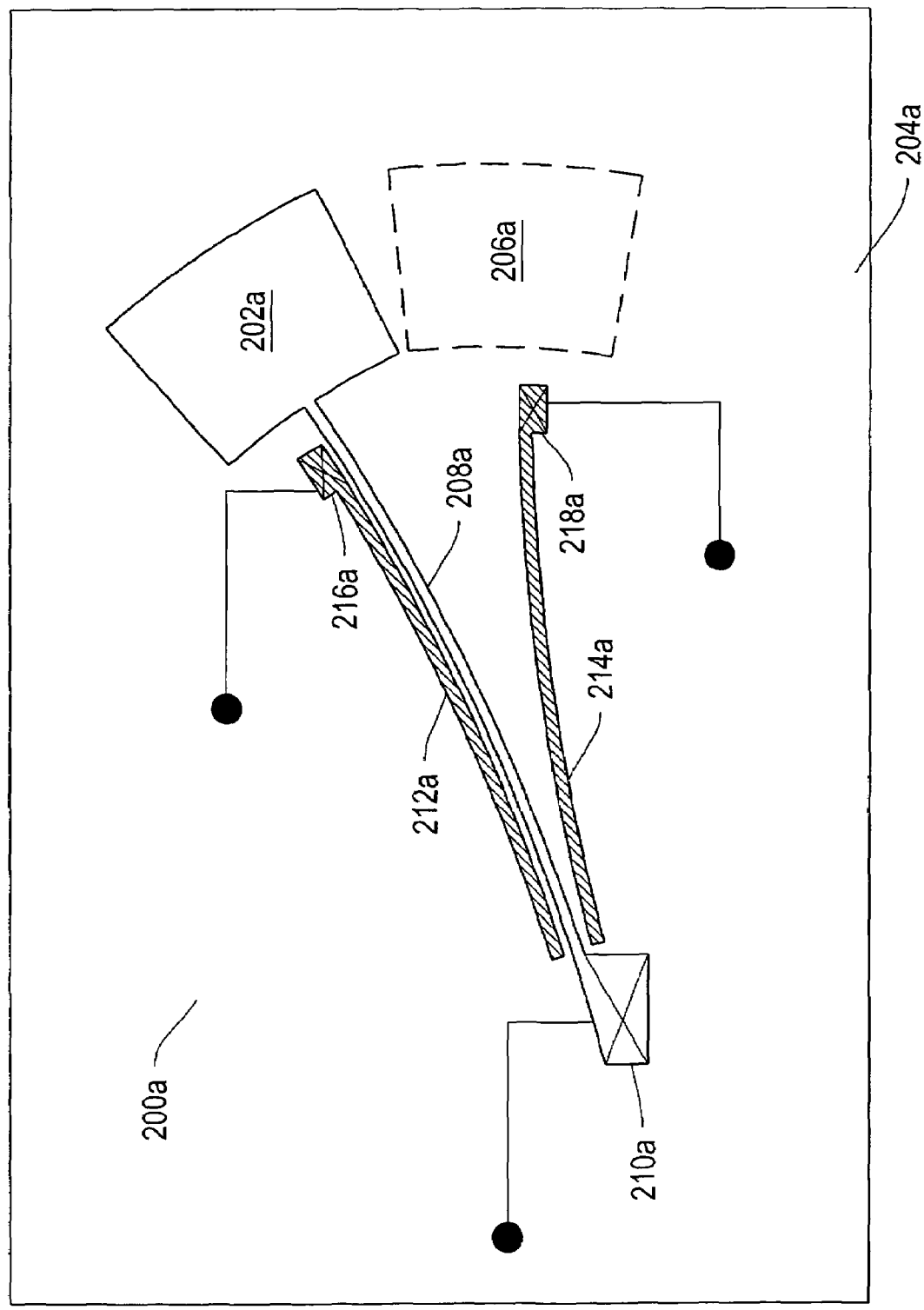
FIGS. 2A-2B are top views of dual compliant beam electrode actuator-based shutter assemblies for use in a display apparatus, according to an illustrative embodiment of the invention.
Figure 2B:
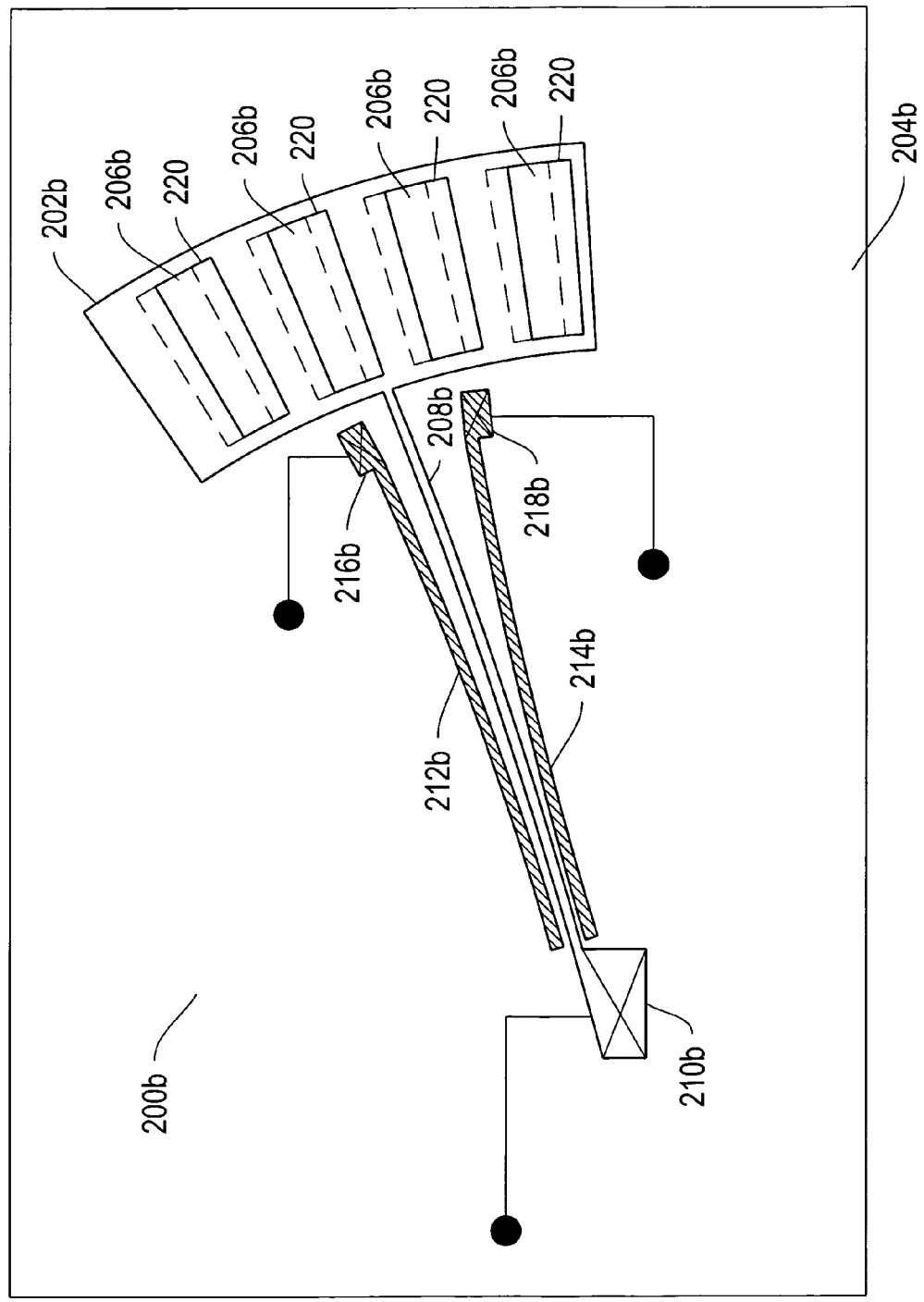

FIGS. 2A and 2B are diagrams of two embodiments of cantilever dual compliant beam electrode actuator based-shutter assemblies for use in a display apparatus, such as display apparatus 100. More particularly, FIG. 2A depicts a cantilever dual compliant beam electrode actuator-based shutter assembly 200a ("shutter assembly 200a"). The shutter assembly 200a modulates light to form an image by controllably moving a shutter 202a in and out of an optical path of light. In one embodiment, the optical path begins behind a surface 204a, to which the shutter 202a is attached. The surface 204a is illustrated as dashed boundary line. The dashed line indicates that the surface 204a extends beyond the space delimited by the boundary line. Similar dashed boundary lines are used in other figures to indicate the same. The light passes through an aperture 206a in the surface 204a towards a viewer or towards a display screen. In another embodiment, the optical path begins in front of the surface 204a and is reflected back to the viewer from the surface of the aperture 206a.

The shutter 202a of the shutter assembly 200a is formed from a solid, substantially planar, body. The shutter 202a can take virtually any shape, either regular or irregular, such that in a closed position the shutter 202a sufficiently obstructs the optical path through the aperture 206a in the surface 204a. In addition, the shutter 202a must have a width consistent with the width of the aperture, that, in the open position (as depicted), sufficient light can pass through the aperture 206a in the surface 204a to illuminate a pixel, or contribute to the illumination of a pixel, in the display apparatus.

The shutter 202a couples to one end of a load beam 208a. A load anchor 210a, at the opposite end of the load beam 208a physically connects the load beam 208a to the surface 204a and electrically connects the load beam 208a to driver circuitry in the surface 204a. Together, the load 208a beam and load anchor 210a serve as a mechanical support for supporting the shutter 202a over the surface 204a.

The shutter assembly 200a includes a pair of drive beams 212a and 214a, one located along either side of the load beam 210a. Together, the drive beams 212a and 214a and the load beam 210a form an actuator. One drive beam 212a serves as a shutter open electrode and the other drive beam 214a serves as a shutter close electrode. Drive anchors 216a and 218a located at the ends of the drive beams 212a and 214a closest to the shutter 202a physically and electrically connects each drive beam 212a and 214a to the surface 204a. In this embodiment, the other ends and most of the lengths of the drive beams 212a and 214a remain unanchored or free. The free ends of the drive beams 212a and 214a are closer to the anchored end of the load beam 208a than the anchored ends of the drive beams 212a and 214a are to shutter end of the load beam 208a.

The load beam 208a and the drive beams 212a and 214a are compliant. That is, they have sufficient flexibility and resiliency that they can be bent out of their unstressed ("rest") position or shape to at least some useful degree, without fatigue or fracture. As the load beam 208a and the drive beams 212a and 214a are anchored only at one end, the majority of the lengths of the beams 208a, 212a, and 214a is free to move, bend, flex, or deform in response to an applied force. The operation of the cantilever dual compliant beam electrode actuator based-shutter assembly 200a is discussed further below in relation to FIG. 3.

FIG. 2B is a second illustrative embodiment of a cantilever dual compliant beam electrode actuator-based shutter assembly 200b (shutter assembly 200b). Like the shutter assembly 200a, the shutter assembly 200b includes a shutter 202b, coupled to a load beam 208b, and two drive beams 212b and 214b. The shutter 202b is positioned in between its fully open position and its fully closed position. The load beam 208b and the drive beams 212b and 214b, together, form an actuator. Drive anchors 210b, 216b and 218b, coupled to each end of the beams connect the beams to a surface 204b. In contrast to the shutter assembly 200a, the shutter of shutter assembly 200b includes several shutter apertures 220, in the form of slots. The surface 204b, instead of only having one aperture, includes one surface aperture 206b corresponding to each shutter aperture 220. In the open position, the shutter apertures 220 substantially align with the apertures 206b in the surface 204b, allowing light to pass through the shutter 202b. In the closed position, the surface apertures 206b are obstructed by the remainder of the shutter 202b, thereby preventing the passage of light.

Changing the state of a shutter assembly that includes multiple shutter apertures with a corresponding number of surface apertures requires less shutter movement than changing the state of a shutter assembly incorporating a solid shutter and single surface aperture, while still providing for the same aperture area. Reduced required motion corresponds to lower required actuation voltage. More particularly, a decrease in required motion by ⅓ reduces the necessary actuation voltage of the actuator by a factor of about ⅓. Reduced actuation voltage further corresponds to reduced power consumption. Since the total aperture area for either shutter assembly is about the same, each shutter assembly provides a substantially similar brightness.

In other implementations, the shutter apertures and corresponding surface apertures have shapes other than slots. The apertures may be circular, polygonal or irregular. In alternative implementations, the shutter may include more shutter apertures than there are surface apertures in the shutter assembly. In such implementations, one or more of the shutter apertures may be serve as a filter, such as color filter. For example, the shutter assembly may have three shutter apertures for every surface aperture, each shutter aperture including a red, blue, or green colored filter.

Figure 3A:
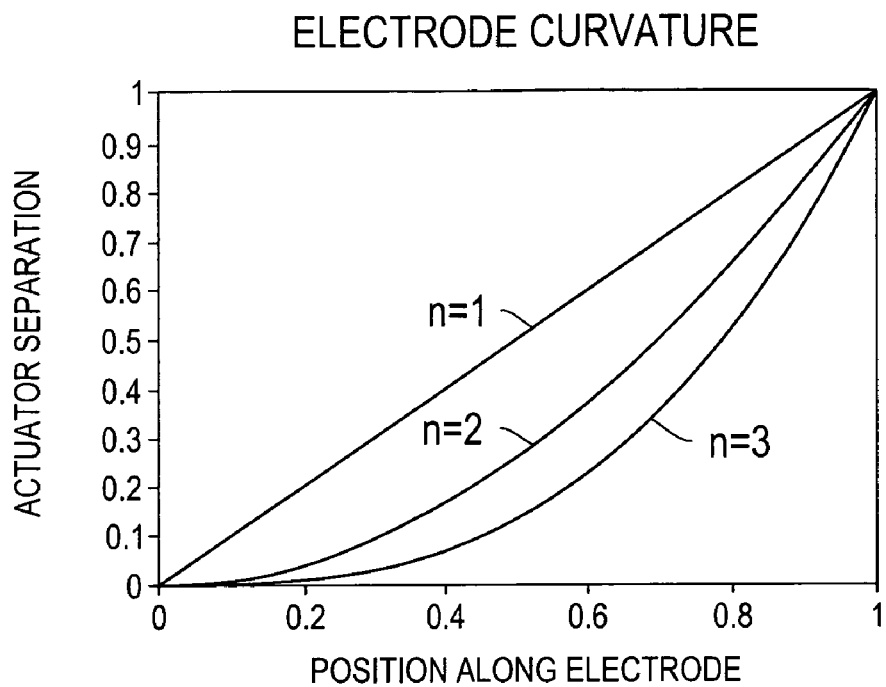
FIG. 3A is a diagram illustrating various compliant electrode shapes suitable for inclusion in dual compliant electrode actuator-based shutter assemblies.
Figure 3B:
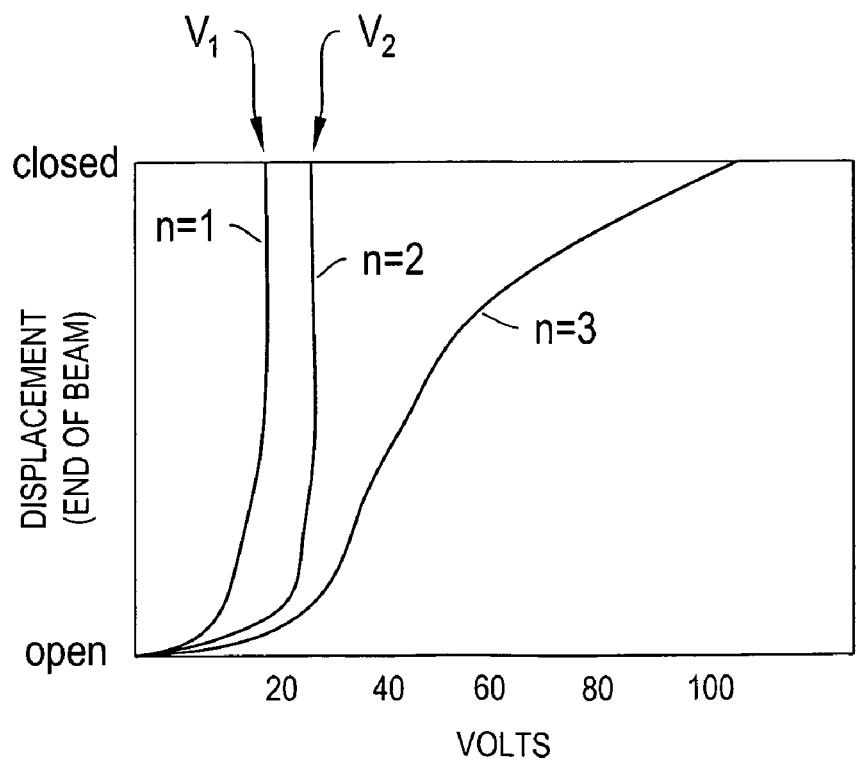
FIG. 3B is a diagram illustrating the incremental energy needed to move dual compliant electrode actuator-based shutter assemblies having the shapes illustrated in FIG. 3A.

FIGS. 3A and 3B are diagrams illustrating the relationship between the, displacement at the end of the load beam and the relative voltage needed to move the load beam closer to the drive beam. The displacement that can be achieved at any given voltage depends, at least in part, on the curvature or shape of the drive beam, or more precisely, on how the separation, d, and the bending stress along the drive beam and the load beam varies as a function of position x along the load beam A separation function d(x), shown in FIG. 3A can be generalized to the form of $d=ax^n$, where y is the distance between the beams. For example, if n=1, the distance between drive electrode and load electrode increase linearly along the length of the load electrode. If n=2, the distance increases parabolically. In general, assuming a constant voltage, as the distance between the compliant electrodes decreases, the electrostatic force at any point on the beams increases proportional to 1/d. At the same time, however, any deformation of the load beam which might decrease the separation distance may also results in a higher stress state in the beam. Below a minimum threshold voltage a limit of deformation will be reached at which any electrical energy released by a closer approach of the electrodes is exactly balanced by the energy which becomes stored in the deformation energy of the beams.

As indicated in the diagram 3B, for actuators having separation functions in which n is less than or equal to 2, the application of a minimum actuation voltage ($V_2$) results in a cascading attraction of the load beam to the drive beam without requiring the application of a higher voltage. For such actuators, the incremental increase in electrostatic force on the beams resulting from the load beam getting closer to the drive beam is greater than the incremental increase in stress on the beams needed for further displacement of the beams.

For actuators having separation functions in which x is greater than 2, the application of a particular voltage results in a distinct partial displacement of the load electrode. That is, the incremental increase in electrostatic force on the beams resulting from a particular decrease in separation between the beams, at some point, fails to exceed the incremental deformation force needed to be imparted on the load beam to continue reducing the separation. Thus, for actuators having separation functions having n greater than 2, the application of a first voltage level results in a first corresponding displacement of the load electrode. A higher voltage results in a greater corresponding displacement of the load electrode. How the shapes and relative compliance of thin beam electrodes effects actuation voltage is discussed in more detail in the following references: (R. Legtenberg et. al., *Journal of Microelectromechanical Systems* v.6, p. 257 (1997) and J. Li et. al. *Transducers '03, The 12$^{th}$ International Conference on Solid State Sensors, Actuators, and Microsystems*, p. 480 (2003) each of which is incorporated herein by reference Referring back to FIGS. 2A and 2B, a display apparatus incorporating the shutter assemblies 202a and 202b actuates, i.e., changes the position of the shutter assemblies 202a and 202b, by applying an electric potential, from a controllable voltage source, to one of the drive beams 212a, 212b, 214a, or 214b via its corresponding drive anchor 216a, 216b, 218a, or 218b, with the load beam 208a or 208b being electrically coupled to ground, resulting in a voltage across the beams 208a, 208b, 212a, 212b, 214a, 214b. The controllable voltage source, such as an active matrix array driver, is electrically coupled to load beam 208a or 208b via an active matrix array (see FIGS. 9 and 10 below). The display apparatus may instead apply an potential to the load beam 208a or 208b via the load anchor 210a or 210b of the shutter assembly 202a or 202b to increase the voltage. An electrical potential difference between the drive beams and the load beams, regardless of sign or ground potential, will generate an electrostatic force between the beams.

With reference back to FIG. 3, the shutter assembly 200a of FIG. 2A has a second order separation function (i.e., n=2). Thus, if the voltage or potential difference between the beams 208a and 212a or 214a of the shutter assembly 202a at their point of least separation exceeds the minimum actuation voltage ($V_2$) the deformation of the beams 208a and 212a or 214a cascades down the entire lengths of the beams 208a and 212a or 214a, pulling the shutter end of the load beam 208a towards the anchored end of the drive beam 212a or 214a. The motion of the load beam 208a displaces the shutter 202a such that it changes its position from either open to closed, or visa versa, depending on to which drive beam 212a or 214a the display apparatus applied the potential. To reverse the position change, the display apparatus ceases application of the potential to the energized drive beam 212a or 214a. Upon the display apparatus ceasing to apply the potential, energy stored in the form of stress on the deformed load beam 208a restores the load beam 208a to its original or rest position. To increase the speed of the restoration and to reduce any oscillation about the rest position of the load beam 208a, the display apparatus may return the shutter 202a to its prior position by applying an electric potential to the opposing drive beam 212a or 214a.

This shutter assemblies 200a and 200b, as well as shutter assemblies 500 (see FIG. 5 below), 600 (see FIG. 6 below), 700 (see FIG. 7 below) and 800 (see FIG. 8 below) have the property of being electrically bi-stable. Generally, this is understood to encompass, although not be limited to, devices wherein the electrical potential $V_2$ that initiates movement between open and closed states is generally greater than the electrical potential ($V_1$) required to keep the shutter assembly in a stable state. Once the load beam 208a and one of the drive beams are in contact, a substantially greater electrical force is to be applied from the opposing drive beam to move or separate the load beam, such electrical force being greater than would be necessary if the load beam 208a were to begin in a neutral or non-contact position. The bistable devices described herein may employ a passive matrix driving scheme for the operation of an array of shutter assemblies such as 200a. In a passive matrix driving sequence it is possible to preserve an image by maintaining a stabilization voltage $V_1$ across all shutter assemblies (except those that are being actively driven to a state change). With no or substantially no electrical power required, maintenance of a potential $V_1$ between the load beam 208a and drive beam 212a or 214a is sufficient to maintain the shutter assembly in either its open or closed states. In order to effect a switching event the voltage between load beam 208a and the previously affected drive beam (for instance 212a) is allowed to return from $V_1$ to zero while the voltage between the load beam 208a and the opposing beam (for instance 212b) is brought up to the switching voltage $V_2$.

In FIG. 2B, the actuator has a third order separation function (i.e., n=3). Thus applying a particular potential to one of the drive beams 212b or 214b results in an incremental displacement of the shutter 202b. The display apparatus takes advantage of the ability to incrementally displace the shutter 202b to generate a grayscale image. For example, the application of a first potential to a drive beam 212 or 214b displaces the shutter 202b to its illustrated position, partially obstructing light passing through the surface apertures 206b, but still allowing some light to pass through the shutter 202b. The application of other potentials results in other shutter 202b positions, including fully open, fully closed, and other intermediate positions between fully open and fully closed. In such fashion electrically analog drive circuitry may be employed in order to achieve an analog grayscale image.

Figure 3C:
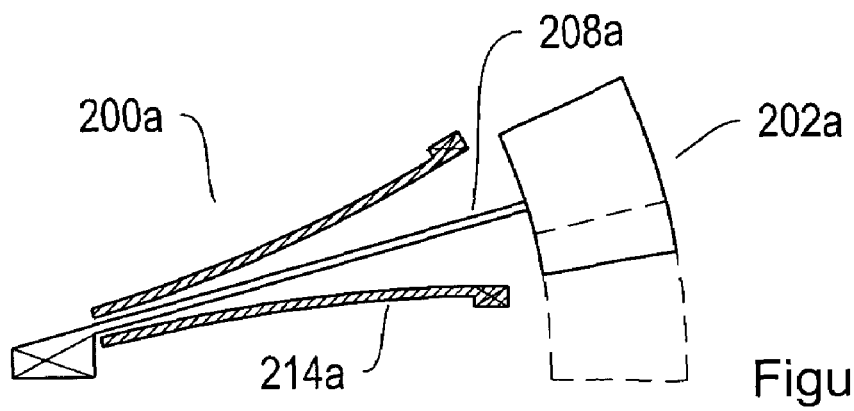
FIGS. 3C-3F are top views of the compliant beam electrode actuator-based shutter assembly of FIG. 2A in various stages of actuation.

FIGS. 3C through 3F demonstrate the stages of motion of the load beam 208a, the shutter close electrode 214a, and the shutter 202a of the shutter assembly 200a of FIG. 2A. The initial separation between the compliant beams 208a and 214a fits a second order separation function. FIG. 3C shows the load beam 208a in a neutral position with no voltage applied. The aperture 206a is half-covered by the shutter 212a.

Figure 3D:
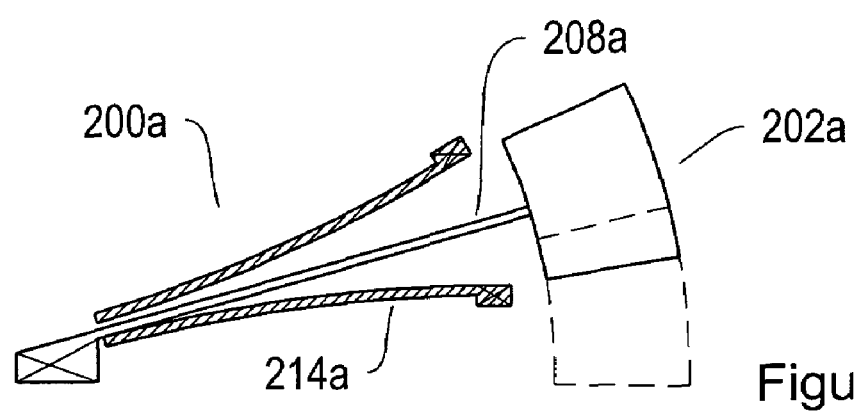

FIG. 3D demonstrates the initial steps of actuation. A small voltage is applied between the load beam 208a and the shutter close electrode 214a. The free end of the shutter close electrode 214a has moved to make contact with the load beam 208a.

Figure 3E:
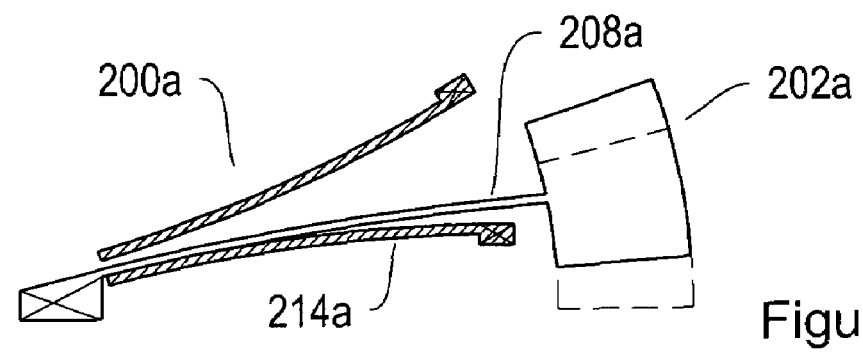

FIG. 3E shows the shutter assembly 200a at a point of actuation after the shutter 212 begins to move towards the shutter close electrode 214a.

Figure 3F:
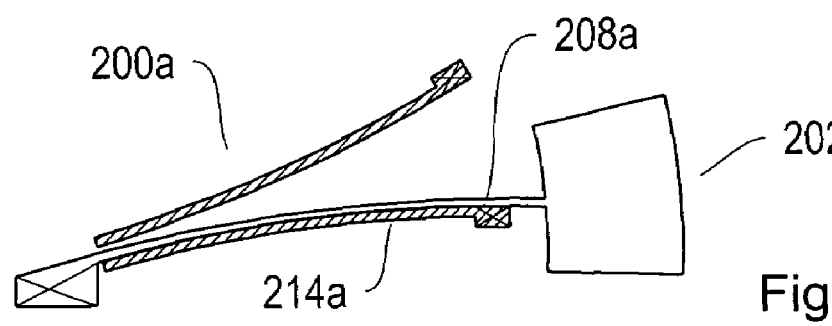

FIG. 3F shows the end state of actuation of the shutter assembly 200a. The voltage has exceeded the threshold for actuation. The shutter assembly 200a is in the closed position. Contact is made between the load beam 208a and the shutter closed electrode 214a all along its length.

Figure 4A:
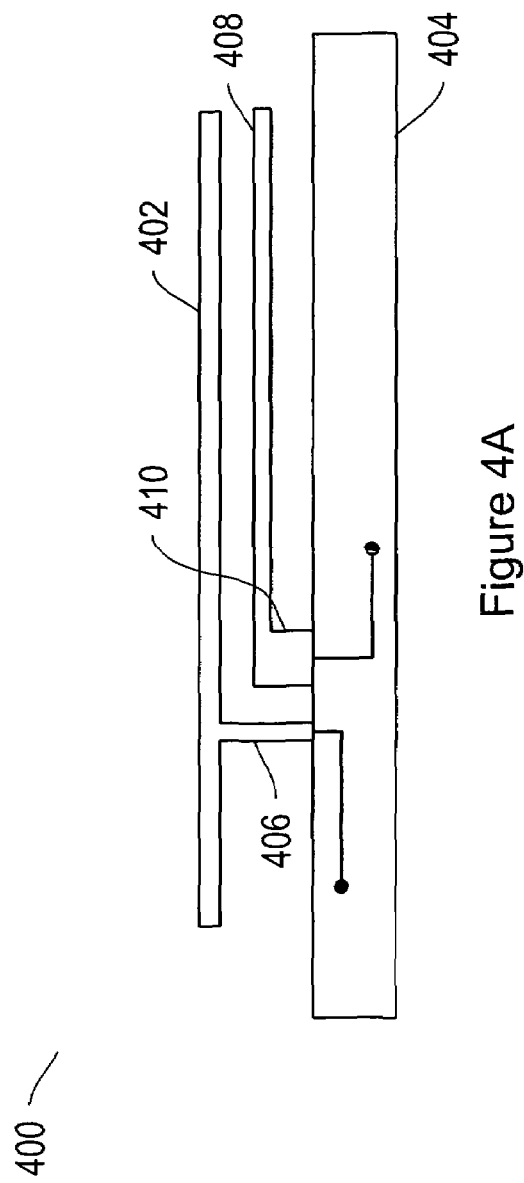
FIGS. 4A and 4B are cross section views of a dual compliant electrode actuator-based mirror-based light modulator in an active and an inactive state, according to an illustrative embodiment of the invention.

FIG. 4A is first cross sectional diagram of dual compliant electrode mirror-based light modulator 400 for inclusion in a display apparatus, such as display apparatus 100, instead of, or in addition to, the shutter assemblies 102. The mirror-based-based light modulator 400 includes a mechanically compliant reflection platform 402. At least a portion of the reflection platform 402 is itself reflective or is coated with or is connected to a reflective material.

The reflection platform 402 may or may not be conductive. In implementations in which the reflection platform 402 is conductive, the reflection platform serves as a load electrode for the mirror-based light modulator 400. The reflection platform 402 is physically supported over, and is electrically coupled to, a substrate 404 via a compliant support member 406. If the reflection platform 402 is formed from a non-conductive material, the reflection platform 402 is coupled to a compliant conductive load beam or other form of compliant load electrode. A compliant support member 406 physically supports the combined reflection platform 402 and electrode over the substrate 404. The support member 406 also provides an electrical connection from the electrode to the substrate 404.

The mirror-based light modulator 400 includes a second compliant electrode 408, which serves a drive electrode 408. The drive electrode 408 is supported between the substrate 404 and the reflection platform 402 by a substantially rigid second support member 410. The second support member 410 also electrically connects the second compliant electrode 408 to a voltage source for driving the mirror-based light modulator 400.

Figure 4B:
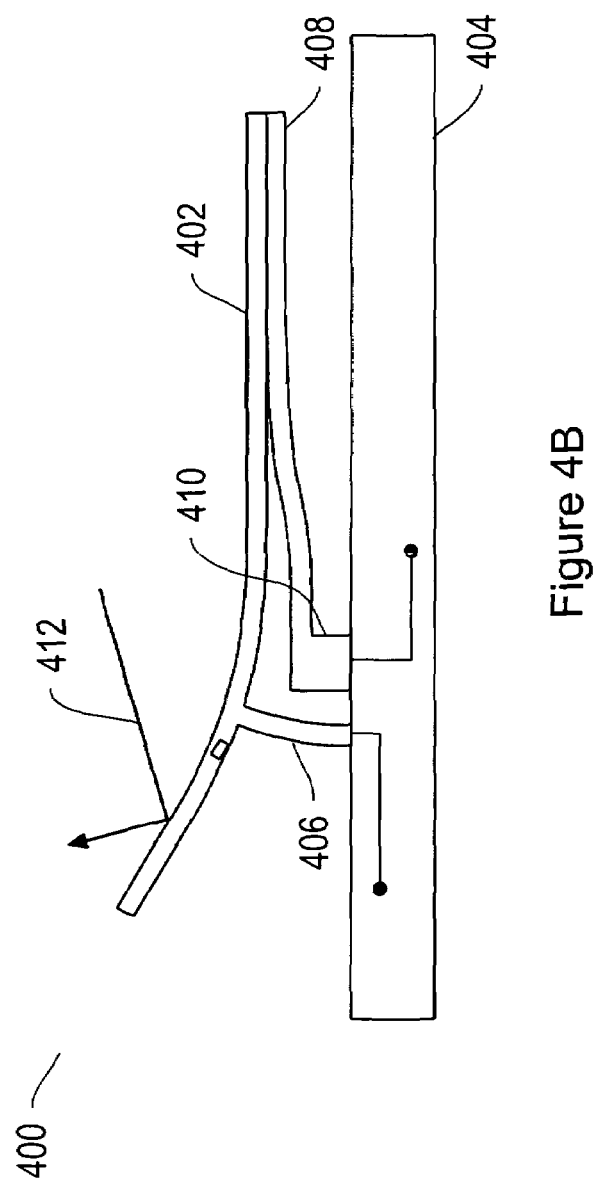

The mirror-based light modulator 400 depicted in FIG. 4A is in rest position in which neither of the electrodes 402 or 408 carry a potential. FIG. 4B depicts the mirror-based light modulator 400 in an activated state. When a potential difference is generated between the drive electrode 408 and the load electrode 402 (be it the reflective platform 402 or an attached load beam), the load electrode 402 is drawn towards the drive electrode 408, thereby bending the compliant support beam 406 and angling the reflective portion of the reflection platform 402 to be least partially transverse to the substrate 404.

To form an image, light 412 is directed at an array of mirror-based light modulators 400 at a particular angle. Mirror-based light modulators 400 in their rest states reflect the light 412 away from the viewer or the display screen, and mirror-based light modulators in the active state reflect the light 412 towards a viewer or a display screen, or visa versa.

Figure 5:
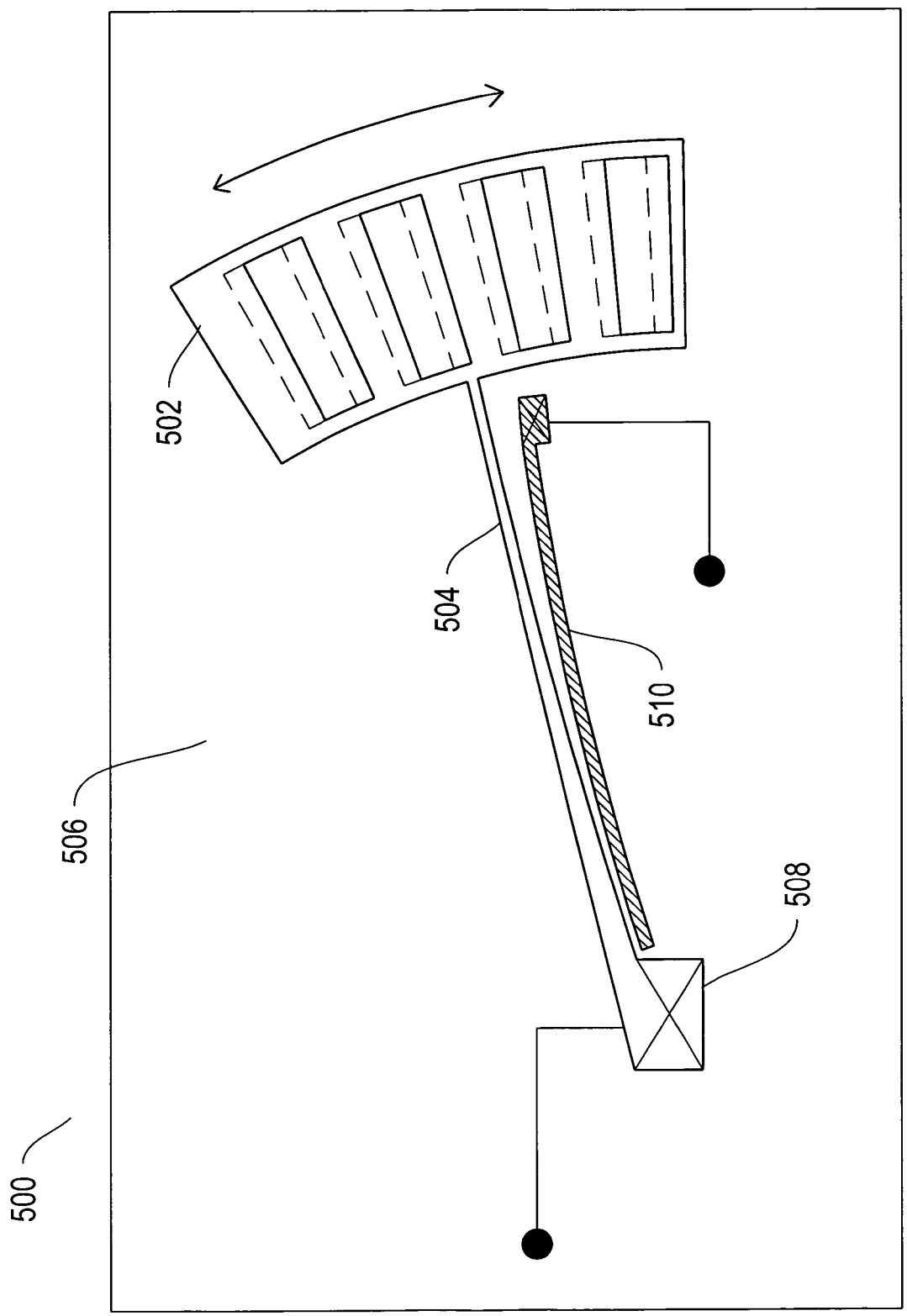
FIG. 5 is a top view of a dual compliant beam electrode actuator-based shutter assembly having a beam with thickness which varies along its length, according to an illustrative embodiment of the invention.

FIG. 5 is a diagram of another cantilever dual compliant beam electrode actuator-based shutter assembly 500 ("shutter assembly 500"). As with the shutter assemblies 200a and 200b, the shutter assembly 500 includes a shutter 502 coupled to a compliant load beam 504. The compliant load beam 504 is then physically anchored to a surface 506, and electrically coupled to ground, at its opposite end via a load anchor 508. The shutter assembly 500 includes only one compliant drive beam 510, located substantially alongside the load beam 504. The drive beam 510, in response to being energized with an electric potential from a controllable voltage source draws the shutter 502 from a first position (in which the load beam 504 is substantially unstressed) in a plane substantially parallel to the surface, to a second position in which the load beam 504 is stressed. When the potential is removed, the stored stress in the load beam 504 restores the load beam 504 to its original position.

In addition, in comparison to the shutter assemblies 202a and 202b, the load beam 504 has a width which varies along its length. The load beam 504 is wider near its anchor 508 than it is nearer to the shutter 502. In comparison to the shutter assemblies 202a and 202b and because of its tailored width, the load beam 504 typically has an overall greater stiffness. Shutter assemblies incorporating stiffer beams typically require higher voltages for actuation, but in return, allow for higher switching rates. For example, the shutter assemblies 202a and 202b may be switched up to about 10 kHz, while the stiffer shutter assembly 500 may be switched up to about 100 kHz.

Figure 6:
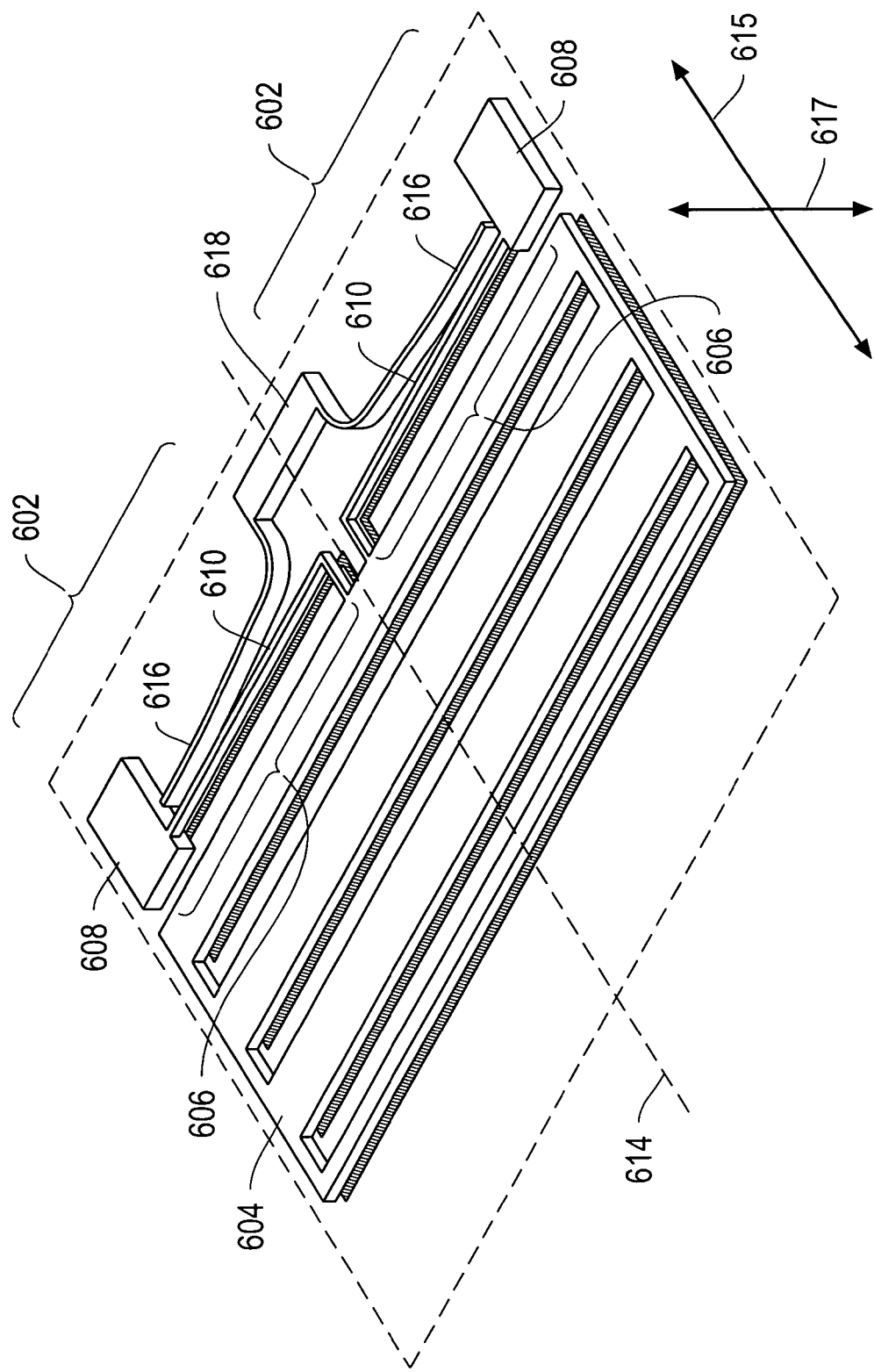
FIG. 6 is an isometric view of a dual compliant beam electrode actuator-based shutter assembly, according to an illustrative embodiment of the invention.

FIG. 6 is diagram of a shutter assembly 600 incorporating two dual compliant electrode beam actuators 602 ("actuators 602"), according to an illustrative embodiment of the invention. The shutter assembly 600 includes a shutter 604. The shutter 604 may be solid, or it may include one or more shutter apertures as described in relation to FIG. 2B. The shutter 604 couples on one side to the beam actuators 602. Together, the actuators 602 move the shutter transversely over a surface in plane of motion which is substantially parallel to the surface.

Each actuator 602 includes a compliant load member 606 connecting the shutter 604 to a load anchor 608. The compliant load members 606 each include a load beam 610 and an L bracket 612. The load anchors 608 along with the compliant load members 606 serve as mechanical supports, keeping the shutter 604 suspended proximate to the surface. The load anchors 608 physically connect the compliant load members 606 and the shutter 604 to the surface and electrically connect the load beams 610 of the load members 606 to ground. The coupling of the shutter 604 from two positions on one side of the shutter 604 to load anchors 608 in positions on either side of the shutter assembly 600 help reduce twisting motion of the shutter 604 about its central axis 614 during motion.

The L brackets 612 reduce the in-plane stiffness of the load beam. 610. That is, the L brackets 612 reduce the resistance of actuators 602 to movement in a plane parallel to the surface (referred to as "in-plane movement" 615), by relieving axial stresses in the load beam.

Each actuator 602 also includes a compliant drive beam 616 positioned adjacent to each load beam 610. The drive beams 616 couple at one end to a drive beam anchor 618 shared between the drive beams 616. The other end of each drive beam 616 is free to move. Each drive beam 616 is curved such that it is closest to the load beam 610 near the free end of the drive beam 616 and the anchored end of the load beam 610.

In operation, a display apparatus incorporating the shutter assembly 600 applies an electric potential to the drive beams 616 via the drive beam anchor 618. As a result of a potential difference between the drive beams 616 and the load beam 610, the free ends of the drive beams 616 are pulled towards the anchored ends of the load beams 610 and the shutter ends of the load beams 610 are pulled toward the anchored ends of the drive beams 616. The electrostatic force draws the shutter 604 towards the drive anchor 618. The compliant members 606 act as springs, such that when the electrical potentials are removed from the drive beams 616, the load beams compliant members 606 push the shutter 604 back into its initial position, releasing the stress stored in the load beams 610. The L brackets 612 also serve as springs, applying further restoration force to the shutter 604.

In fabrication of shutter assemblies 200 through 800, as well as for shutter assemblies 1300 through 1800 it is preferable to provide a rectangular shape for the cross section of the load beams (such as load beams 610) and the drive beams (such as drive beams 616). By providing a beam thickness (in the direction perpendicular to surface) which is 1.4 times or more larger in dimension than the beam width (in a direction parallel to the surface) the stiffness of the load beam 610 will be increased for out-of-plane motion 617 versus in-plane motion 615. Such a dimensional and, by consequence, stiffness differential helps to ensure that the motion of the shutter 604, initiated by the actuators 602, is restricted to motion along the surface and across the surface apertures as opposed to out-of-plane motion 617 which would a wasteful application of energy. It is preferable for certain applications that the cross section of the load beams (such as 610) be rectangular as opposed to curved or elliptical in shape. The strongest actuation force is achieved if the opposing beam electrodes have flat faces so that upon actuation they can approach and touch each other with the smallest possible separation distance.

Figure 7:
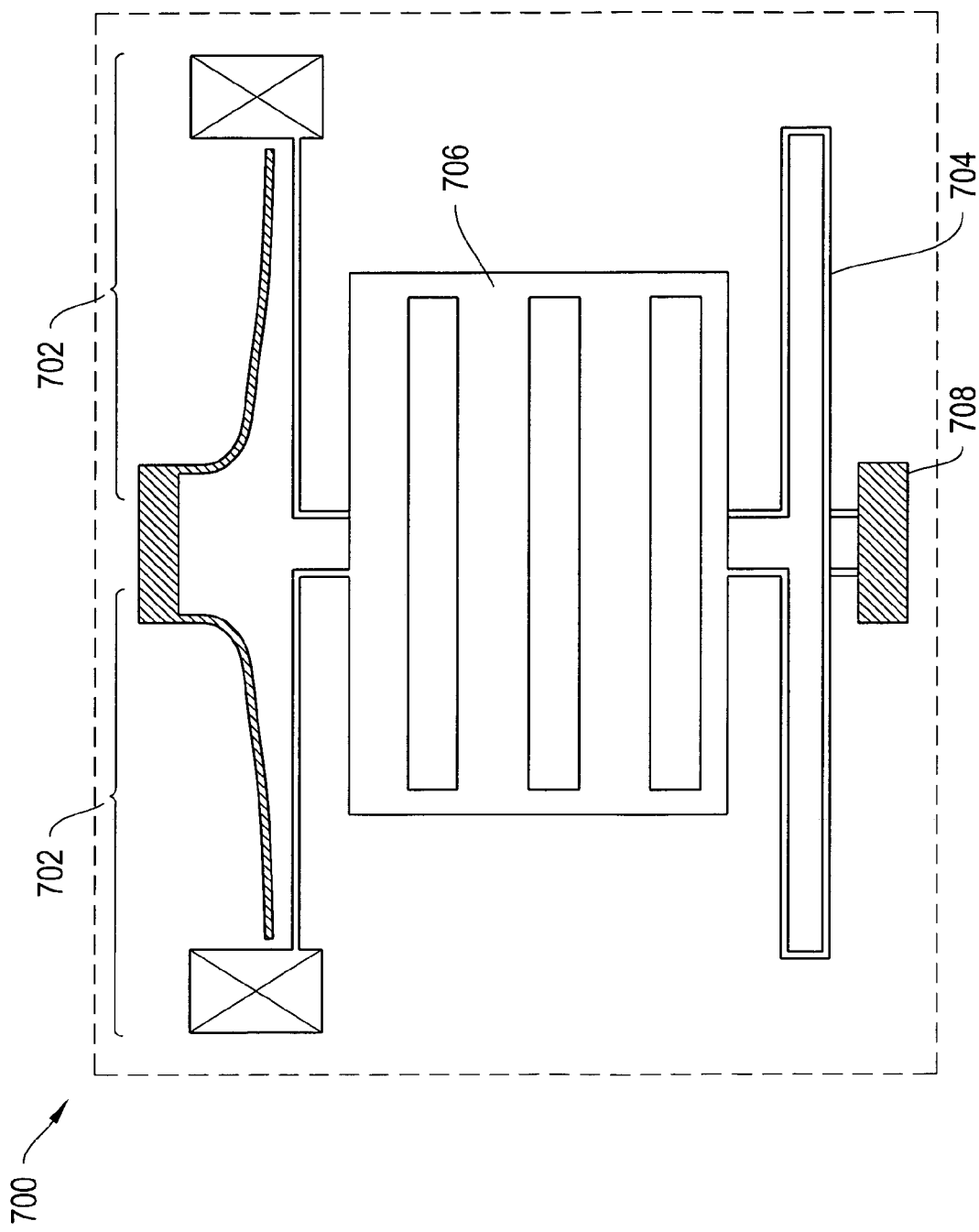
FIG. 7 is a top view of a dual compliant beam electrode actuator-based shutter assembly including a return spring, according to an illustrative embodiment of the invention.

FIG. 7 is a diagram of a second shutter assembly 700 incorporating two dual compliant electrode beam actuators 702, according to an illustrative embodiment of the invention. The shutter assembly 700 takes the same general form of the shutter assembly 600, other than it includes a return spring 704. As with the shutter assembly 600, in the shutter assembly 700, two actuators 702 couple to a first side of a shutter 706 to translate the shutter 706 in a plane parallel to a surface over which the shutter is physically supported. The return spring 704 couples to the opposite side of the shutter 706. The return spring 704 also couples to the surface at a spring anchor 708, acting as an additional mechanical support. By physically supporting the shutter 706 over the surface at opposite sides of the shutter 706, the actuators 702 and the return spring 704 reduce motion of the shutter 706 out of the plane of intended motion during operation. In addition, the return spring 704 incorporates several bends which reduce the in-plane stiffness of the return spring 704, thereby further promoting in-plane motion over out-of-plane motion. The return spring 704 provides an additional restoration force to the shutter 706, such that once an actuation potential is removed, the shutter 706 returns to its initial position quicker. The addition of the return spring 704 increases only slightly the potential needed to initiate actuation of the actuators 702.

Figure 8:
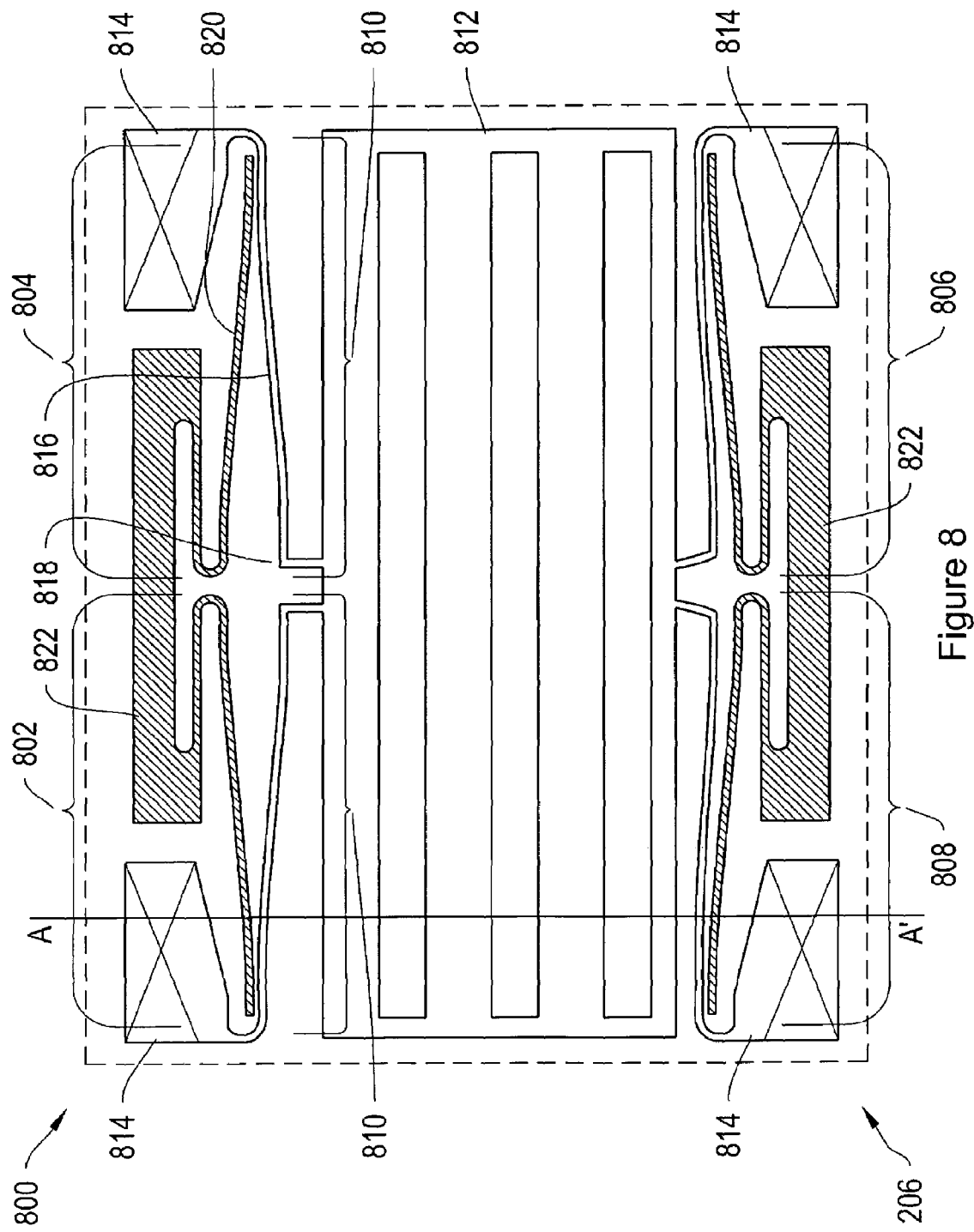
FIG. 8 is a top view of a dual compliant beam electrode actuator-based shutter assembly having separate open and close actuators, according to an illustrative embodiment of the invention.

FIG. 8 is a diagram of a shutter assembly including a pair of shutter open actuators 802 and 804 and a pair of shutter close actuators 806 and 808, according to an illustrative embodiment of the invention. Each of the four actuators 802, 804, 806, and 808 take the form of a dual compliant beam electrode actuator. Each actuator 802, 804, 806, and 808 includes a compliant load member 810 coupling a shutter 812, at one end, to a load anchor 814, at the other end. Each compliant load member 810 includes a load beam 816 and an L bracket 818. Each actuator 802, 804, 806, and 808 also includes and a drive beam 820 with one end coupled to a drive anchor 822. Each pair of actuators 802/804 and 806/808 share a common drive anchor 822. The unanchored end of each drive beam 820 is positioned proximate to the anchored end of a corresponding compliant load member 810. The anchored end of each drive beam 820 is located proximate to the L bracket end of a corresponding load beam 816. In a deactivated state, the distance between a load beam 816 and its corresponding drive beam 820 increases progressively from the anchored end of the load beam 816 to the L bracket 818.

In operation, to open the shutter 812, a display apparatus incorporating the shutter assembly 800 applies an electric potential to the drive anchor 822 of the shutter open actuators 802 and 804, drawing the shutter 812 towards the open position. To close the shutter 812, the display apparatus applies an electric potential to the drive anchor 822 of the shutter close actuators 806 and 808 drawing the shutter 812 towards the closed position. If neither pair of actuators 802/804 or 806/808 are activated, the shutter 812 remains in an intermediate position, somewhere between fully open and fully closed.

The shutter open actuators 802/804 and shutter closed actuators 806/808 couple to the shutter 812 at opposite ends of the shutter. The shutter open and closed actuators have their own load members 810, thus reducing the actuation voltage of each actuator 802, 804, 806 and 808. Because of the electrical bi-stability described in reference to FIG. 3, it is advantageous to find an actuation method or structure with er more leverage for separating the compliant load member 810 from a drive beam 820 with which it might be in contact. By positioning the open and closed actuators 802/804 and 806/808 on opposite sides of the shutter 812, the actuation force of the actuator-to-be-actuated is transferred to the actuator-to-be-separated through the shutter. The actuation force is therefore applied to the task of separation at a point close to the shutter (for instance near the L-bracket end of the load beam 816) where its leverage will be higher.

For shutter assemblies such as in FIG. 8 typical shutter widths (along the direction of the slots) will be in the range of 20 to 800 microns. The "throw distance" or distance over which the shutter will move between open and closed positions will be in the range of 4 to 100 microns. The width of the drive beams and load beams will be in the range of 0.2 to 40 microns. The length of the drive beams and load beams will be in the range of 10 to 600 microns. Such shutter assemblies may be employed for displays with resolutions in the range of 30 to 1000 dots per inch.

Each of the shutter assemblies 200a, 200b, 500, 600, 700 and 800, and the mirror-based light modulator 400, described above fall into a class of light modulators referred to herein as "elastic light modulators." Elastic light modulators have one mechanically stable rest state. In the rest state, the light modulator may be on (open or reflecting), off (closed or not reflecting), or somewhere in between (partially open or partially reflecting). If the generation of a voltage across beams in an actuator forces the light modulator out of its rest state into a mechanically unstable state, some level of voltage across the beams must be maintained for the light modulator to remain in that unstable state.

Figure 9:
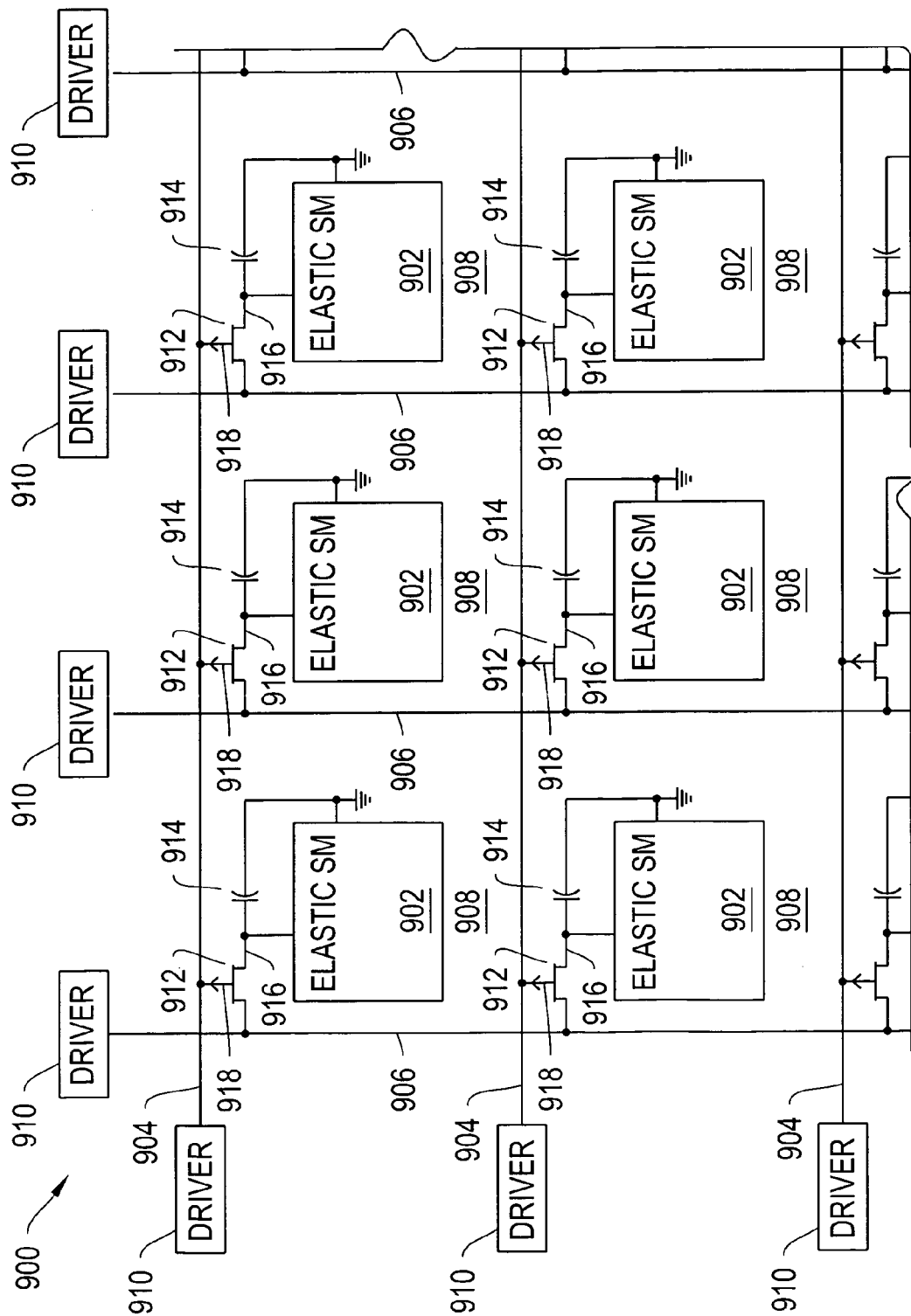
FIG. 9 is a conceptual diagram of an active matrix array for controlling dual compliant electrode actuator based-light modulators, according to an illustrative embodiment of the invention.

FIG. 9 is a diagram of an active matrix array 900 for controlling elastic light modulators 902 in a display apparatus. In particular, the active matrix array 900 is suitable for controlling elastic light modulators 902, such as the mirror-based light modulator 400 or shutter-based light modulators 500, 600, and 700, that include only a passive restoration force. That is, these light modulators 902 require electrical activation of actuators to enter a mechanically unstable state, but then utilize mechanical mechanisms, such as springs, to return to the rest state.

The active matrix array is fabricated as a diffused or thin-film-deposited electrical circuit on the surface of a substrate on which the elastic light modulators 902 are formed. The active matrix array 900 includes a series of row electrodes 904 and column electrodes 906 forming a grid like pattern on the substrate, dividing the substrate into a plurality of grid segments 908. The active matrix array 900 includes a set of drivers 910 and an array of non-linear electrical components, comprised of either diodes or transistors that selectively apply potentials to grid segments 908 to control one or more elastic light modulators 902 contained within the grid segments 908. The art of thin film transistor arrays is described in *Active Matrix Liquid Crystal Displays: Fundamentals and Applications* by Willem den Boer (Elsevier, Amsterdam, 2005).

Each grid segment 908 contributes to the illumination of a pixel, and includes one or more elastic light modulators 902. In grid segments including only a single elastic light modulator 902, the grid segment 908 includes, in addition to the elastic light modulator 902, least one diode or transistor 912 and optionally a capacitor 914. The capacitor 914 shown in FIG. 9 can be explicitly added as a design element of the circuit, or it can be understood that the capacitor 914 represents the equivalent parallel or parasitic capacitance of the elastic light modulator. The emitter 916 of the transistor 912 is electrically coupled, to either the drive electrode or the load electrode of the elastic light modulator 902. The other electrode of the actuator is coupled to a ground or common potential. The base 918 of the transistor 912 electrically couples to a row electrode 904 controlling a row of grid segments. When the base 918 of the transistor receives a potential via the row electrode 904, current can run through the transistor 912 from a corresponding column electrode 906 to generate a potential in the capacitor 914 and to apply a potential to the drive electrode of the elastic light modulator 902 activating the actuator.

The active matrix array 900 generates an image, in one implementation by, one at a time, applying a potential from one of the drivers 910 to a selected row electrode 904, activating a corresponding row of grid segments 908. While a particular row is activated, the display apparatus applies a potential to the column electrodes corresponding to grid segments in the active row containing light modulators which need to be switched out of a rest state.

When a row is subsequently deactivated, a stored charge will remain on the electrodes of the actuator 902 (as determined by the equivalent capacitance of the actuator) as well as, optionally, on the parallel capacitor 914 that can be designed into the circuit., keeping the elastic shutter mechanisms 902 in their mechanically unstable states. The elastic shutter mechanism 902 remains in the mechanically unstable state until the voltage stored in the capacitor 914 dissipates or until the voltage is intentionally reset to ground potential during a subsequent row selection or activation step.

Figure 10:
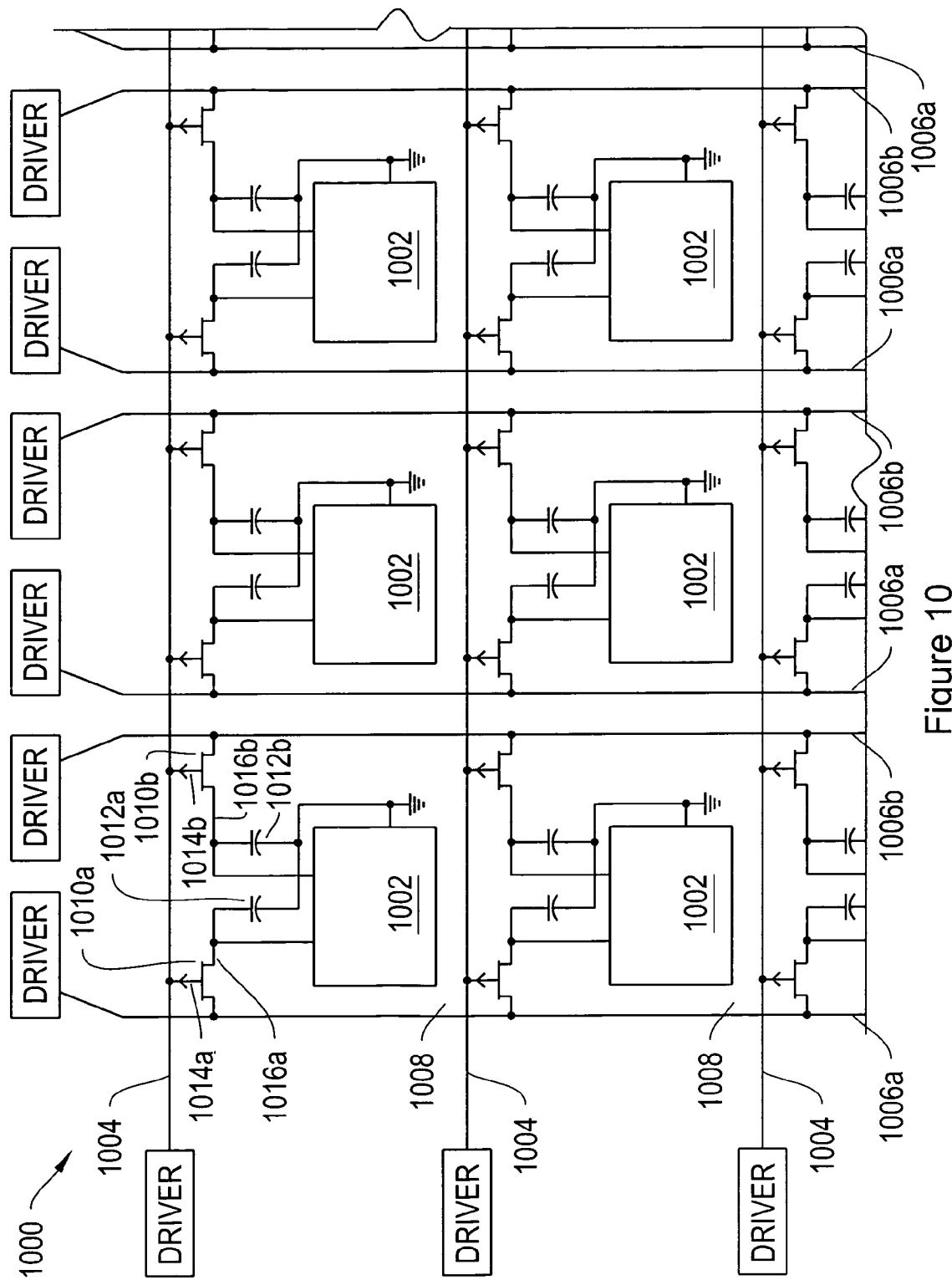
FIG. 10 is a conceptual diagram of a second active matrix array for controlling dual compliant electrode actuator based-light modulators, according to an illustrative embodiment of the invention.

FIG. 10 is diagram of another implementation of an active matrix array 1000 for controlling elastic light modulators 1002 in a display apparatus. In particular, the active matrix array 1000 is suitable for controlling elastic light modulators, such as shutter-based light modulators 200a, 200b, and 800, which include one set of actuators for forcing the light modulators from a rest state to a mechanically unstable state and a second set of actuators for driving the light modulators back to the rest state and possibly to a second mechanically unstable state. Active matrix array 1000 can also be used for driving non-elastic light modulators described further in relation to FIGS. 12-20.

The active matrix array 1000 includes one row electrode 1004 for each row in the active matrix array 1000 and two column electrodes 1006a and 1006b for each column in the active matrix array 1000. For example, for display apparatus including shutter-based light modulators, one column electrode 1006a for each column corresponds to the shutter open actuators of light modulators 1002 in the column. The other column electrode 1006b corresponds to the shutter close actuators of the light modulators 1002 in the column. The active matrix array 1000 divides the substrate upon which it is deposited into grid sections 1008. Each grid section 1008 includes one or more light modulators 1002 and at least two diodes or transistors 1010a and 1010b and optionally two capacitors 1012a and 1012b. The bases 1014a and 1014b of each transistor 1010a and 1010b are electrically coupled to a column electrode 1006a or 1006b. The emitters 1016a and 1016b of the transistors 1010a and 1010b are coupled to a corresponding capacitor 1012a or 1012b and a drive electrode of the light modulator(s) 1002 in the grid section 1008.

In operation, a driver applies a potential to a selected row electrode 1004, activating the row. The active matrix array 1000 selectively applies potentials to one of the two column electrodes 1006a or 1006b of each column in which the state of the light modulator(s) 1002 in the grid section 1008 needs to be changed. Alternatively, the active matrix array 1000 may also apply a potential to column electrodes 1006a or 1006b for grid sections 1008 previously in an active state which are to remain in an active state.

For both active matrix arrays 900 and 1000, the drivers powering the column electrodes, in some implementations, select from multiple possible potentials to apply to individual column electrodes 1006a and 1006b. The light modulator(s) 1002 in those columns can then be opened or closed different amounts to create grayscale images.

Figure 11:
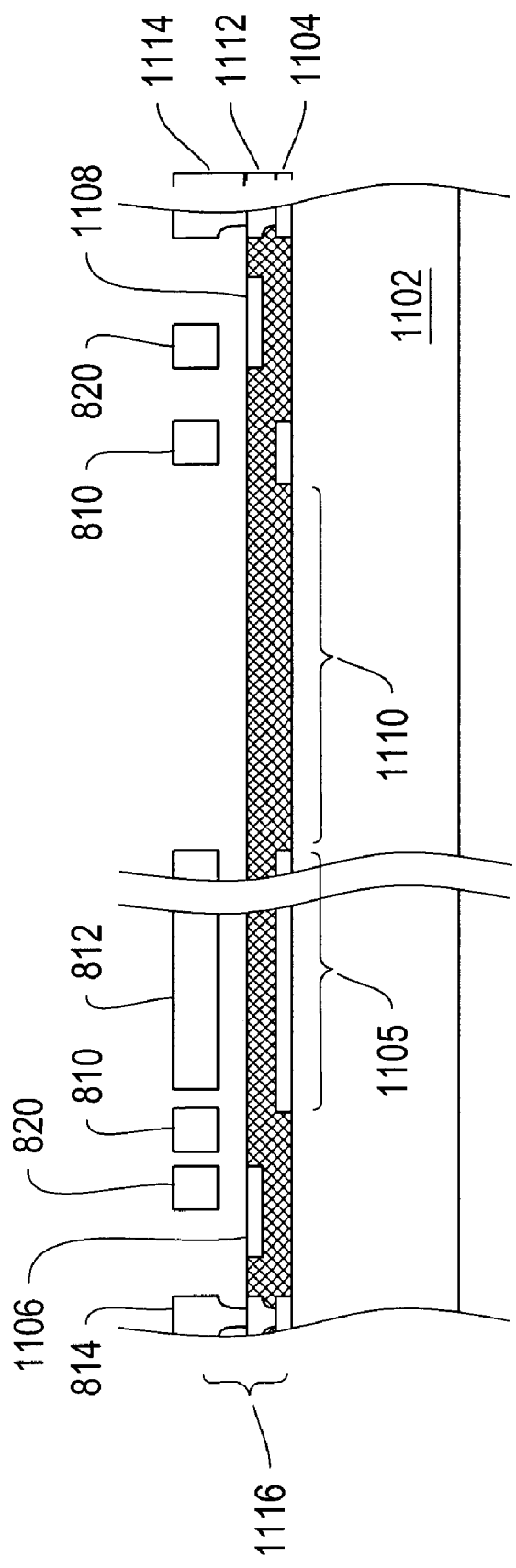
FIG. 11 is a cross sectional view of the dual compliant beam electrode actuator-based shutter assembly of FIG. 8.

FIG. 11 is a cross sectional view of the shutter-assembly 800 of FIG. 8 along the line labeled A-A'. Referring to FIGS. 8, 10, and 11, the shutter assembly 800 is built on substrate 1102 which is shared with other shutter assemblies of a display apparatus, such as display apparatus 100, incorporating the shutter assembly 800. The voltage signals to actuate the shutter assembly, are transmitted along conductors in underlying layers of the shutter assembly. is The voltage signals are controlled by an active matrix array, such as active matrix array 1000. The substrate 1102 may support as many as 4,000,000 shutter assemblies, arranged in up to about 2000 rows and up to about 2000 columns.

In addition to the shutter 812, the shutter open actuators 802 and 804, the shutter close actuators 806 and 808, the load anchors 814 and the drive anchors 822, the shutter assembly 800 includes a row electrode 1104, a shutter open electrode 1106, a shutter close electrode 1108, and three surface apertures 1110. The depicted shutter assembly has at least three functional layers, which may be referred to as the row conductor layer, the column conductor layer, and the shutter layer. The shutter assembly is preferably made on a transparent substrate such as glass or plastic. Alternatively the substrate can be made from an opaque material such as silicon, as long as through holes are provided at the positions of each of the surface apertures 1110 for the transmission of light. The first metal layer on top of the substrate is the row conductor layer which is patterned into row conductor electrodes 1104 as well as reflective surface sections 1105. The reflective surface sections 1105 reflect light passing through the substrate 1102 back through the substrate 1102 except at the surface apertures 1110. In some implementations the surface apertures may include or be covered by red, green, or blue color filtering materials.

The shutter open electrode 1106 and the shutter close electrode 1108 are formed in a column conductor layer 1112 deposited on the substrate 1102, on top of the row conductor layer 1104. The column conductor layer 1112 is separated from the row conductor layer 1104 by one or more intervening layers of dielectric material or metal. The shutter open electrode 1104 and the shutter close electrode 1106 of the shutter assembly 800 are shared with other shutter assemblies in the same column of the display apparatus. The column conductor layer 1112 also serves to reflect light passing through gaps in the ground electrode 1104 other than through the surface apertures 1110. The row conductor layer 1104 and the column conductor layer 1112 are between about 0.1 and about 2 microns thick. In alternative implementations, the column conductor 1112 layer can be located below the row conductor layer 1104. In another alternative implementation both the column conductor layer and the row conductor layer may be located above the shutter layer.

The shutter 812, the shutter open actuators 802 and 804, the shutter close actuators 806 and 808, the load anchors 814 and the drive anchors 822 are formed from third functional layer of the shutter assembly 800, referred to as the shutter layer 1114. The actuators 802, 804, 806, and 808 are formed from a deposited metal, such as, without limitation, Au, Cr or Ni, or a deposited semiconductor, such as, without limitation as polycrystalline silicon, or amorphous silicon, or from single crystal silicon if formed on top of a buried oxide (also known as silicon on insulator). The beams of the actuators 802, 804, 806, and 808 are patterned to dimensions of about 0.2 to about 20 microns in width. The shutter thickness is typically in the range of 0.5 microns to 10 microns. To promote the in-plane movement of the shutters (i.e. reduce the transverse beam stiffness as opposed to the out-of-plane stiffness), it is preferable to maintain a beam dimensional ratio of about at least 1.4:1, with the beams being thicker than they are wide.

Metal or semiconductor vias electrically connect the row electrode 1104 and the shutter open electrode 1106 and the shutter close electrode 1108 of the column conductor layer 1112 to features on the shutter layer 1114. Specifically, vias 1116 electrically couple the row electrode 1104 to the load anchors 814 of the shutter assembly 800, keeping the compliant load member 810 of the shutter open actuators 802 and 804 and the shutter close actuators 806 and 808, as well as the shutter 812, at the row conductor potential. Additional vias electrically couple the shutter open electrode 1106 to the drive beams 820 of the shutter open actuators 802 and 804 via the drive anchor 822 shared by the shutter open actuators 802 and 804. Still other vias electrically couple the shutter close electrode 1108 to the drive beams 820 of the of the shutter close actuators 806 and 808 via the drive anchor 822 shared by the shutter close actuators 806 and 808.

The shutter layer 1114 is separated from the column conductor layer 1112 by a lubricant, vacuum or air, providing the shutter 812 freedom of movement. The moving pieces in the shutter layer 1114 are mechanically separated from neighboring components (except their anchor points 814) in a release step, which can be a chemical etch or ashing process, which removes a sacrificial material from between all moving parts.

The diodes, transistors, and/or capacitors (not shown for purpose of clarity) employed in the active matrix array may be patterned into the existing structure of the three functional layers, or they can be built into separate layers that are disposed either between the shutter assembly and the substrate or on top of the shutter layer. The reflective surface sections 1105 may be patterned as extensions of the row and column conductor electrodes or they can be patterned as free-standing or electrically floating sections of reflective material. Alternatively the reflective surface sections 1105 along with their associated surface apertures 1110 can be patterned into a fourth functional layer, disposed between the shutter assembly and the substrate, and formed from either a deposited metal layer or a dielectric mirror. Grounding conductors may be added separately from the row conductor electrodes in layer 1104. These separate grounding conductors may be required when the rows are activated through transistors, such as is the case with an active matrix array. The grounding conductors can be either laid out in parallel with the row electrodes (and bussed together in the drive circuits), or the grounding electrodes can be placed into separate layers between the shutter assembly and the substrate.

In addition to elastic light modulators, display apparatus can include bi-stable light modulators, for example bi-stable shutter assemblies. As described above, a shutter in an elastic shutter assembly has one mechanically stable position (the "rest position"), with all other shutter positions being mechanically unstable. The shutter of a bi-stable shutter assembly, on the other hand, has two mechanically stable positions, for example, open and closed. Mechanically bi-stable shutter assemblies have the advantage that no voltage is required to maintain the shutters in either the open or the closed positions. Bi-stable shutter assemblies can be further subdivided into two classes: shutter assemblies in which each stable position is substantially energetically equal, and shutter assemblies in which one stable position is energetically preferential to the other mechanically stable position.

Figure 12:
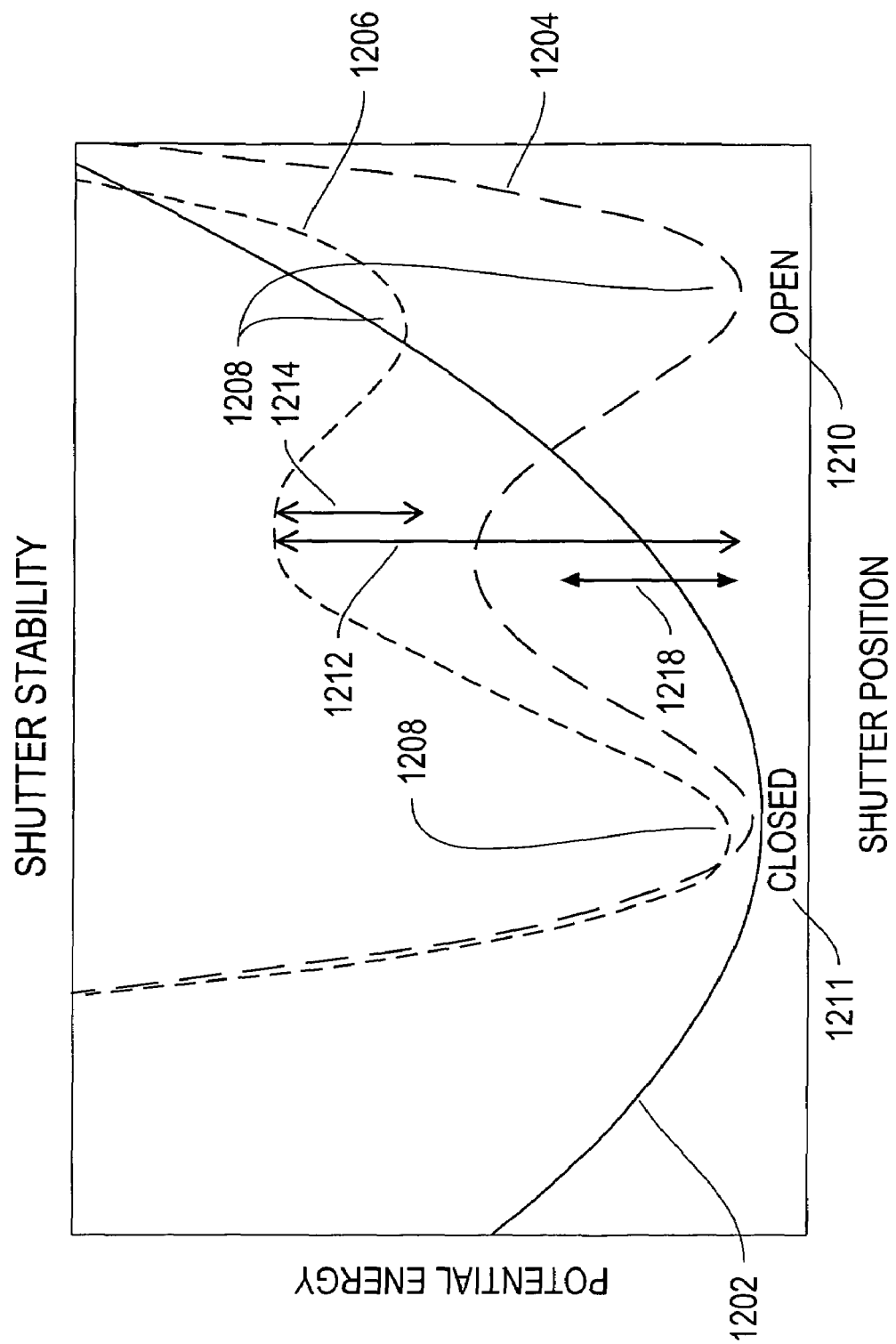
FIG. 12 is an energy diagram illustrating the energy characteristics of various dual compliant electrode based shutter assemblies, according to an illustrative embodiment of the invention.

FIG. 12 is a diagram 1200 of potential energy stored in three types of shutter assemblies in relation to shutter position. The solid line 1202 corresponds to an elastic shutter assembly. The dashed line 1204 corresponds to a bi-stable shutter assembly with equal energy stable states. The dotted line 1206 corresponds to a bi-stable shutter assembly with non-equal energy stable states. As indicated in the energy diagram 1200, the energy curves 1204 and 1206 for the two types of bi-stable shutter assemblies each include two local minima 1208, corresponding to stable shutter positions, such as fully open 1210 and fully closed 1211. As illustrated, energy must be added to the a assembly in order to move its shutters out of the positions corresponding to one of the local minima. For the bi-stable shutter assemblies with non-equal-energy mechanically stable shutter positions, however, the work needed to open a shutter 1212 is greater than the work required to close the shutter 1214. For the elastic shutter assembly, on the other hand, opening the shutter requires work 1218, but the shutter closes spontaneously after removal of the control voltage.

Figure 13A:
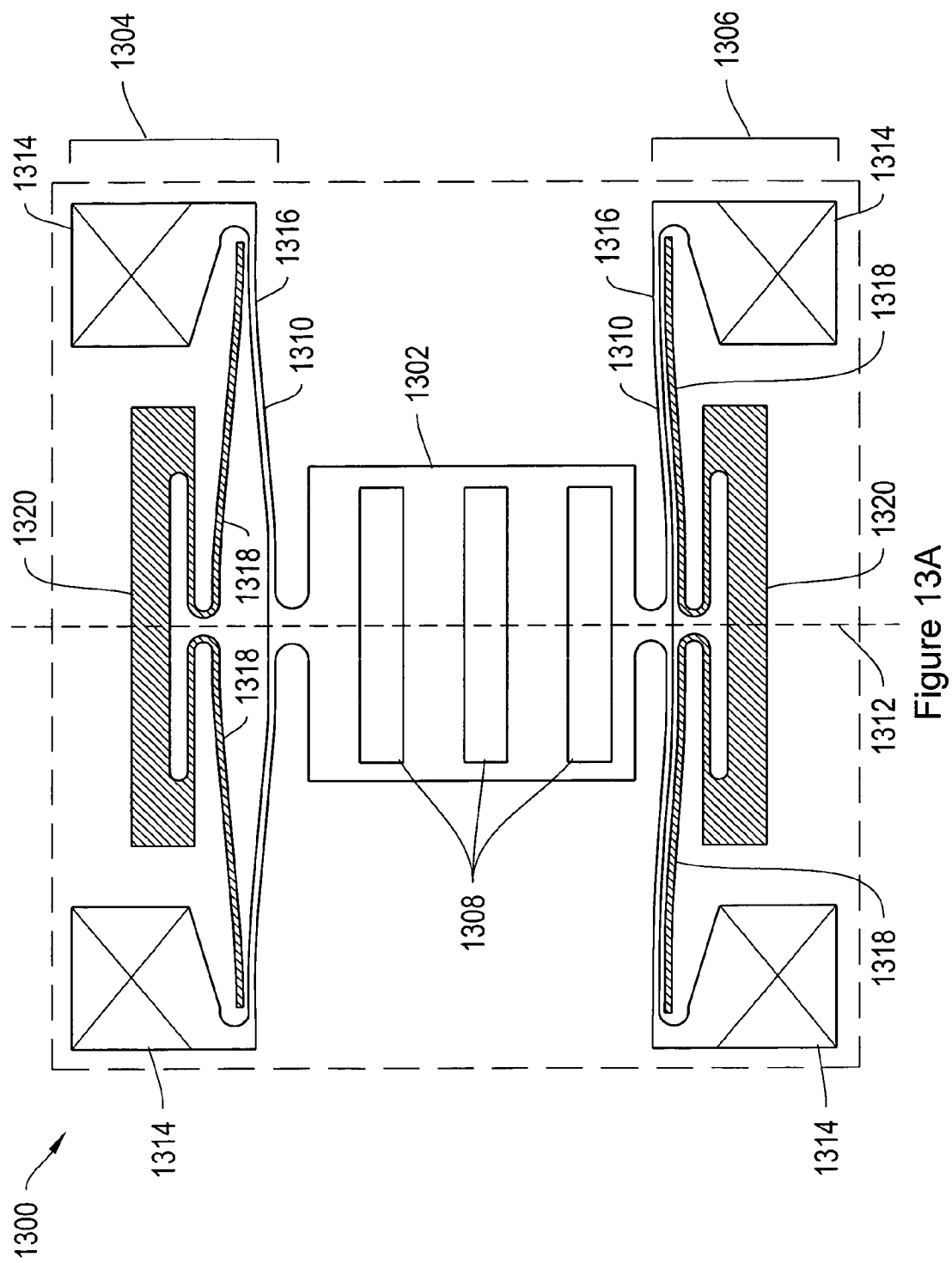
FIG. 13A is a top view of a bi-stable dual compliant beam electrode actuator based-shutter assembly, according to an illustrative embodiment of the invention.

FIG. 13A is a top view of a shutter layer 1300 of a bi-stable shutter assembly. The shutter layer 1360 includes a shutter 1302 driven by two dual compliant electrode actuators 1304 and 1306. The shutter 1302 includes three slotted shutter apertures 1308. One dual compliant electrode actuator 1304 serves as a shutter open actuator. The other dual compliant electrode actuator 1306 serves as a shutter close actuator.

Each dual compliant electrode actuator 1304 and 1306 includes a compliant member 1310 connecting the shutter 1302, at about its linear axis 1312, to two load anchors 1314, located in the corners of the shutter layer 1300. The compliant members 1310 each include a conductive load beam 1316, which may have an insulator disposed on part of, or the entirety of its surface. The load beams 1316 server as mechanical supports, physically supporting the shutter 1302 over a substrate on which the shutter assembly is built. The actuators 1304 and 1306 also each include two compliant drive beams 1318 extending from a shared drive anchor 1320. Each drive anchor 1320 physically and electrically connects the drive beams 1318 to the substrate. The drive beams 1318 of the actuators 1304 and 1306 curve away from their corresponding drive anchors 1320 towards the points on the load anchors 1314 at which load beams 1316 couple to the load anchors 1314. These curves in the drive beams 1318 act to reduce the stiffness of the drive beams, thereby helping to decrease the actuation voltage.

Each load beam 1316 is generally curved, for example in a bowed (or sinusoidal) shape. The extent of the bow is determined by the relative distance between the load anchors 1314 and the length of the load beam 1316. The curvatures of the load beams 1316 provide the bi-stability for the shutter assembly 1300. As the load beam 1316 is compliant, the load beam 1316 can either bow towards or away from the drive anchor 1320. The direction of the bow changes depending on what position the shutter 1302 is in. As depicted, the shutter 1302 is in the closed position. The load beam 1316 of the shutter open actuator 1304 bows away from the drive anchor 1320 of the shutter open actuator 1304. The load beam 1316 of the shutter closed actuator 1306 bows towards the drive anchor 1320 of the shutter close actuator 1306.

In operation, to change states, for example from closed to open, a display apparatus applies a potential to the drive beams 1318 of the shutter open actuator 1304. The display apparatus may also apply an potential to the load beams 1316 of the shutter open actuator. Any electrical potential difference between the drive beams and the load beams, regardless of sign with respect to a ground potential, will generate an electrostatic force between the beams. The resultant voltage between the drive beams 1318 and the load beams 1316 of the shutter open actuator 1304 results in an electrostatic force, drawing the beams 1316 and 1318 together. If the voltage is sufficiently strong, the load beam 1316 deforms until its curvature is substantially reversed, as depicted in the shutter close actuator in FIG. 13A.

Figure 13B:
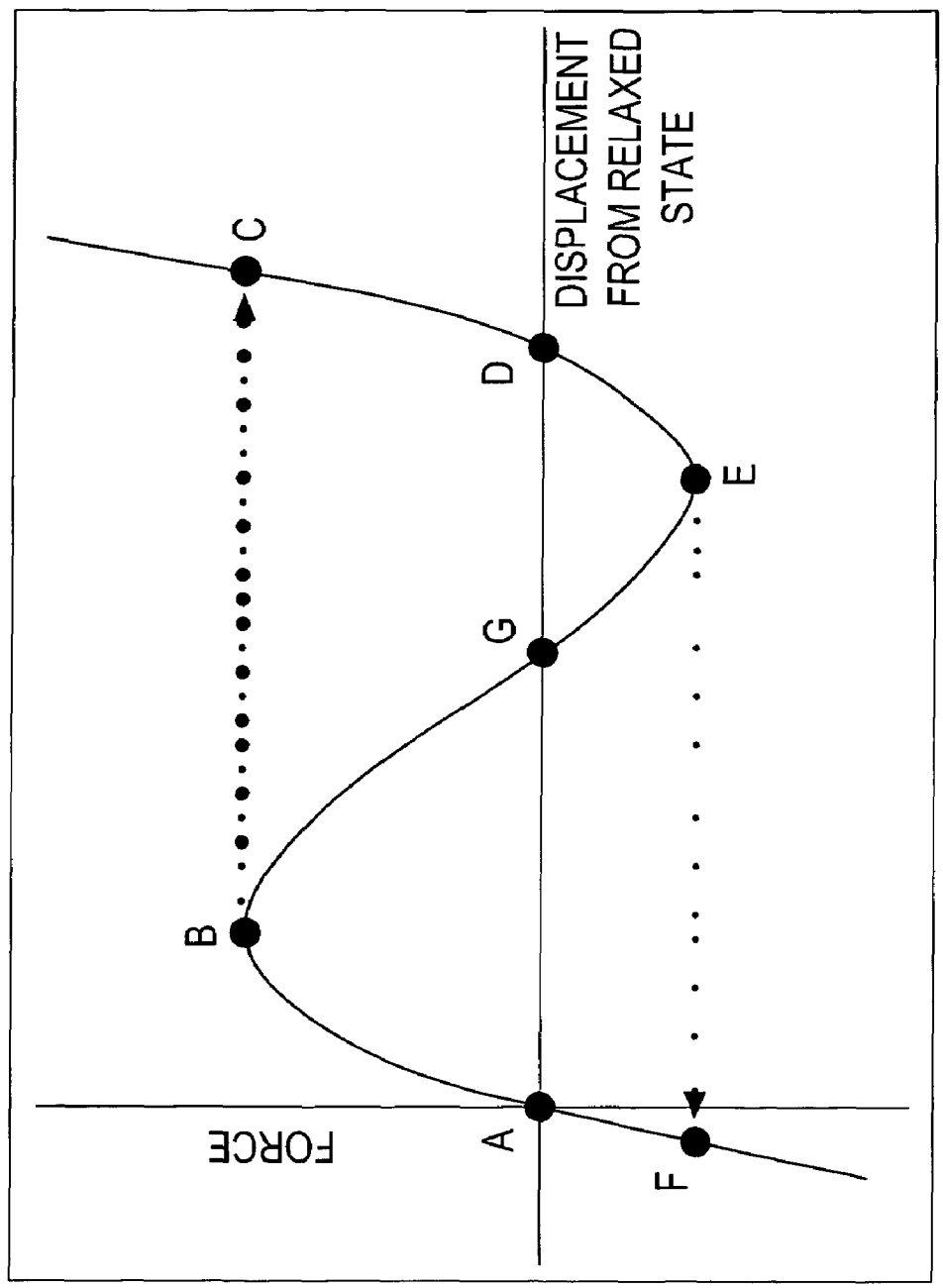
FIG. 13B shows the evolution of force versus displacement for a bi-stable shutter assembly.

FIG. 13B shows the evolution of force versus displacement for the general case of bi-stable actuation, including that for FIG. 13A. Referring to FIGS. 13A and 13B, generally the force required to deform a compliant load beam will increase with the amount of displacement. However, in the case of a bi-stable mechanism, such as illustrated in FIG. 13A, a point is reached (point B in FIG. 13B) where further travel leads to a decrease in force. With sufficient voltage applied between the load beam 1316 and the drive beam 1318 of the shutter open actuator 1304, a deformation corresponding to point B of FIG. 13B is reached, where further application of force leads to a large and spontaneous deformation (a "snaphthrough") and the deformation comes to rest at point C in FIG. 13B. Upon removal of a voltage, the mechanism will relax to a point of stability, or zero force. Point D is such a relaxation or stable point representing the open position. To move the shutter 1302 in the opposite direction it is first necessary to apply a voltage between the load beam 1316 and the drive beam 1318 of the shutter close actuator 1306. Again a point is reached where further forcing results in a large and spontaneous deformation (point E). Further forcing in the closed direction results in a deformation represented by point F. Upon removal of the voltage, the mechanism relaxes to its initial and stable closed position, point A.

In FIG. 13A, the length of the compliant member is longer than the straight-line distance between the anchor and the attachment point at the shutter. Constrained by the anchor points, the load beam finds a stable shape by adapting a curved shape, two of which shapes constitute configurations of local minima in the potential energy. Other configurations of the load beam involve deformations with additional strain energy.

For load beams fabricated in silicon, typical as-designed widths are about 0.2 μm to about 10 μm. Typical as-designed lengths are about 20 μm to about 1000 μm. Typical as-designed beam thicknesses are about 0.2 μm to about 10 μm. The amount by which the load beam is pre-bent is typically greater than three times the as-designed width The load beams of FIG. 13A can be designed such that one of the two curved positions is close to a global minimum, i.e. possesses the lowest energy or relaxed state, typically a state close to zero energy stored as a deformation or stress in the beam. Such a design configuration may be referred to as "pre-bent", meaning, among other things, that the shape of the compliant member is patterned into the mask such that little or no deformation is required after release of the shutter assembly from the substrate. The as-designed and curved shape of the compliant member is close to its stable or relaxed state. Such a relaxed state holds for one of the two shutter positions, either the open or the closed position. When switching the shutter assembly into the other stable state (which can be referred to as a metastable state) some strain energy will have to be stored in the deformation of the beam; the two states will therefore have unequal potential energies; and less electrical energy will be required to move the beam from metastable to stable states as compared to the motion from the stable state to the metastable state.

Another design configuration for FIG. 13A, however, can be described as a pre-stressed design. The pre-stressed design provides for two stable states with equivalent potential energies. This can be achieved for instance by patterning the compliant member such that upon release of the shutter assembly will substantially and spontaneously deform into its stable shape (i.e. the initial state is designed to be unstable). Preferably the two stable shapes are similar such that the deformation or strain energy stored in the compliant member of each of those stable states will be similar. The work required to move between open and closed shutter positions for a pre-stressed design will be similar.

The pre-stress condition of the shutter assembly can be provided by a number of means. The condition can be imposed post-manufacture by, for instance, mechanically packaging the substrate to induce a substrate curvature and thus a surface strain in the system. A pre-stressed condition can also be imposed as a thin film stress imposed by surface layers on or around the load beams. These thin film stresses result from the particulars of a deposition processes. Deposition parameters that can impart a thin film stress include thin film material composition, deposition rate, and ion bombardment rate during the deposition process.

Figure 18:
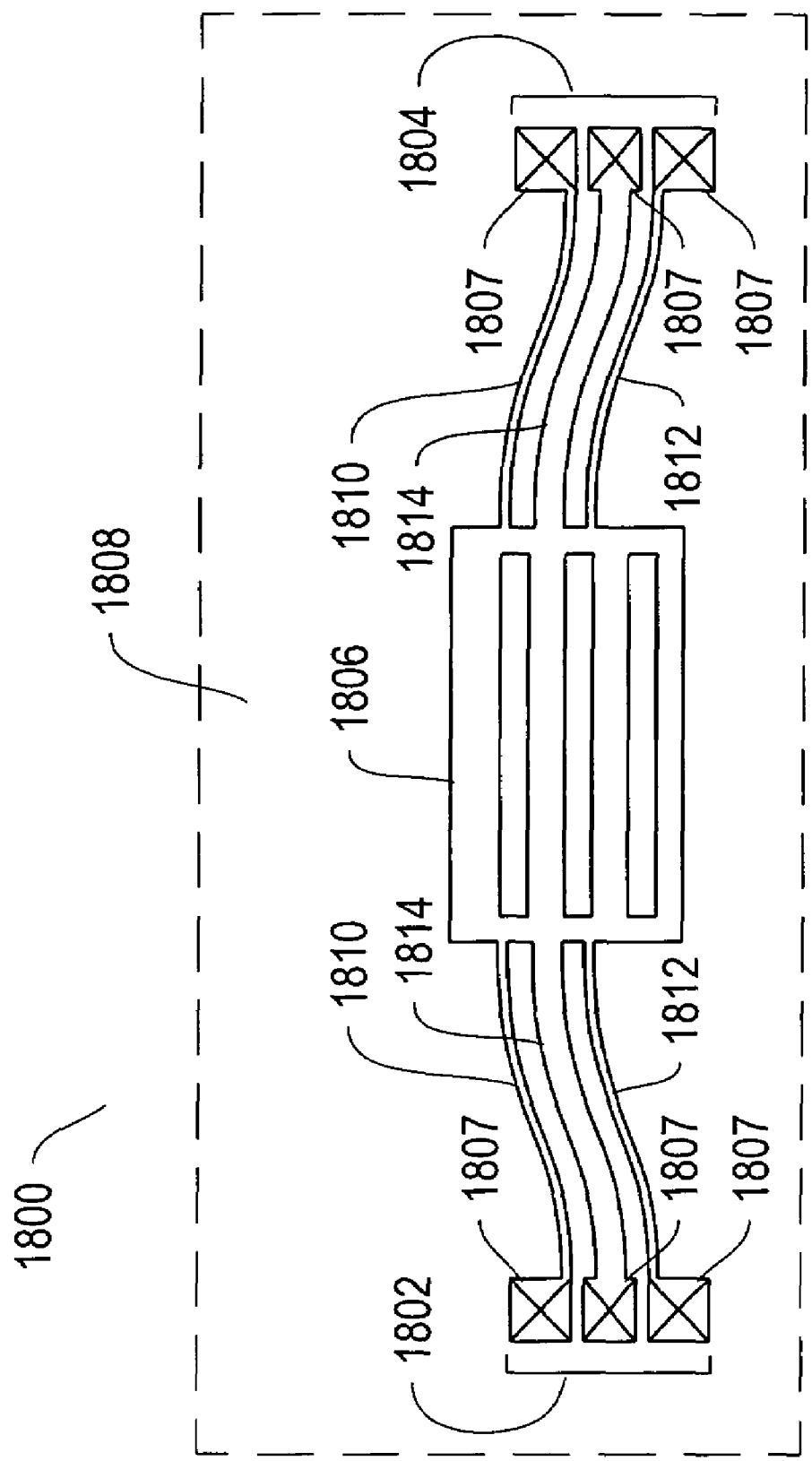
FIG. 18 is a conceptual diagram of a bi-stable shutter assembly incorporating thermoelectric actuators, according to an illustrative embodiment of the invention.

In FIG. 13A, the load beam is curved in each of its locally stable states and the load beam is also curved at all points of deformation in between the stable states. The compliant member may be comprised, however, of any number of straight or rigid sections of load beam as will be described in the following figures. In FIG. 18, furthermore, will be shown the design of a bi-stable shutter assembly in which neither of the two equivalent stable positions possesses, requires, or accumulates any significant deformation or strain energy. Stress is stored in the system temporarily as it is moved between the stable states.

Figure 14:
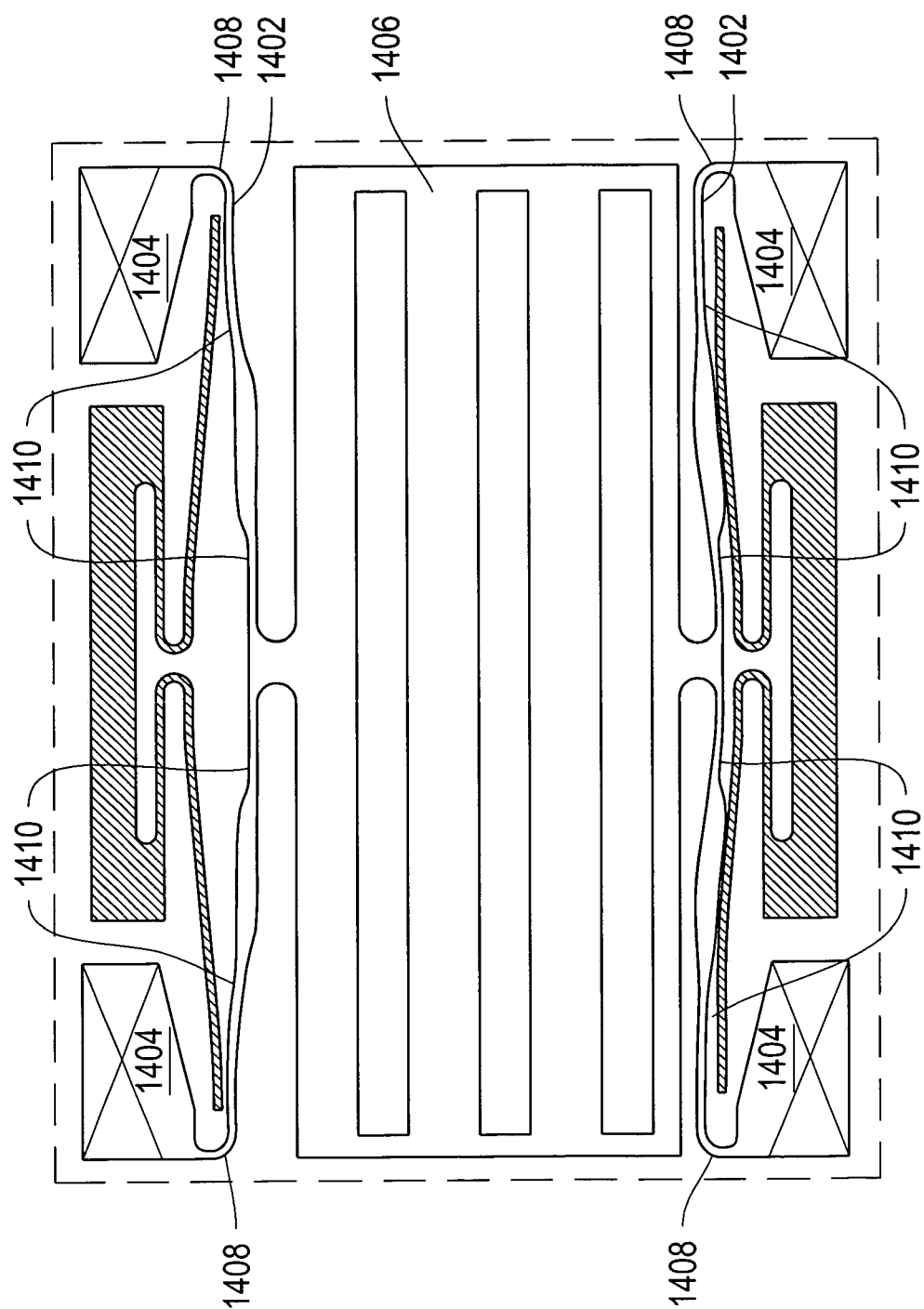
FIG. 14 is a top view of a second bi-stable dual compliant beam electrode actuator based-shutter assembly, according to an illustrative embodiment of the invention.

FIG. 14 is an top view of the shutter layer 1400 of a second bi-stable shutter assembly. As described above in relation to FIG. 6, reducing resistance to in-plane motion tends to reduce out-of-plane movement of the shutter. The shutter layer 1400 is similar to that of the shutter layer 1300, other than the shutter layer 1400 includes an in-plane stiffness-reducing feature, which promotes in-plane movement, and a deformation promoter which promotes proper transition between states. As with the shutter layer 1300 of FIG. 13A, the shutter layer 1400 of FIG. 14 includes load beams 1402 coupling load anchors 1404 to a shutter 1406. To reduce the in-plane stiffness of the shutter assembly and to provide some axial compliance to the load beams 1402, the load anchors 1404 couple to the load beams 1402 via springs 1408. The springs 1408 can be formed from flexures, L brackets, or curved portions of the load beams 1402.

In addition, the widths of the load beams 1402 vary along their lengths. In particular, the beams are narrower along sections where they meet the load anchors 1404 and the shutter 1406. The points along the load beams 1402 at which the load beams 1402 become wider serve as pivot points 1410 to confine deformation of the load beams 1402 to the narrower sections 1410.

Figure 15:
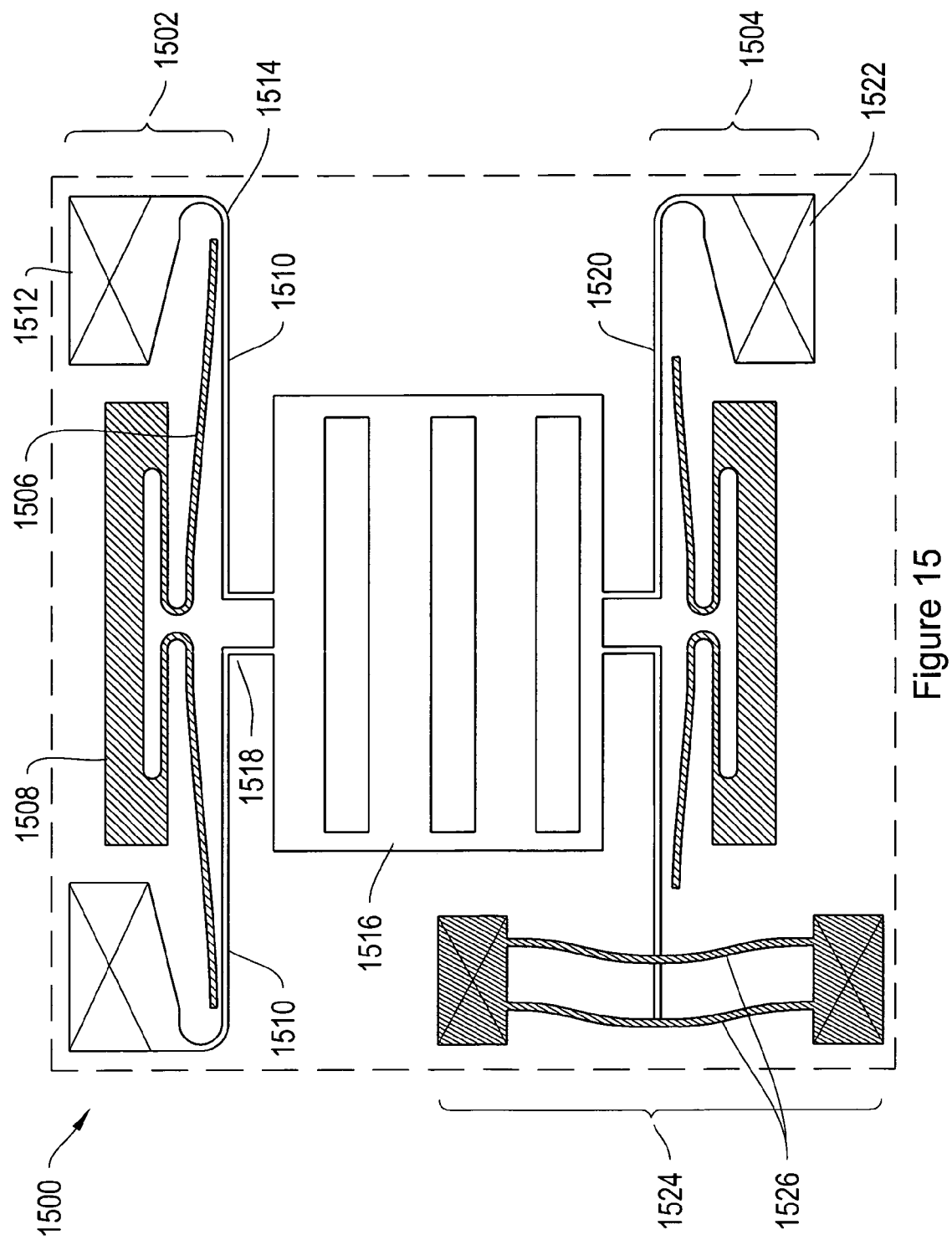
FIG. 15 is a top view of a tri-stable shutter assembly incorporating dual compliant electrode actuators, according to an illustrative embodiment of the invention.

FIG. 15 is a top view of a shutter layer 1500 of a tri-stable shutter assembly incorporating dual compliant electrode actuators, according to an illustrative embodiment of the invention. The shutter layer 1500 includes a shutter open actuator 1502 and a shutter close actuator 1504. Each actuator 1502 and 1504 includes two compliant drive beams 1506 physically and electrically coupled to a substrate of a display apparatus by a drive anchor 1508.

The shutter open actuator 1502, by itself, is an elastic actuator, having one mechanically stable state. Unless otherwise constrained, the shutter open actuator 1502, after actuation would return to its rest state. The shutter open actuator 1502 includes two load beams 1510 coupled to load anchors 1512 by L brackets 1514 at one end and to the shutter 1516 via L brackets 1518 at the other end. In the rest state of the shutter open actuator 1502, the load beams 1510 are straight. The L brackets 1514 and 1518 allow the load beams 1510 to deform towards the drive beams 1506 of the shutter open actuator 1502 upon actuation of the shutter open actuator 1502 and away form the drive beams 1506 upon actuation of the shutter close actuator 1504.

The shutter close actuator 1504 is similarly inherently elastic. The shutter close actuator 1504 includes a single load beam 1520 coupled to a load anchor 1522 at one end. When not under stress, i.e., in its rest state, the load beam 1520 is straight. At the opposite end of the load beam 1520 of the shutter close actuator 1504, the load beam 1520 is coupled to a stabilizer 1524 formed from two curved compliant beams 1526 connected at their ends and at the center of their lengths. The beams 1526 of the stabilizer 1524 have two mechanically stable positions: bowed away from the shutter close actuator 1504 (as depicted) and bowed towards the shutter close actuator 1504.

In operation, if either the shutter open actuator 1502 or the shutter close actuator are activated 1504, the load beam 1520 of the shutter close actuator 1504 is deformed to bow towards the shutter open actuator 1504 or towards the drive beams 1528 of the shutter close actuator 1504, respectively, as the shutter 1516 is moved into an actuated position. In either case, the length of the shutter close actuator 1504 load beam 1520 with respect to the width of the shutter layer 1500 as a whole, is reduced, pulling the beams 1526 of the stabilizer 1524 to bow towards the shutter close actuator 1504. After the activated actuator is deactivated, the energy needed to deform the beams 1526 of the stabilizer 1524 back to its original position is greater than the energy stored in the load beams 1510 and 1520 and of the actuators 1502 and 1504. Additional energy must be added to the system to return the shutter 1516 to its rest position. Thus, the shutter 1516 in the shutter assembly has three mechanically stable positions, open, half open, and closed.

Figure 16A:
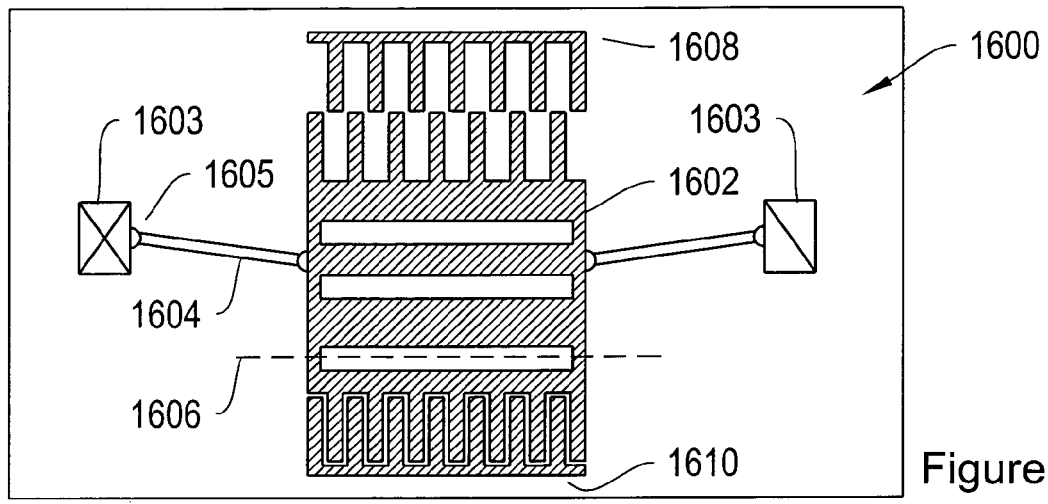
FIGS. 16A-C are conceptual diagrams of another embodiment of a bi-stable shutter assembly, illustrating the state of the shutter assembly during a change in shutter position, according to an illustrative embodiment of the invention.
Figure 16B:
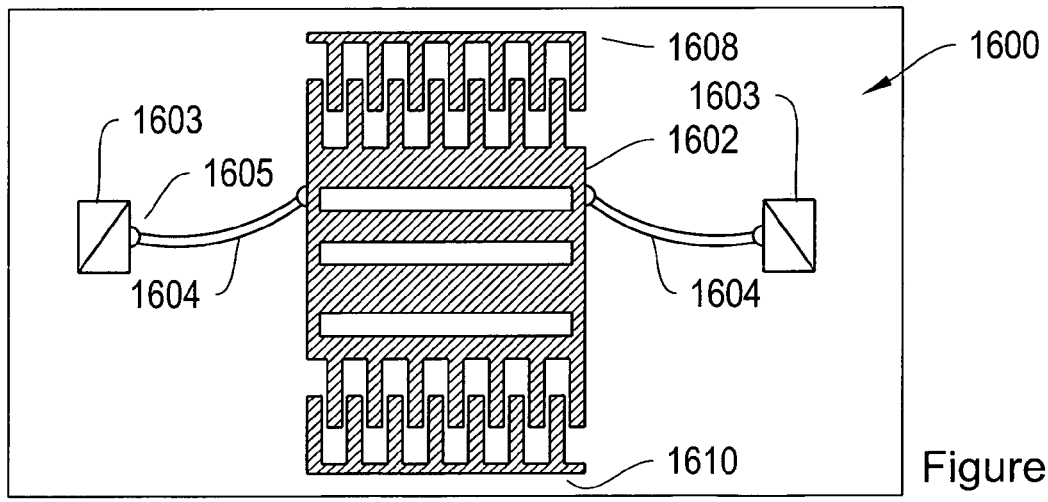
Figure 16C:
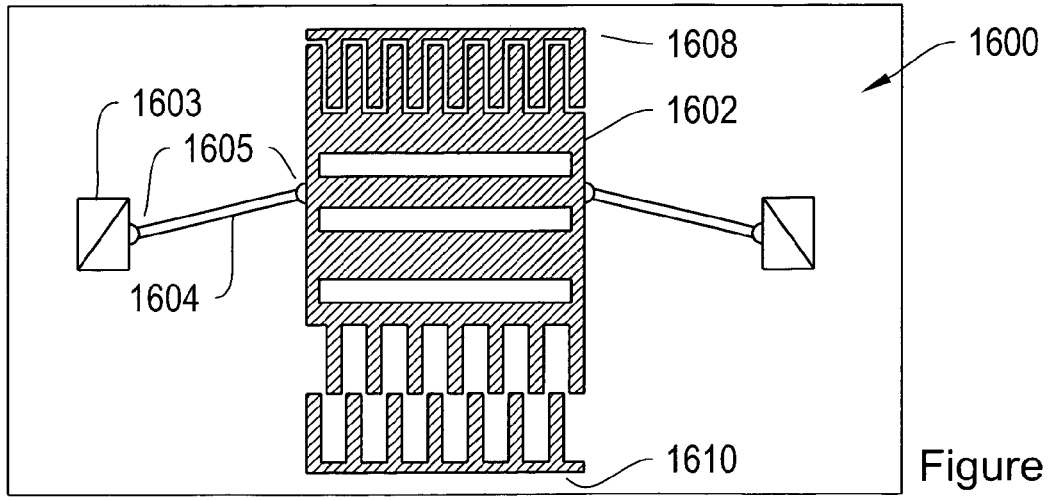

FIGS. 16A-C are diagrams of another embodiment of a bi-stable shutter assembly 1600, illustrating the state of the shutter assembly 1600 during a change in shutter 1602 position. The shutter assembly 1600 includes a shutter 1602 physically supported by a pair of compliant support beams 1604. The support beams couple to anchors 1603 as well as to the shutter 1602 by means of rotary joints 1605. These joints may be understood to consist of pin joints, flexures or thin connector beams. In the absence of stress being applied to the support beams 1604, the support beams 1604 are substantially straight.

FIG. 16A depicts the shutter 1602 in an open position, FIG. 16B depicts the shutter 1602 in the midst of a transition to the closed position, and FIG. 16C shows the shutter 1602 in a closed position. The shutter assembly 1600 relies upon an electrostatic comb drive for actuation. The comb drive is comprised of a rigid open electrode 1608 and a rigid closed electrode 1610. The shutter 1602 also adopts a comb shape which is complementary to the shape of the open and closed electrodes. Comb drives such as are shown in FIG. 16 are capable of actuating over reasonably long translational distances, but at a cost of a reduced actuation force. The primary electrical fields between electrodes in a comb drive are aligned generally perpendicular to the direction of travel, therefore the force of actuation is generally not along the lines of the greatest electrical pressure experienced by the interior surfaces of the comb drive.

Unlike the bi-stable shutter assemblies described above, instead of relying upon a particular curvature of one or more beams to provide mechanical stability, the bi-stable actuator 1600 relies on the straight relaxed state of its support beams 1604 to provide mechanical stability. For example, in its two mechanically stable positions, depicted in FIGS. 16A and 16C, the compliant support beams 1604 are substantially straight at an angle to the linear axis 1606 of the shutter assembly 1600. As depicted in FIG. 16B, in which the shutter 1602 is in transition from one mechanically stable position to the other, the support beams 1604 physically deform or buckle to accommodate the movement. The force needed to change the position of the shutter 1602 must therefore be sufficient to overcome the resultant stress on the compliant support beams 1604. Any energy difference between the open and closed states of shutter assembly 1600 is represented by a small amount of elastic energy in the rotary joints 1605.

The shutter 1602 is coupled to two positions on either side of the shutter 1602 through support beams 1604 to anchors 1603 in positions on either side of the shutter assembly 1600, thereby reducing any twisting or rotational motion of the shutter 1602 about its central axis. The use of compliant support beams 1604 connected to separate anchors on opposite sides of the shutter 1602 also constrains the movement of the shutter along a linear translational axis. In another implementation, a pair of substantially parallel compliant support beams 1604 can be coupled to each side of shutter 1602. Each of the four support beams couples at independent and opposing points on the shutter 1602. This parallelogram approach to support of the shutter 1602 helps to guarantee that linear translational motion of the shutter is possible.

Figure 17A:
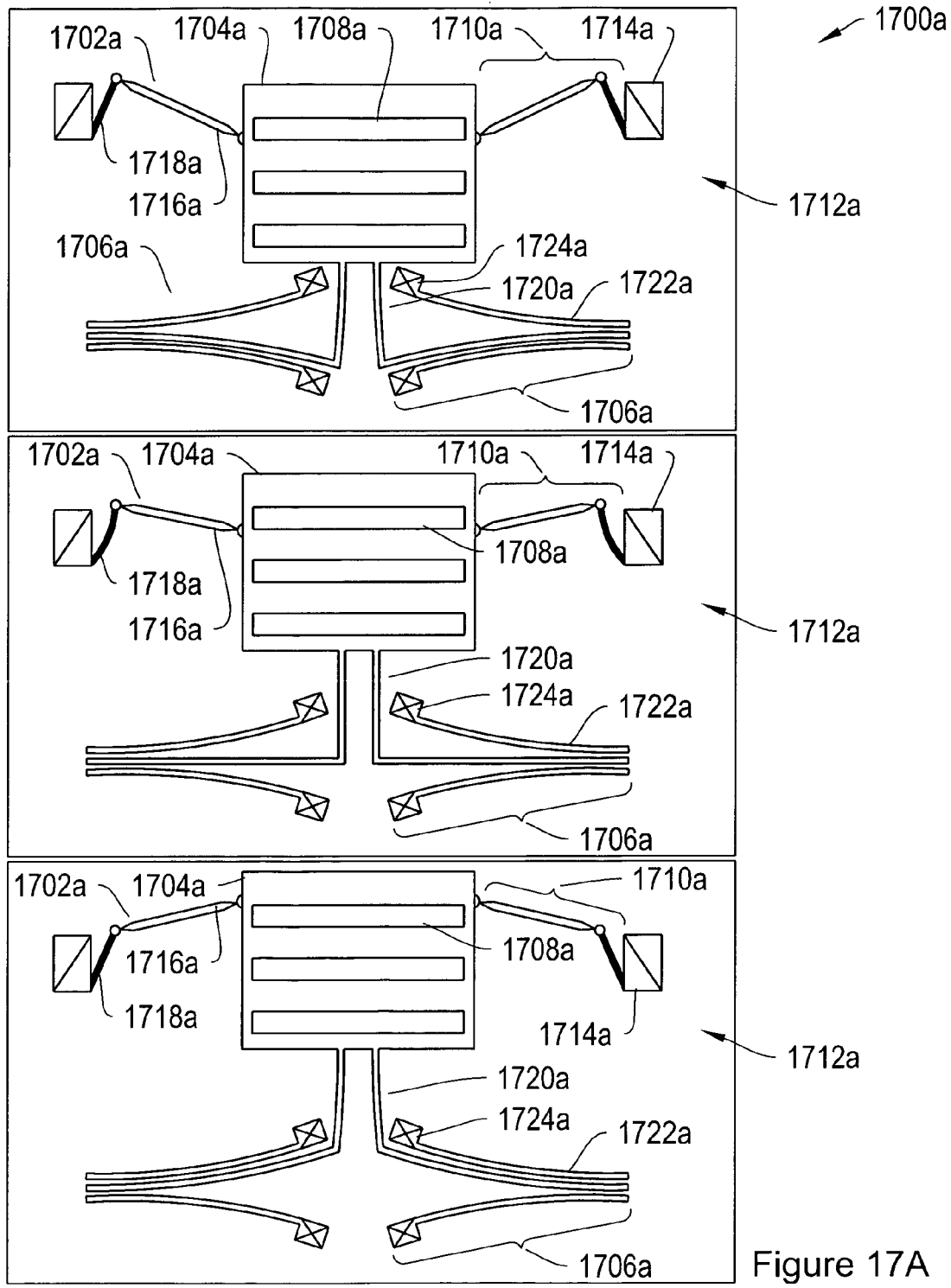
FIG. 17A is a conceptual diagram of a bi-stable shutter assembly including substantially rigid beams, according to an illustrative embodiment of the invention.

FIG. 17A depicts a bi-stable shutter assembly 1700, in which the beams 1702 incorporated into the shutter assembly 1700 are substantially rigid as opposed to compliant, in both of the shutter assembly's stable positions 17A-1 and 17A-3 as well as in a transitional position 17A-2. The shutter assembly 1700 includes a shutter 1704 driven by a pair of dual compliant beam electrode actuators 1706. Two compliant members 1710 support the shutter 1704 over a surface 1712. The compliant members 1710 couple to opposite sides of the shutter 1704. The other ends of the compliant members 1710 couple to anchors 1714, connecting the compliant members 1710 to the surface 1712. Each compliant member 1710 includes two substantially rigid beams 1716 coupled to a flexure or other compliant element 1718, such as a spring or cantilever arm. Even though the beams 1716 in the compliant members are rigid, the incorporation of the compliant element 1718 allows the compliant member 1710 as a whole to change its shape in a compliant fashion to take on two mechanically stable shapes. The compliant element is allowed to relax to its rest state in either of the closed or open positions of the shutter assembly (see 17A-1 and 17A-3), so that both of the end states possess substantially identical potential energies. No permanent beam bending or beam stressing is required to establish the stability of the two end states, although strain energy is stored in the compliant element 1718 during the transition between states (see 17A-2).

The shape of the compliant element 1718 is such that a relatively easy in-plane translation of the shutter 1704 is allowed while out-of-plane motion of the shutter is restricted.

The actuation of the bi-stable shutter assembly 1700 is accomplished by a pair of elastic dual compliant beam electrode actuators 1706, similar to the actuators employed in FIG. 15. In shutter assembly 1700 the actuators 1706 are physically separated and distinct from the compliant members 1710. The compliant members 1710 provide a relatively rigid support for the shutter 1704 while providing the bi-stability required to sustain the open and closed states. The actuators 1706 provide the driving force necessary to switch the shutter between the open and closed states.

Each actuator 1706 comprises a compliant load member 1720. One end of the compliant load member 1720 is coupled to the shutter 1704, while the other end is free. In shutter assembly 1700 the compliant load members in actuators 1706a are not coupled to anchors or otherwise connected to the surface 1712. The drive beams 1722 of the actuators 1706 are coupled to anchors 1724 and thereby connected to the surface 1712. In this fashion the voltage of actuation is reduced.

Figure 17B:
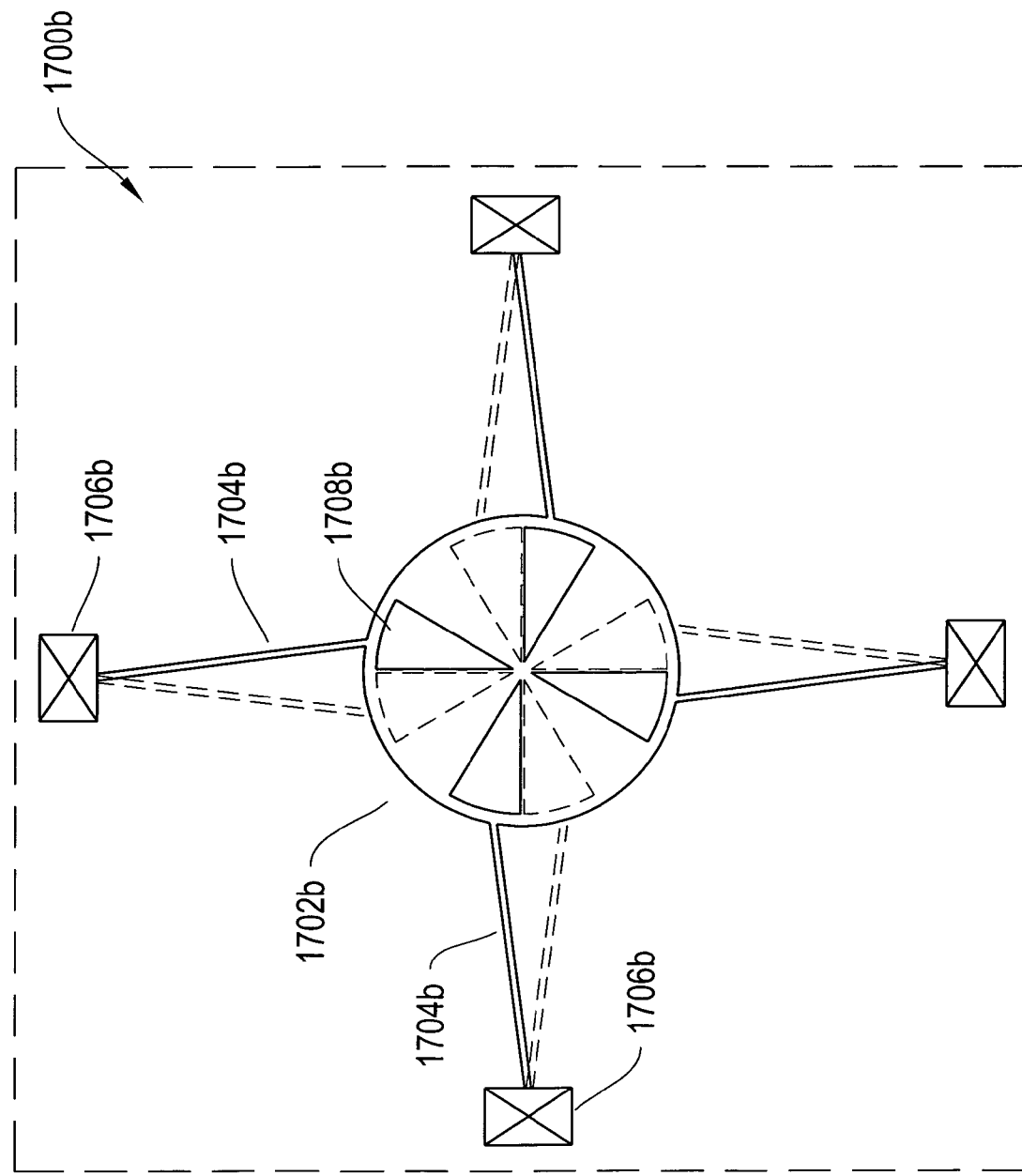
FIG. 17B is a top view of a rotational bi-stable shutter assembly.

FIG. 17B is a diagram of a bi-stable shutter assembly 1700b in which the shutter 1702b is designed to rotate upon actuation. The shutter 1702b is supported at four points along its periphery by 4 compliant support beams 1704b which are coupled to four anchors 1706b. As in FIG. 16, the compliant support beams 1704b are substantially straight in their rest state. Upon rotation of the shutter 1702b the compliant members will deform as the distance between the anchors and the shutter periphery decreases. There are two low energy stable states in which the compliant support beams 1704b are substantially straight. The shutter mechanism in 1700b has the advantage that there is no center of mass motion in the shutter 1702b.

The shutter 1702b in shutter assembly 1700b has a plurality of shutter apertures 1708b, each of possesses a segmented shape designed to make maximum use of the rotational motion of the shutter. FIG. 18 is a diagram of a bi-stable shutter assembly 1800 incorporating thermoelectric actuators 1802 and 1804. The shutter assembly 1800 includes a shutter 1806 with a set of slotted shutter apertures 1808. Thermoelectric actuators 1802 and 1804 couple to either side of the shutter 1806 for moving the shutter 1806 transversely in a plane substantially parallel to a surface 1808 over which the shutter 1806 is supported. The coupling of the shutter 1806 from two positions on either side of the shutter 1806 to load anchors 1807 in positions on either side of the shutter assembly 1800 help reduce any twisting or rotational motion of the shutter 1806 about its central axis.

Each thermoelectric actuator 1802 and 1804 includes three compliant beams 1810, 1812, and 1814. Compliant beams 1810 and 1812 are each thinner than compliant beam 1814. Each of the beams 1810, 1812, and 1814 is curved in an s-like shape, holding the shutter 1806 stably in position.

In operation, to change the position of the shutter from open (as depicted) to closed, current is passed through a circuit including beams 1810 and 1814. The thinner beams 1810 in each actuator 1802 and 1804 heat, and therefore also expands, faster than the thicker beam 1814. The expansion forces the beams 1810, 1812, and 1814 from their mechanically stable curvature, resulting in transverse motion of the shutter 1806 to the closed position. To open the shutter 1806, current is run through a circuit including beams 1812 and 1814, resulting in a similar disproportionate heating and expansion of beams 1812, resulting in the shutter 1806 being forced back to the open position.

Figure 19:
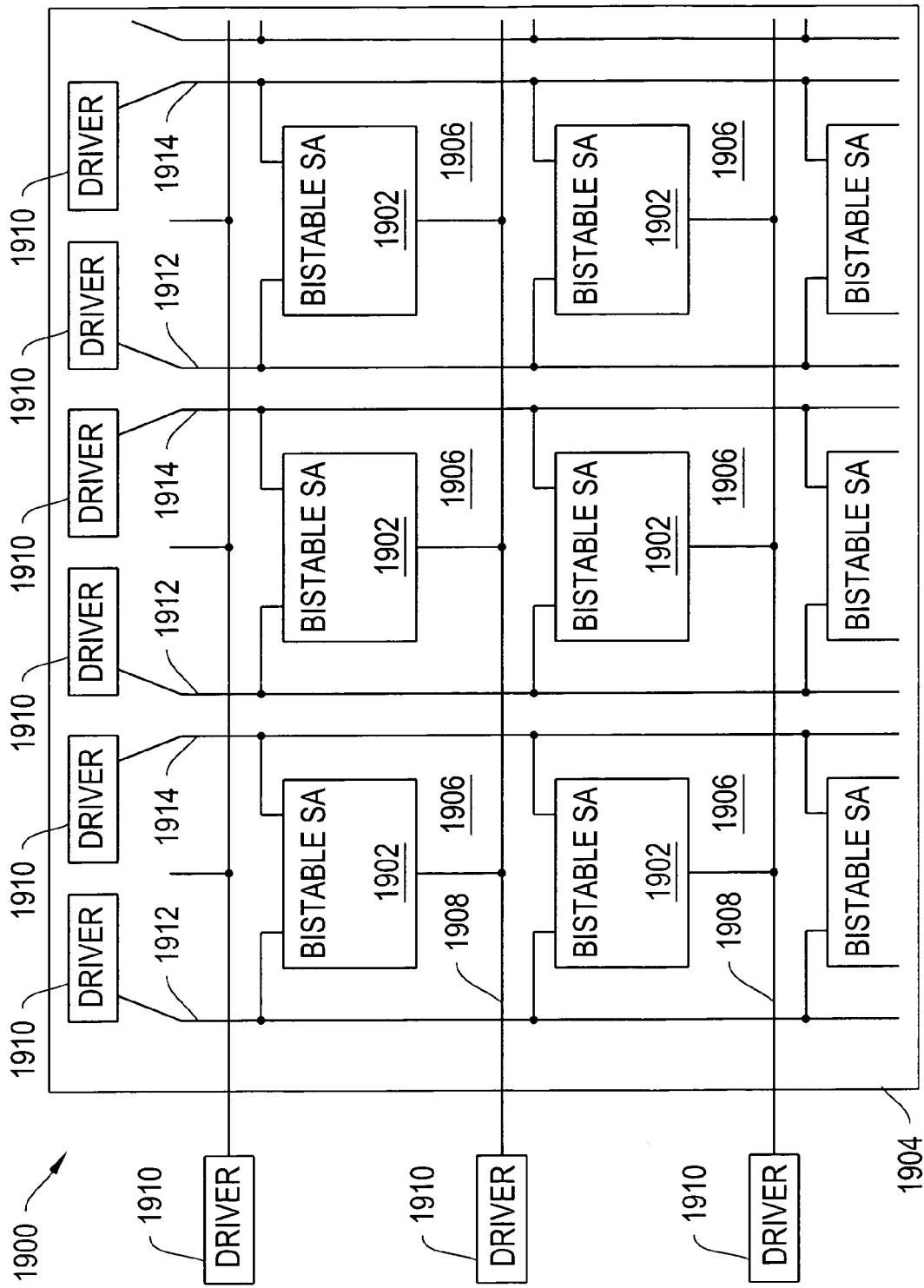
FIG. 19 is a conceptual diagram of a passive matrix array for controlling bi-stable shutter assemblies, according to an illustrative embodiment of the invention.

Bi-stable shutter assemblies can be driven using a passive matrix array or an active matrix array. FIG. 19 is a diagram of a passive matrix array 1900 for controlling bi-stable shutter assemblies 1902 to generate an image. As with active matrix arrays, such as active matrix arrays 900 and 1000, the passive matrix array 1900 is fabricated as a diffused or thin-film-deposited electrical circuit on a substrate 1904 of a display apparatus. In general, passive matrix arrays 1900 require less circuitry to implement than active matrix arrays 900 and 1000, and are easier to fabricate. The passive matrix array 1900 divides the shutter assemblies 1902 on the substrate 1904 of the display apparatus into rows and columns of grid segments 1906 of a grid. Each grid segment 1906 may include one or more bi-stable shutter assemblies 1902. In the display apparatus, all grid segments 1906 in a given row of the gird share a single row electrode 1908. Each row electrode 1908 electrically couples a controllable voltage source, such as driver 1910 to the load anchors of the shutter assemblies 1902. All shutter assemblies 1902 in a column share two common column electrodes, a shutter open electrode 1912 and a shutter close electrode 1914. The shutter open electrode 1912 for a given column electrically couples a driver 1910 to the drive electrode of the shutter open actuator of the shutter assemblies 1902 in the column. The shutter close electrode 1914 for a given column electrically couples a driver 1910 to the drive electrode of the shutter close actuator of the shutter assemblies 1902 in the column.

The shutter assemblies 1300, 1400, 1500, 1600, 1700*a*, and 1800 are amenable to the use of a passive matrix array because their property of mechanical bi-stability makes it possible to switch between open and closed states if the voltage across the actuator exceeds a minimum threshold voltage. If the drivers 1910 are programmed such that none of them will output a voltage that by itself is sufficient to switch the shutter assemblies between open and closed states, then a given shutter assembly will be switched if its actuator receives voltages from two opposing drivers 1910. The shutter assembly at the intersection of a particular row and column can be switched if it receives voltages from its particular row and column drivers whose difference exceeds the minimum threshold voltage.

To change the state of a shutter assembly 1902 from a closed state to an open state, i.e., to open the shutter assembly 1902, a driver 1910 applies a potential to the row electrode 1908 corresponding to the row of the grid in which the shutter assembly 1902 is located. A second driver 1910 applies a second potential, in some cases having an opposite polarity, to the shutter open electrode 1912 corresponding to the column in the grid in which the shutter assembly 1902 is located. To change the state of a shutter assembly 1902 from an open state to a closed state, i.e., to close the shutter assembly 1902, a driver 1910 applies a potential to the row electrode 1908 corresponding to the row of the display apparatus in which the shutter assembly 1902 is located. A second driver 1910 applies a second potential, in some cases having an opposite polarity, to the shutter close electrode 1914 corresponding to the column in the display apparatus in which the shutter assembly 1902 is located. In one implementation, a shutter assembly 1902 changes state in response to the difference in potential applied to the row electrode 1908 and one of the column electrodes 1912 or 1914 exceeding a predetermined switching threshold.

To form an image, in one implementation, a display apparatus sets the state of the shutter assemblies 1902 in the grid, one row at a time in sequential order. For a given row, the display apparatus first closes each shutter assembly 1902 in the row by applying a potential to the corresponding row electrodes 1908 and a pulse of potential to all of the shutter close electrodes 1914. Then, the display apparatus opens the shutter assemblies 1902 through which light is to pass by applying a potential to the shutter open electrode 1912 and applying a potential to the row electrodes 1908 for the rows which include shutter assemblies 1902 in the row which are to be opened. In one alternative mode of operation, instead of closing each row of shutter assemblies 1902 sequentially, after all rows in the display apparatus are set to the proper position to form an image, the display apparatus globally resets all shutter assemblies 1902 at the same time by applying a potentials to all shutter close electrodes 1914 and all row electrodes 1908 concurrently. In another alternative mode of operation, the display apparatus forgoes resetting the shutter assemblies 1902 and only alters the states of shutter assemblies 1902 that need to change state to display a subsequent image. A number of alternate driver control schemes for images have been proposed for use with ferro-electric liquid crystal displays, many of which can be incorporated for use with the mechanically bi-stable displays herein. These technologies are described in *Liquid Crystal Displays: Driving Schemes and Electro-Optical Effects*, Ernst Lieder (Wiley, New York, 2001).

The physical layout of the display is often a compromise between the characteristics of resolution, aperture area, and driving voltage. Small pixel sizes are generally sought to increase the resolution of the display. As pixels become smaller, however, proportionally the room available for shutter apertures decreases. Designers seek to maximize aperture ratio as this increases the brightness and power efficiency of the display. Additionally, the combination of a small pixels and large aperture ratios implies large angular deformations in the compliant members that support the shutters, which tends to increase the drive voltages required and the energy dissipated by the switching circuitry.

Figure 20A:
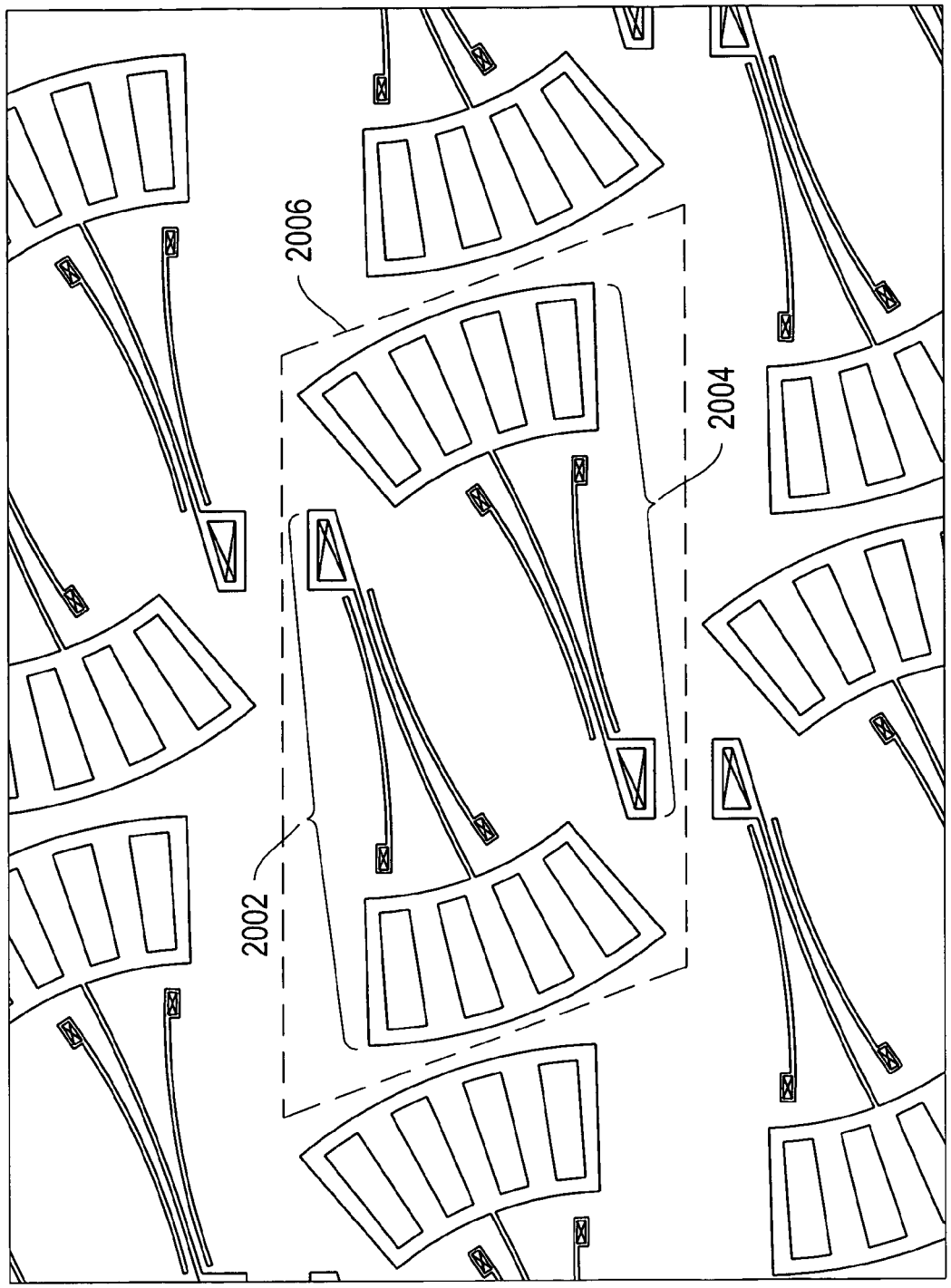
FIGS. 20A and 20B are conceptual tiling diagrams for arranging shutter assemblies in a display apparatus.
Figure 20B:
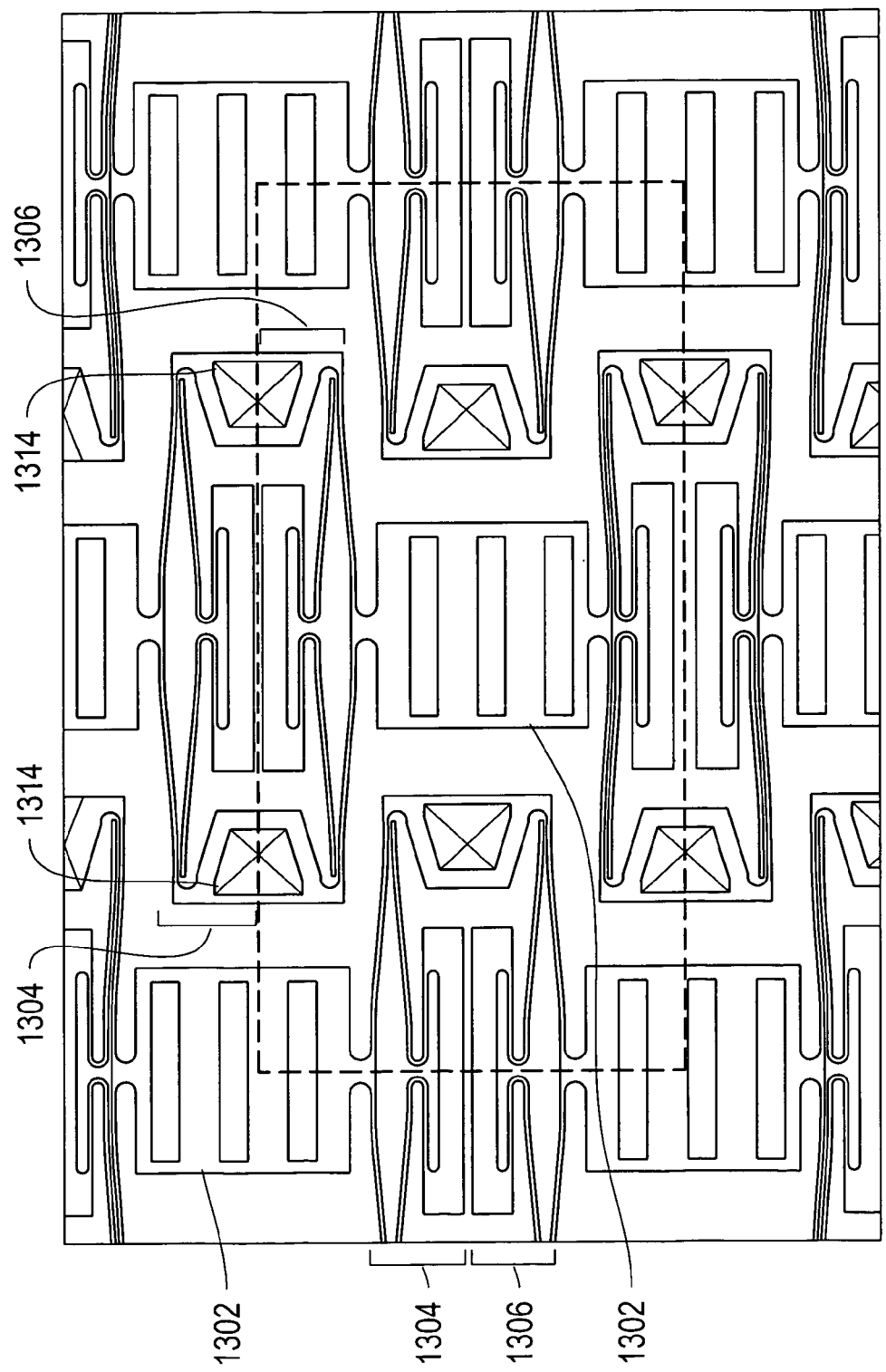

FIGS. 20A and 20B demonstrate two methods of tiling shutter assemblies into an array of pixels to maximize the aperture ratios in dense arrays and minimize the drive voltages.

FIG. 20A, for example, depicts a tiling 2000 of two cantilever dual beam electrode actuator-based shutter assemblies 2002 and 2004 tiled to form a rhombehedral pixel 2006 from two generally triangular shutter assemblies 2002 and 2004. The shutter assemblies 2002 and 2004 may be independently or collectively controlled. The rhombehedral tiling of FIG. 20A is quite close to a rectangular tiling arrangement, and in fact adapted to a rectangular pixel with aspect ratio of 2:1. Since two shutter assemblies can be established within each rectangle, such a 2:1 rectangular tiling arrangement can further be attached or built on top of an active matrix array which possesses a square repeating distance between rows and columns. A 1 to 1 correlation between pixels in the two arrays can therefore be established. Square pixel arrays are most commonly employed for the display of text and graphic images. The advantage of the layout in FIG. 20B is that it is understood to maximize the length of the load beams in each triangular pixel to reduce the voltage required for switching shutters between open and closed states.

FIG. 20B is an illustrative tiling of a plurality of bi-stable dual compliant beam electrode-actuator-based shutter assemblies 1300 of FIG. 13A. In comparison, for example, to the bi-stable dual compliant beam electrode-actuator-based shutter assembly 1400 of FIG. 14, the width of the shutter 1302 of the shutter assembly 1300 is substantially less than the distance between the load anchors 1314 of the shutter assembly 1300. While the narrower shutter 1302 allows for less light to pass through each shutter assembly 1300, the extra space can be utilized for tighter packing of shutter assemblies 1300, as depicted in FIG. 20B, without loss of length in the load beams. The longer load beams makes it possible to switch the shutters in the array at reduced voltages. In particular, the narrower shutter 1302 enables portions of the actuators 1304 and 1306 of the shutter assemblies 1300 interleave with the gaps between actuators 1302 and 1304 of neighboring shutter assemblies 1300. The interleaved arrangement of FIG. 20B can nevertheless still be mapped onto a square arrangement of rows and columns, which is the common pixel configuration for textual displays.

The tiling or pixel arrangements for shutter assemblies need not be limited to the constraints of a square array. Dense tiling can also be achieved using rectangular, rhombehedral, or hexagonal arrays of pixels, all of which find applications, for example in video and color imaging displays.

Figure 21:
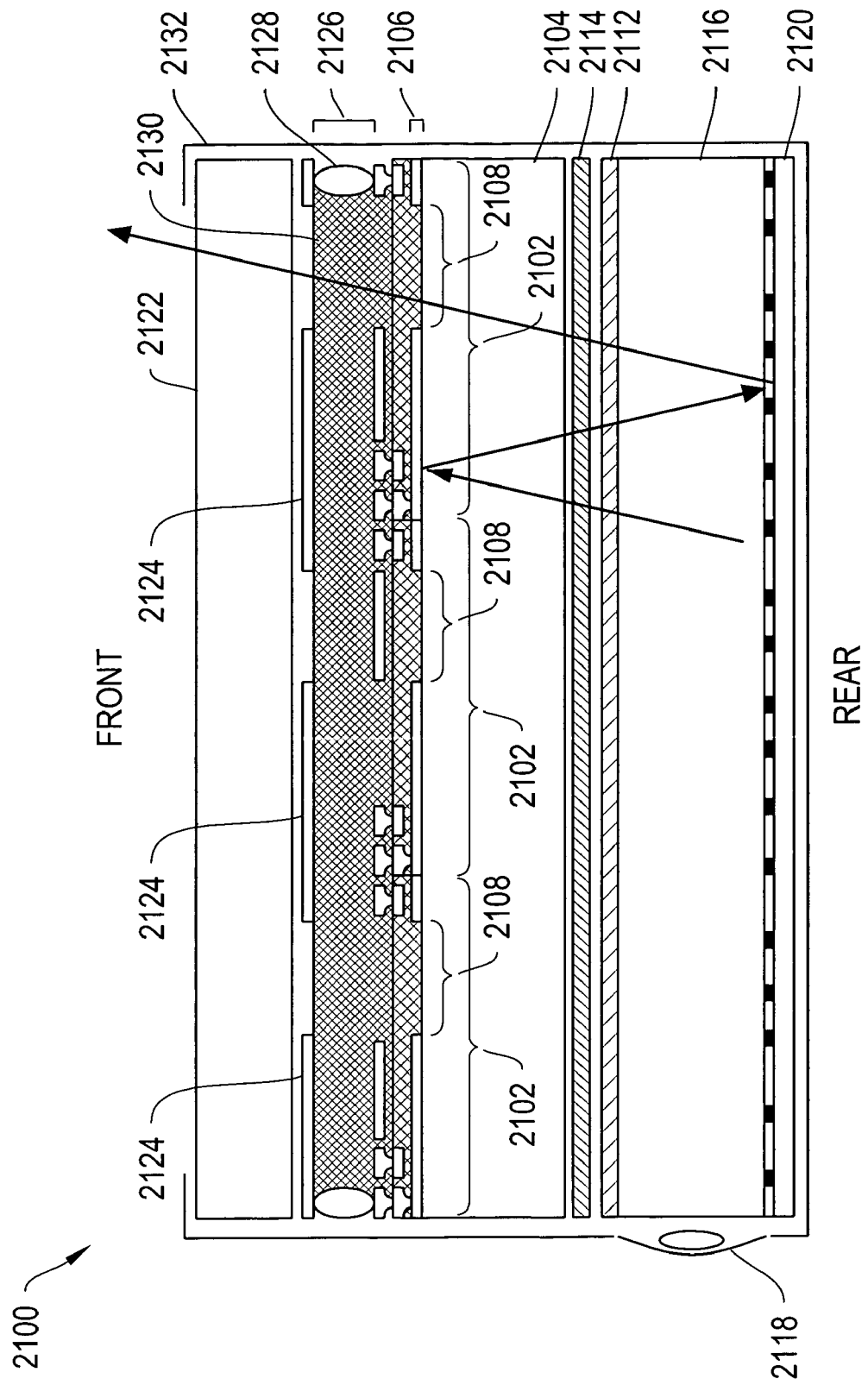
FIG. 21 is cross-sectional view of a display apparatus, according to an illustrative embodiment of the invention.

FIG. 21 is a cross sectional view of a display apparatus 2100 incorporating dual compliant electrode actuator-based shutter assemblies 2102. The shutter assemblies 2102 are disposed on a glass substrate 2104. A reflective film 2106 disposed on the substrate 2104 defines a plurality of surface apertures 2108 located beneath the closed positions of the shutters 2110 of the shutter assemblies 2102. The reflective film 2106 reflects light not passing through the surface apertures 2108 back towards the rear of the display apparatus 2100. An optional diffuser 2112 and an optional brightness enhancing film 2114 can separate the substrate 2104 from a backlight 2116. The backlight 2116 is illuminated by one or more light sources 2118. The light sources 2118 can be, for example, and without limitation, incandescent lamps, fluorescent lamps, lasers, or light emitting diodes. A reflective film 2120 is disposed behind the backlight 2116, reflecting light towards the shutter assemblies 2102. Light rays from the backlight that do not pass through one of the shutter assemblies 2102 will be returned to the backlight and reflected again from the film 2120. In this fashion light that fails to leave the display to form an image on the first pass can be recycled and made available for transmission through other open apertures in the array of shutter assemblies 2102. Such light recycling has been shown to increase the illumination efficiency of the display. A cover plate 2122 forms the front of the display apparatus 2100. The rear side of the cover plate 2122 can be covered with a black matrix 2124 to increase contrast. The cover plate 2122 is supported a predetermined distance away from the shutter assemblies 2102 forming a gap 2126. The gap 2126 is maintained by mechanical supports and/or by an epoxy seal 2128 attaching the cover plate 2122 to the substrate 2104. The epoxy 2128 should have a curing temperature preferably below about 200 C., it should have a coefficient of thermal expansion preferably below about 50 ppm per degree C. and should be moisture resistant. An exemplary epoxy 2128 is EPO-TEK B9021-1, sold by Epoxy Technology, Inc.

The epoxy seal 2128 seals in a working fluid 2130. The working fluid 2130 is engineered with viscosities preferably below about 10 centipoise and with relative dielectric constant preferably above about 2.0, and dielectric breakdown strengths above about $10^4$ V/cm. The working fluid 2130 can also serve as a lubricant. Its mechanical and electrical properties are also effective at reducing the voltage necessary for moving the shutter between open and closed positions. In one implementation, the working fluid 2130 preferably has a low refractive index, preferably less than about 1.5. In another implementation the working fluid 2130 has a refractive index that matches that of the substrate 2104. Suitable working fluids 2130 include, without limitation, de-ionized water, methanol, ethanol, silicone oils, fluorinated silicone oils, dimethylsiloxane, polydimethylsiloxane, hexamethyldisiloxane, and diethylbenzene.

A sheet metal or molded plastic assembly bracket 2132 holds the cover plate 2122, shutter assemblies 2102, the substrate 2104, the backlight 2116 and the other component parts together around the edges. The assembly bracket 2132 is fastened with screws or indent tabs to add rigidity to the combined display apparatus 2100. In some implementations, the light source 2118 is molded in place by an epoxy potting compound.

What is claimed is:

1. A display apparatus comprising:
   a shutter for interacting with a light in an optical path to form an image on the display apparatus;
   a voltage input for receiving an actuation potential; and
   an actuator, responsive to an actuation potential being applied to the voltage input, for moving the shutter from a first mechanically stable position in a plane to a second mechanically stable position in the plane.

2. The display apparatus of claim 1, wherein the actuator comprises a spring.

3. The display apparatus of claim 1, wherein the shutter comprises a plurality of shutter apertures through which light can pass.

4. The display apparatus of claim 1, wherein the actuator, responsive to a second actuation potential being applied to the voltage input, moves the shutter from one of the first and second mechanically stable states to a third mechanically stable state.

5. The display apparatus of claim 1, comprising a passive matrix array for selectively applying the actuation potential to the voltage input to form the image.

6. The display apparatus of claim 1, comprising a stabilizer having first and second mechanically stable states, wherein the movement of the shutter switches the state of the stabilizer between the first and second mechanically stable states.

7. The display apparatus of claim 1, comprising a second actuator coupled to the shutter, wherein the second actuator has first and second mechanically stable states corresponding to the first and second mechanically stable positions of the shutter.

8. The display apparatus of claim 7, wherein the actuator couples to the shutter in a first location and the second actuator couples to the shutter in a second location.

9. The display apparatus of claim 7, wherein the actuator couples to a first side of the shutter and the second actuator couples to a second side of the shutter substantially opposite the first side.

10. The display apparatus of claim 1, comprising a first compliant member having a first mechanically stable state corresponding to the first mechanically stable position of the shutter and a second mechanically stable state corresponding to the second mechanically stable position of the shutter.

11. The display apparatus of claim 10, wherein the first compliant member comprises a first beam, and wherein in the first mechanically stable state, the first beam is bowed in a first direction, and in the second mechanically stable state, the beam is bowed in a second direction.

12. The display apparatus of claim 10, wherein the first compliant member, absent the application of force to the compliant member has a substantially straight shape.

13. The display apparatus of claim 10, wherein in both the first mechanically stable state and the second mechanically stable state, the first compliant member is substantially straight.

14. The display apparatus of claim 10, wherein, responsive to the voltage input receiving the actuation potential, the first compliant member deforms from the first stable state to the second stable state.

15. The display apparatus of claim 10, wherein moving the actuator from either of the first and second mechanically stable states requires the actuator to apply force to the first compliant member.

16. The display apparatus of claim 10, wherein the height of the compliant member is at least about 1.4 times the width of the compliant member.

17. The display apparatus of claim 10, wherein the compliant member is between about 0.5 µm and about 5 µm wide.

18. The display apparatus of claim 10, wherein the first compliant member comprises an insulator at least partially covering the first compliant member.

19. The display apparatus of claim 18, wherein the dielectric constant of the insulator is greater than or equal to about 2.

20. The display apparatus of claim 10, wherein the actuator comprises a second compliant member having a second beam with a corresponding bow.

21. The display apparatus of claim 20, wherein the first compliant member comprises a first beam having a corresponding bow, and, in the first mechanically stable state, the bow of the second beam is substantially the same as the bow of the first beam and in the second mechanically stable state, the bow of the second beam is substantially opposite the bow of the first beam.

22. The display apparatus of claim 10, wherein the first compliant member couples to the shutter to a first anchor connecting the first compliant member to a surface over which the shutter is moved.

23. The display apparatus of claim 22, wherein the first compliant member couples to a second anchor connecting the first compliant member to the surface, and wherein the first anchor connects the first compliant member to a first location on the surface and the second anchor connects the first compliant member to a second location on the surface.

24. The display apparatus of claim 22, comprising a working fluid having a dielectric constant of at least about 1.5 disposed between the first and second compliant members.

25. The display apparatus of claim 10, comprising a second compliant member having first and second mechanically stable states, and wherein in each of the first and second mechanically stable states the second compliant member is substantially straight.

26. The display apparatus of claim 25, wherein the first compliant member couples to the shutter in a first location on the shutter and the second compliant member couples to the shutter in a second location.

27. The display apparatus of claim 25, wherein the second compliant member couples to an anchor connecting the second compliant member to a surface over which the shutter is moved.

28. The display apparatus of claim 25, wherein the first and second compliant members are electrodes, which, in response to a voltage being applied across the first and second compliant members, are drawn together, thereby moving the shutter.

29. The display apparatus of claim 10, comprising a second compliant member, wherein each of the first and second compliant members includes a beam, at least one which of has a flat side facing the other of the first and second compliant members.

30. The display apparatus of claim 1, wherein moving the shutter comprises rotation or translation of the shutter.

31. The display apparatus of claim 1, comprising a first compliant member coupled to shutter.

32. The display apparatus of claim 31, wherein the stiffness of the first compliant member varies along its length.

33. The display apparatus of claim 31, wherein the first compliant member includes a plurality of non-compliant members coupled by a plurality of compliant joints.

34. The display apparatus of claim 31, wherein the first compliant member is shaped such that the work required to move the shutter from the first mechanically stable position to the second mechanically stable position is substantially equal to the work required to move the shutter from the second mechanically stable position to the first mechanically stable position.

35. The display apparatus of claim 31, wherein the first compliant member is shaped such that the work required to move the shutter from the first mechanically stable position to the second mechanically stable position is greater than the work required to move the shutter from the second mechanically stable position to the first mechanically stable position.

36. A method of forming an image on a display apparatus, comprising:
   selectively applying an actuation potential to a voltage input;
   moving a shutter, in response to the application of the actuation potential, in a plane, from a first mechanically stable position to a second mechanically stable position, thereby permitting light to contribute to the formation of an image.

37. The method of claim 36, wherein moving the shutter comprises deforming a compliant member to which the shutter is coupled.

38. The method of claim 36, wherein moving shutter comprises altering the curvature of a compliant member to which the shutter is coupled.

39. The method of claim 36, comprising, in response to the application of the actuation potential, generating a voltage across two compliant members, drawing them together, wherein at least one of the compliant members is coupled to the shutter.

* * * * *